(12) United States Patent
Yamada et al.

(10) Patent No.: US 7,324,493 B2
(45) Date of Patent: Jan. 29, 2008

(54) 3-FREQUENCY BRANCHING CIRCUIT, BRANCHING CIRCUIT AND RADIO COMMUNICATION EQUIPMENT

(75) Inventors: Toru Yamada, Katano (JP); Tsutomu Matsumura, Yao (JP); Toshio Ishizaki, Kobe (JP); Hiroyuki Nakamura, Katano (JP); Kazuhide Uriu, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1029 days.

(21) Appl. No.: 10/311,915

(22) PCT Filed: Jun. 25, 2001

(86) PCT No.: PCT/JP01/05414

§ 371 (c)(1),
(2), (4) Date: Jun. 4, 2003

(87) PCT Pub. No.: WO02/01741

PCT Pub. Date: Jan. 3, 2002

(65) Prior Publication Data

US 2003/0189910 A1    Oct. 9, 2003

(30) Foreign Application Priority Data

Jun. 26, 2000  (JP)  ............... 2000-191192
Dec. 18, 2000  (JP)  ............... 2000-383344
Mar. 29, 2001  (JP)  ............... 2001-096773

(51) Int. Cl.
*H04B 7/216*  (2006.01)

(52) U.S. Cl. .............. 370/342; 370/276; 370/338; 370/347; 445/78; 445/129

(58) Field of Classification Search ............ None
See application file for complete search history.

(56) References Cited

U.S. PATENT DOCUMENTS

| | | | | |
|---|---|---|---|---|
| 5,896,562 A | * | 4/1999 | Heinonen | 455/76 |
| 6,738,611 B1 | * | 5/2004 | Politi | 455/302 |
| 2007/0026817 A1 | * | 2/2007 | Kodama | 455/78 |

FOREIGN PATENT DOCUMENTS

| | | |
|---|---|---|
| EP | 998035 | 5/2000 |
| EP | 1003291 | 5/2000 |
| JP | 2000-165274 | 6/2000 |
| JP | 2000-165288 | 6/2000 |

OTHER PUBLICATIONS

Japanese Language International Search Report for PCT/JP01/05414 dated Oct. 2, 2001.
English translation Form PCT/ISA/210.

* cited by examiner

*Primary Examiner*—Duc Ho
(74) *Attorney, Agent, or Firm*—RatnerPrestia

(57) ABSTRACT

A 3-frequency branching circuit in the past could not be used for a system wherein a TDMA method such as GSM and DCS and a W-CDMA method such as UMTS are mixed. The 3-frequency branching circuit equipped with branching means having first and second internal terminals, an antenna terminal of connecting to an antenna, a low-pass filter connected between the first internal terminal and the antenna terminal, and a high-pass filter connected between the second internal terminal and the antenna terminal, a switching circuit of switching between GSM TX and GSM RX, a switching circuit of switching between DCS TX, DCS RX and a third internal terminal, and a duplexer connected to the third internal terminal.

50 Claims, 56 Drawing Sheets

Chip parts (resistance, inductor, capacitor)
PIN diodes
Layered substrate (containing the inductor and capacitor)

Chip parts
(resistance, inductor, capacitor)

PIN diodes

Layered substrate
(containing the inductor and capacitor)

Duplexer

Chip parts (resistance, inductor, capacitor)
PIN diodes
Layered substrate (containing the inductor and capacitor)
Duplexer

# 3-FREQUENCY BRANCHING CIRCUIT, BRANCHING CIRCUIT AND RADIO COMMUNICATION EQUIPMENT This application is a U.S. National Phase Application of PCT International Application PCT/JP01/05414.

TECHNICAL FIELD

The present invention relates to a 3-frequency branching circuit, a branching circuit and radio communication equipment capable of switching a signal of a portable telephone for instance.

BACKGROUND ART

In recent years, as for a 3-frequency branching circuit in mobile communication equipment, attention is focused on a system of selecting a transmitting and receiving frequency of three frequencies in the systems of GSM, DCS and PCS with one portable telephone or the like due to the expanding user base or globalization of the systems, and moreover, attention is paid to possibility of implementing a smaller size and a lower price as to the mobile communication equipment such as the portable telephone.

Hereafter, an example of the 3-frequency branching circuit in the past will be described by referring to the drawings. Moreover, FIG. 56 shows an equivalent circuit diagram of the 3-frequency branching circuit in the past.

In FIG. 56, a transmitting circuit side 2301 as one side has an anode of a first diode P2301 connected thereto via a first capacitor element C2301, and a contact A has a cathode connected thereto.

Furthermore, the anode side of the first diode P2301 has a control terminal 2302 connected thereto, and the control terminal 2302 plays a role of switching a transmitting and receiving signal of one of the 3-frequency branching circuits.

In addition, a receiving circuit side 2303 as one side has an anode of a second diode P2302 connected thereto via a second capacitor element C2302, and a first strip line L2301 is connected to one end of the anode side of the second diode P2302 having a cathode connected to its ground side, and then the other end of the first strip line L2301 is connected to the contact A.

Furthermore, a transmitting and receiving circuit 2304 as one side connected to the contact A is connected to an antenna terminal 2305 via a low-pass filter and a third capacitor element C2303.

In addition, a transmitting circuit side 2306 as the other side has an anode of a third diode P2303 connected thereto via a fourth capacitor element C2304, and a cathode is connected to a contact B. Furthermore, the anode side of the third diode P2303 has a control terminal 2307 connected thereto, and the control terminal 2307 plays a role of switching the transmitting and receiving signal of one of composite switches.

In addition, a contact C on the other receiving circuit side has an anode of a fourth diode P2304 connected thereto via a fifth capacitor element C2305, and a cathode is connected to its ground side, and a second strip line L2302 is connected to one end of the anode side of the fourth diode P2304, and then the other end of the second strip line L2302 is connected to the contact B.

Furthermore, a transmitting and receiving circuit 2309 as the other side connected to the contact B is connected to the antenna terminal 2305 via a high-pass filter HPF and the third capacitor element C2303.

Furthermore, a high-frequency receiving circuit side 2308 has an anode of a fifth diode P2305 connected thereto via a sixth capacitor element C2306, and in addition, a control terminal 2311 is connected to the anode side of the fifth diode, and the control terminal 2311 plays a role of switching two receiving signals of the 3-frequency branching circuit.

In addition, the other high-frequency receiving circuit side 2310 has an anode of a sixth diode P2306 connected thereto via a seventh capacitor element C2307, and a cathode is connected to its ground side, and a third strip line L2303 is connected to one end of the anode side of the sixth diode P2306, and then the other end of the third strip line L2303 is connected to the contact C.

Operation of the 3-frequency branching circuit constituted as above will be described.

First, the cases of transmitting and receiving a low frequency will be described.

In case of transmitting the low frequency, the first diode P2301 and second diode P2302 will be in an on state by applying a positive voltage to the control terminal 2302.

At this time, the capacitors C2301, 2302 and C2303 cut a DC component, and so the current does not run to each terminal. In addition, a transmitting signal transmitted from a transmitting terminal 2301 is not transmitted to the receiving side because impedance of the first strip line L2301 becomes an infinite size due to the second diode P2302 connected to the ground side.

For that reason, the transmitting signal is transmitted to the antenna terminal 2305 via the low-pass filter LPF.

Next, on receiving, the first diode P2301 and second diode P2302 are in an off state in order to apply no voltage to the control terminal 2302 so that the receiving signal is transmitted from the antenna terminal 2305 to the receiving terminal 2303 via the low-pass filter.

Next, the cases of transmitting and receiving a high frequency will be described.

The third diode P2303 and fourth diode P2304 will be in the on state by applying a positive voltage to a control terminal 2307.

At this time, the capacitors C2303, 2304 and C2305 cut a DC component, and so the current does not run to each terminal. In addition, the transmitting signal transmitted from a transmitting terminal 2306 is not transmitted to the receiving side because the impedance of the second strip line L2302 becomes the infinite size due to the fourth diode P2304 connected to the ground side.

For that reason, the transmitting signal is transmitted to the antenna terminal 2305 via the high-pass filter.

Moreover, on receiving, the third diode P2303 and fourth diode P2304 are in the off state in order to apply no voltage to the control terminal 2307 so that the receiving signal is transmitted from the antenna terminal 2305 to the receiving side. Thus, it can be transmitted to a receiving terminal side C via the high-pass filter.

Next, in case of receiving on a receiving terminal 2308 as one side, no voltage is applied to the control terminal 2307 on receiving as mentioned above.

At this time, the fifth diode P2305 and sixth diode P2306 are put in the on state by applying the positive voltage to the control terminal 2307, but the capacitors C2305, 2306 and C2307 cut the DC component, and so the current does not run to each terminal.

And the signal transmitted from the antenna terminal 2305 is not transmitted to the other receiving terminal 2310 because the impedance of the third strip line L2303 becomes the infinite size due to the sixth diode P2306 connected to the ground side.

At this time, it is transmitted to the receiving terminal 2308 via the high-pass filter.

Next, when receiving on the other, the fifth diode P2305 and sixth diode P2306 are in the off state in order to apply no voltage to the control terminal 2307 so that the receiving signal is transmitted from the antenna to the other receiving side.

For this reason, the other receiving signal can be transferred from the antenna terminal 2305 to the receiving terminal 2310 via the high-pass filter.

However, there was a problem that, although the above configuration is suited to the TDMA (Time Division Multiple Access) method such as GSM, DCS and PCS, it cannot be used for a system wherein the TDMA method such as GSM and DCS and the W-CDMA (Wide-band Code Division Multiple Access) method such as UMTS are mixed.

DISCLOSURE OF THE INVENTION

An object of the present invention is, considering the above problem in the past, to provide the 3-frequency branching circuit, branching circuit and radio communication equipment also usable for a system wherein the TDMA method and the W-CDMA method assuring high tone quality and high speed data communication for instance are mixed.

One aspect of the present invention is a 3-frequency branching circuit having a filter function of passing a transmitting frequency band and a receiving frequency band in each of first, second and third frequency bands, comprising:

first, second and third internal terminals;
an antenna terminal of connecting to an antenna;
branching circuit having a first filter of passing the third frequency band between the first internal terminal and the antenna terminal and a second filter of passing the first and second frequency bands between the second internal terminal and the antenna terminal;
a first switching circuit, connected to the first internal terminal, of switching between a first transmitting terminal used to transmit the third frequency band and a first receiving terminal used to receive the third frequency band;
a second switching circuit, connected to the second internal terminal, of switching among a second transmitting terminal used to transmit a transmitting frequency band of the second frequency band, a second receiving terminal used to receive a receiving frequency band of the second frequency band, and the third internal terminal used to transmit and receive the first frequency band; and
a duplexer, connected to the third internal terminal, of branching the transmitting frequency band and the receiving frequency band of the first frequency band.

Another aspect of the present invention is the 3-frequency branching circuit according to the 1st invention,
wherein the third internal terminal is connected to the branching circuit and is also grounded via a diode.

Still another aspect of the present invention is the 3-frequency branching circuit,
wherein the third internal terminal is connected to the branching circuit via the diode in a forward direction when transmitting and receiving the first frequency band.

Yet still another aspect of the present invention is the 3-frequency branching circuit,
further comprising a low-pass filter inserted between the branching circuit and the second switching circuit.

Still yet another aspect of the present invention is the 3-frequency branching circuit,
wherein the first receiving terminal and the third internal terminal are connected to the antenna and are also grounded via the diode in a forward direction and a grounding resistor respectively; and
one resistor is shared as the grounding resistor used for the respective groundings.

A further aspect of the present invention is the 3-frequency branching circuit,
wherein the first and second receiving terminals are connected to the antenna and are also grounded via the diode in a forward direction and a grounding resistor respectively; and
one resistor is shred as the grounding resistor used for the respective groundings.

A still further aspect of the present invention is a branching circuit having a filter function of passing a transmitting frequency band and a receiving frequency band in each of a first to Nth frequency bands, comprising:

first and second internal terminals;
an antenna terminal of connecting to an antenna;
branching circuit having a first filter of passing n+1-th ($2 \leq n \leq N-1$) to Nth frequency bands between the first internal terminal and the antenna terminal and a second filter of passing the first to the nth frequency bands between the second internal terminal and the antenna terminal;
a first switching circuit, connected to the first internal terminal, of switching between the transmitting frequency bands and the receiving frequency bands of the n+1-th to Nth frequency bands;
a second switching circuit, connected to the second internal terminal, of switching between the transmitting frequency bands of the first frequency band and the second to nth frequency bands and the receiving frequency bands of the second to the nth frequency bands; and
a duplexer of branching the transmitting frequency band and the receiving frequency band of the first frequency band.

A yet further aspect of the present invention is a 3-frequency branching circuit having a filter function of passing a transmitting frequency band and a receiving frequency band in each of first, second and third frequency bands, comprising:

first, second, third and fourth internal terminals;
an antenna terminal of connecting to an antenna;
branching circuit having a first filter of passing the third frequency band between the first internal terminal and the antenna terminal and a second filter of passing the first and second frequency bands between the second internal terminal and the antenna terminal;
a first switching circuit, connected to the first internal terminal, of switching between the transmitting frequency band and the receiving frequency band of the third frequency band;
a second switching circuit, connected to the second internal terminal, of switching and transmitting the second frequency band to the third internal terminal and the first frequency band to the fourth internal terminal;
a third switching circuit, connected to the third internal terminal, of switching between the transmitting frequency band and the receiving frequency band of the second transmitting frequency band; and
a duplexer, connected to the fourth internal terminal, of branching the transmitting frequency band and the receiving frequency band of the first frequency band.

A still yet further aspect of the present invention is the 3-frequency branching circuit, wherein that the duplexer has a configuration in which a coaxial type resonator is used and is comprised of a notch filter and a band pass filter.

An additional aspect of the present invention is the 3-frequency branching circuit, wherein the duplexer has the configuration in which a coaxial type resonator is used, and a signal of a transmitting frequency band is transmitted to the fourth internal terminal via the notch filter, and a signal of a receiving frequency band is transmitted from the fourth internal terminal via the band pass filter.

A still additional aspect of the present invention is the 3-frequency branching circuit, wherein the fourth internal terminal is an internal terminal of a multilayered product.

A yet additional aspect of the present invention is the 3-frequency branching circuit, wherein a SAW filter is used for the duplexer.

A still yet additional aspect of the present invention is the 3-frequency branching circuit, wherein the duplexer is comprised of a coaxial type resonator and a layered filter.

A supplementary aspect of the present invention is the 3-frequency branching circuit, wherein a coaxial type resonator and a SAW filter are used for the duplexer.

A still supplementary aspect of the present invention is the 3-frequency branching circuit, wherein a layered filter and a SAW filter are used for the duplexer.

A yet supplementary aspect of the present invention is a branching circuit having a filter function of passing a transmitting frequency band and a receiving frequency band in each of first to Nth frequency bands, comprising:

first, second, third and fourth internal terminals;

an antenna terminal of connecting to an antenna;

branching circuit having a first filter of passing the n+1-th ($2 \leq n \leq N-1$) to Nth frequency bands between the first internal terminal and the antenna terminal and a second filter of passing the first to the nth frequency bands between the second internal terminal and the antenna terminal;

a first switching circuit, connected to the first internal terminal, of switching among the frequency bands of the n+1-th to Nth frequency bands;

a second switching circuit, connected to the second internal terminal, of switching and transmitting the second to n-th frequency bands to the third internal terminal and the first frequency band to the fourth internal terminal;

a third switching circuit, connected to the third internal terminal, of switching among the second to n-th frequency bands; and a duplexer, connected to the fourth internal terminal, of branching the transmitting frequency band and the receiving frequency band of the first frequency band.

A still yet supplementary aspect of the present invention is a 3-frequency branching circuit comprising:

a duplexer having a filter function of passing a transmitting frequency band and a receiving frequency band in each of first, second and third frequency bands and equipped with first and second internal terminals, an antenna terminal of connecting to an antenna, a first filter of passing transmitting frequency bands of the three frequency bands and receiving frequency bands of the second and third frequency bands between the first internal terminal and the antenna terminal, and a second filter of passing the receiving frequency band of the first frequency band between the second internal terminal and the antenna terminal;

branching circuit, connected to the first internal terminal, of branching (1) the transmitting frequency band of the first frequency band, transmitting frequency band of the second frequency band, and receiving frequency band of the second frequency band, (2) the transmitting frequency band of the third frequency band and the receiving frequency band of the third frequency band;

a first switching circuit of switching between transmitting of the third frequency band and receiving of the third frequency band; and a second switching circuit of switching between transmitting of the first and second frequency bands and receiving of the second frequency band.

Another aspect of the present invention is the 3-frequency branching circuit, wherein the duplexer has a configuration using a coaxial type resonator, the first filter is comprised of a notch filter and the second filter is comprised of a band pass filter.

Still another aspect of the present invention is the 3-frequency branching circuit, wherein the duplexer has a configuration using a coaxial type resonator, and a notch filter and a low-pass filter are constituted between the first internal terminal and the antenna terminal.

Yet still another aspect of the present invention is the 3-frequency branching circuit, wherein the duplexer has a configuration using a coaxial type resonator between the first internal terminal and the antenna terminal, and the second filter is comprised of a layered filter.

Still yet another aspect of the present invention is the 3-frequency branching circuit, wherein the duplexer has a configuration using a coaxial type resonator between the first internal terminal and the antenna terminal, and a SAW filter is used for the second filter.

A further aspect of the present invention is the 3-frequency branching circuit, wherein the duplexer has a configuration using a layered filter between the first internal terminal and the antenna terminal, and a SAW filter is used between the second terminal and the antenna terminal.

A still further aspect of the present invention is a 3-frequency branching circuit comprising:

branching circuit, having a filter function of passing a transmitting frequency band and a receiving frequency band in each of first, second and third frequency bands, of branching (1) the transmitting frequency band and receiving frequency band of the third frequency band, (2) the transmitting frequency band of the first and second frequency bands and the receiving frequency band of the first and second frequency bands, having first and second internal terminals, an antenna terminal of connecting to an antenna, a first filter of passing the transmitting frequency band and receiving frequency band of the third frequency band between the first internal terminal and the antenna terminal and a second filter of passing the transmitting frequency band of the first and second frequency bands and the receiving frequency band of the first and second frequency bands between the second internal terminal and the antenna terminal;

a first switching circuit, connected to the first internal terminal, of switching between transmitting of the third frequency band and receiving of the third frequency band;

a duplexer, connected to the second internal terminal, having third and fourth internal terminals, a third filter of passing the transmitting frequency band of the first and second frequency bands and the receiving frequency band of the second frequency band between the third internal terminal and the second internal terminal, and a fourth filter of passing the receiving frequency band of the first frequency band between the fourth internal terminal and the second internal terminal; and a second switching circuit, connected to the third internal terminal, of switching between the transmitting frequency band of the first and second frequency bands and the receiving frequency band of the second frequency band.

A yet further aspect of the present invention is the 3-frequency branching circuit, wherein the duplexer has a configuration using a coaxial type resonator, and the third filter is comprised of a notch filter and the fifth filter is comprised of a band pass filter.

A still yet further aspect of the present invention is the 3-frequency branching circuit, wherein the duplexer has a configuration using a coaxial type resonator, and the third filter is comprised of a notch filter and a low-pass filter.

An additional aspect of the present invention is the 3-frequency branching circuit, wherein the duplexer has a configuration using a layered filter, where the layered filter constituted between the third internal terminal and the second internal terminal is comprised of a notch filter and the layered filter constituted between the fourth internal terminal and the second internal terminal is comprised of a band pass filter.

A still additional aspect of the present invention is the 3-frequency branching circuit, wherein the duplexer has a configuration using a layered filter, where the layered filter constituted between the third internal terminal and the second internal terminal is comprised of a notch filter and a low-pass filter.

A yet additional aspect of the present invention is the 3-frequency branching circuit, wherein the duplexer is comprised of a filter using a coaxial type resonator between the third internal terminal and the second internal terminal, and the fourth filter is comprised of a layered filter.

A still yet additional aspect of the present invention is the 3-frequency branching circuit, wherein the duplexer is comprised of a filter using a coaxial type resonator between the third internal terminal and the second internal terminal, and the filter constituted between the fourth internal terminal and the second internal terminal is comprised of a SAW filter.

A supplementary aspect of the present invention is the 3-frequency branching circuit, wherein the duplexer has the third filter comprised of a layered filter and the fourth filter is comprised of a SAW filter.

One aspect of the present invention is a 3-frequency branching circuit comprising:

a duplexer having a filter function of passing a transmitting frequency band and a receiving frequency band in each of first, second and third frequency bands and equipped with first, second and third internal terminals, an antenna terminal of connecting to an antenna, a first filter of passing a transmitting frequency band and a receiving frequency band of the third frequency band between the first internal terminal and the antenna terminal, a second filter of passing the transmitting frequency band of the first and second frequency bands and the receiving frequency band of the second frequency band between the second internal terminal and the antenna terminal, and a third filter of passing the receiving frequency band of the first frequency band between the third internal terminal and the antenna terminal;

a first switching circuit, connected to the first internal terminal, of switching between the transmitting frequency band and the receiving frequency band of the third frequency band; and a second switching circuit, connected to the second internal terminal, of switching between the transmitting frequency band of the first and second frequency bands and the receiving frequency band of the second frequency band.

Another aspect of the present invention is the 3-frequency branching circuit, wherein the first filter is formed by a low-pass filter, the second filter is formed by a band pass filter, and the third filter is formed by a high-pass filter.

Still another aspect of the present invention is the 3-frequency branching circuit, wherein the first filter is formed by a low-pass filter, the second filter is formed by a band pass filter, and the third filter is formed by a notch filter.

Yet still another aspect of the present invention (is a branching circuit having a first branching circuit having a filter function of passing a transmitting frequency band and a receiving frequency band in each of first to Nth frequency bands, and equipped with first to k-th internal terminals and an antenna terminal of connecting to an antenna, wherein the first internal terminal is a terminal of outputting the receiving frequency band of the first frequency band;

the k-th internal terminal is the terminal of inputting the transmitting frequency band of the first frequency band and inputting and outputting the transmitting frequency bands and the receiving frequency bands of all or a part of the second to the N-th frequency bands.

Still Yet another aspect of the present invention is the branching circuit, further comprising a second branching circuit, connected to the k-th internal terminal, of branching the transmitting frequency band of the first frequency band and all or a part of the frequency bands of the second to the N-th frequency bands.

A further aspect of the present invention is the branching circuit, wherein the N is 3 and the k is 2;

the second internal terminal is the terminal of inputting the transmitting frequency band of the first frequency band and inputting and outputting the transmitting frequency bands and the receiving frequency bands of the second and third frequency bands which are all of the frequency bands;

a first switching circuit of switching between input of the transmitting frequency band of the third frequency band and output of the receiving frequency band of the third frequency band branched by the second branching circuit; and a second switching circuit of switching between the input of the transmitting frequency band of the first frequency band and the transmitting frequency band of the second frequency band and the output of the receiving frequency band of the second frequency band branched by the second branching circuit.

A still further aspect of the present invention is the branching circuit, wherein the N is 3 and the k is 2;

the third internal terminal is a terminal of inputting the transmitting frequency band of the first frequency band and inputting and outputting the transmitting frequency band and the receiving frequency band of the second frequency band which is the part of frequency bands;

the second internal terminal is the terminal of inputting and outputting the transmitting frequency band and the receiving frequency band of the third frequency band which is the remaining frequency band;

a second switching circuit, connected to the third internal terminal, of switching between the input of the transmitting frequency band of the first frequency band and the transmitting frequency band of the second frequency band and the output of the receiving frequency band of the second frequency band; and a first switching circuit, connected to the second internal terminal, of switching between the input of the transmitting frequency band of the third frequency band and the output of the receiving frequency band of the third frequency band.

A yet further aspect of the present invention is a branching circuit comprising:

first branching circuit having a filter function of passing a transmitting frequency band and a receiving frequency band in each of first to Nth frequency bands, and equipped with first to k-th internal terminals and an antenna terminal of connecting to an antenna, and wherein the first internal terminal is a terminal of inputting the transmitting frequency band of the first frequency band;

the k-th internal terminal is the terminal of outputting the receiving frequency band of the first frequency band and inputting and outputting the transmitting frequency bands and the receiving frequency bands of all or a part of the second to N-th frequency bands.

A still yet further aspect of the present invention is a branching circuit comprising:

first branching circuit having a filter function of passing a transmitting frequency band and a receiving frequency band in each of first to Nth frequency bands, and equipped with first and second internal terminals and an antenna terminal of connecting to an antenna; and second branching circuit having a filter function of passing the transmitting frequency band and the receiving frequency band in each of first to N–1-th frequency bands, and equipped with third to k-th internal terminals and a connection terminal of connecting to the second internal terminal, wherein the first internal terminal is a terminal of inputting and outputting the transmitting frequency bands and the receiving frequency bands of the N-th frequency bands;

the second internal terminal is a terminal of inputting and outputting the transmitting frequency band and the receiving frequency band of the first to the N–1-th frequency bands;

the k-th internal terminal is the terminal of outputting the receiving frequency band of the first frequency band; and the third internal terminal is the terminal of inputting the transmitting frequency band of the first frequency band and inputting and outputting the transmitting frequency bands and the receiving frequency bands of all or a part of the second to N–1-th frequency bands.

An additional aspect of the present invention is the branching circuit, further comprising third branching circuit, connected to the third internal terminal, of branching the transmitting frequency band of the first frequency band and all or a part of the second to N-th frequency bands.

A still additional aspect of the present invention is the branching circuit, wherein the N is 3 and the k is 4;

the third internal terminal is the terminal of inputting the transmitting frequency band of the first frequency band and inputting and outputting the transmitting frequency band and the receiving frequency band of the second frequency band which is all of the frequency bands;

a first switching circuit, connected to the first internal terminal, of switching between the input of the transmitting frequency band of the third frequency band and the output of the receiving frequency band of the third frequency band; and a second switching circuit, connected to the third internal terminal, of switching between the input of the transmitting frequency band of the first frequency band and the transmitting frequency band of second frequency band and the output of the receiving frequency band of the second frequency band.

A yet additional aspect of the present invention is a branching circuit comprising:

first branching circuit having a filter function of passing a transmitting frequency band and a receiving frequency band in each of first to Nth frequency bands, and equipped with first and second internal terminals and an antenna terminal of connecting to an antenna; and second branching circuit having a filter function of passing the transmitting frequency band and the receiving frequency band in each of first to N–1-th frequency bands, and equipped with third to k-th internal terminals and a connection terminal of connecting to the second internal terminal, wherein the first internal terminal is a terminal of inputting and outputting the transmitting frequency band and the receiving frequency band of the N-th frequency band;

the second internal terminal is the terminal of inputting and outputting the transmitting frequency band and the receiving frequency band of the first to the N–1-th frequency bands;

the k-th internal terminal is the terminal of inputting the transmitting frequency band of the first frequency band; and the third internal terminal is the terminal of outputting the receiving frequency band of the first frequency band and inputting and outputting all or a part of the transmitting frequency bands and the receiving frequency bands of the second to N–1-th frequency bands.

A still yet additional aspect of the present invention is the 3-frequency branching circuit, wherein the branching circuit is constituted by a layered configuration using the dielectric green sheet.

A supplementary aspect of the present invention is the 3-frequency branching circuit, wherein at least one of the first, second and third switching circuits, the duplexer and the first, second and third filters is constituted by a layered configuration using a dielectric green sheet.

A still supplementary aspect of the present invention is the 3-frequency branching circuit according to any one of the 1st, 8th, 17th, 23rd and 31st inventions, wherein at least one of the branching circuits, first, second and third switching circuits, the duplexer and the first, second and third filters is constituted by mounting a switching element on a multilayered product using a dielectric green sheet.

A yet supplementary aspect of the present invention is the 3-frequency branching circuit, wherein at least one of the first, second and third switching circuits has a configuration using a diode.

A still yet supplementary aspect of the present invention is the 3-frequency branching circuit, wherein a GaAs (gallium arsenide) switch is used for at least one of the branching circuits and the first, second and third switching circuits.

Another aspect of the present invention is the 3-frequency branching circuit,
wherein the first frequency band is a frequency band supporting the W-CDMA method.

Still another aspect of the present invention is radio communication equipment comprising:
an antenna of transmitting and receiving a signal;
a 3-frequency branching circuit; and
signal processing device which processes the signal branched by the 3-frequency branching circuit or branching circuit.

Thus, the 3-frequency branching circuit according to the present invention has a first internal terminal of a transmitting frequency band of three frequencies and a receiving frequency band of two frequencies, a second internal terminal of the receiving frequency band of one remaining frequency, and a third antenna terminal of connecting to the antenna, for instance, where the above described filter makes a duplexer of branching a frequency band wherein a band width of which common terminal is the third antenna terminal is a broad band and the respective frequency bands are in proximity, the above described first internal terminal has a branching filter of branching low and high frequency bands, a switching circuit of switching transmitting and receiving is provided to the other end of the low frequency band, and the switching circuit of switching transmitting and receiving is also provided to the other end of the high frequency band.

Figure 1:
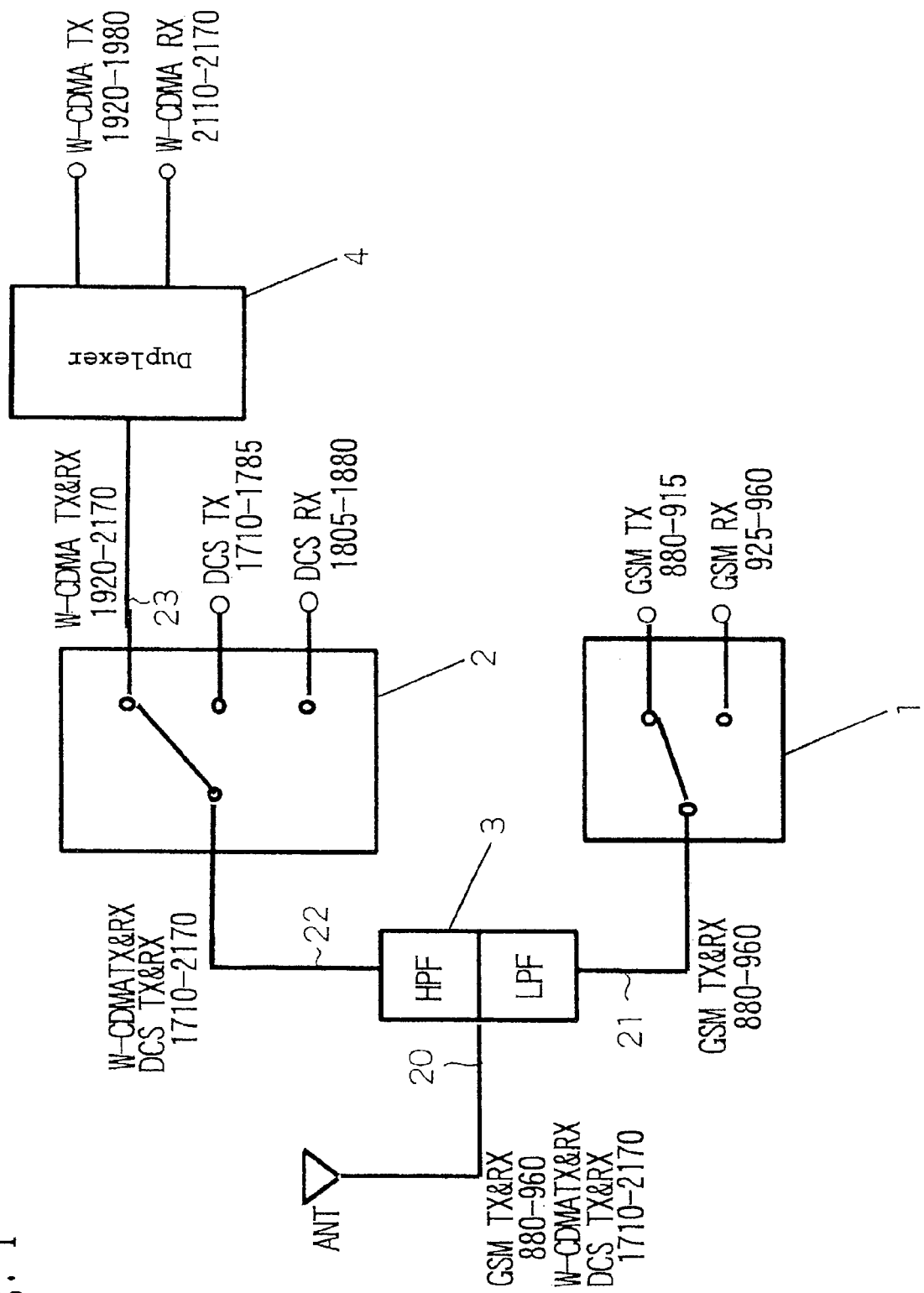
FIG. 1 is a block diagram of a 3-frequency branching circuit according to a first embodiment of the present invention.

DESCRIPTION OF THE SYMBOLS 1, 2 Switching circuits (transmitting and receiving switching circuits)
3 Branching circuit (branching circuit)
4 Duplexer
20 Antenna terminal
21 to 23 Internal terminals
11 to 13 Low-pass filters (LPF)

BEST MODE FOR CARRYING OUT THE INVENTION

Hereafter, embodiments of the present invention will be described by referring to the drawings.

First Embodiment

First, the configuration and operation of a 3-frequency branching circuit of this embodiment will be described mainly by referring to FIG. 1. Moreover, FIG. 1 is a block diagram of the 3-frequency branching circuit according to this embodiment.

Figure 2:
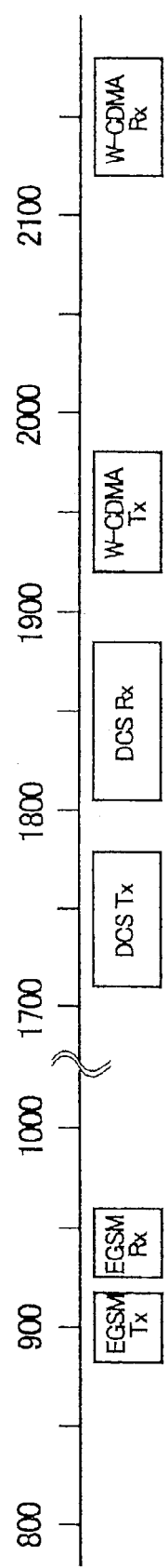
FIG. 2 is an explanatory view of frequency bands corresponding to GSM, DCS and W-CDMA.
Figure 3A:
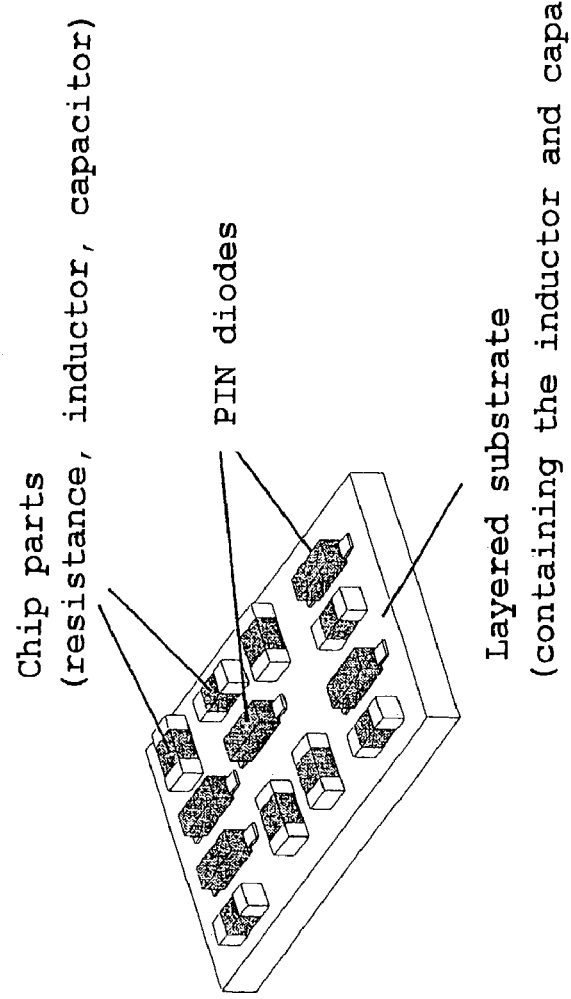
FIG. 3 are an explanatory view (FIG. 3 (*a*)) of the 3-frequency branching circuit (front) and an explanatory view (FIG. 3 (*b*)) of the 3-frequency branching circuit (backside) according to the first embodiment of the present invention.
Figure 3B:
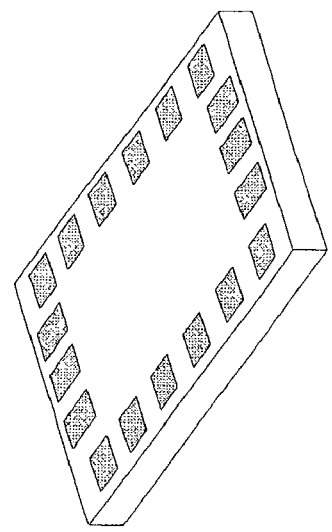

The 3-frequency branching circuit according to this embodiment is a triple-switch 3-frequency branching circuit having a filter function of passing a transmitting frequency band and a receiving frequency band in each of GSM (a third frequency band), DCS (a second frequency band) and W-CDMA (a first frequency band) as shown in FIG. 2, and has switching circuits (transmitting and receiving switching circuits) 1 and 2, a branching circuit 3 and a duplexer 4 and also has an appearance as shown in FIGS. 3 (a) to (b). Moreover, FIG. 2 is an explanatory view of frequency bands corresponding to GSM, DCS and W-CDMA. In addition, FIG. 3 (a) is an explanatory view of the 3-frequency branching circuit (front) according to this embodiment (explanatory view of an example integrating the switching circuits and branching circuit) and FIG. 3 (b) is an explanatory view of the 3-frequency branching circuit (backside) according to this embodiment.

Next, each element of the 3-frequency branching circuit of this embodiment will be described in further detail.

The branching circuit 3 has internal terminal 21 and 22, an antenna terminal 20 of connecting to an antenna (ANT), a low-pass filter (LPF) of passing the third frequency band (GSM) connected between the internal terminal 21 and the antenna terminal 20, and a high-pass filter (HPF) of passing the first and second frequency bands (DCS and W-CDMA) connected between the internal terminal 22 and the antenna terminal 20.

The switching circuit 1 is connected to the internal terminal 21 for the purpose of switching between a transmitting terminal T x 1 (GSM TX) utilized for transmission of the third frequency band (GSM) and a receiving terminal R x 1 (GSM RX) utilized for receiving of the third frequency band.

The switching circuit 2 is connected to the internal terminal 22 for the purpose of switching among the internal terminal 23 utilized for transmitting and receiving of the first frequency band (W-CDMA), a transmitting terminal T x 2 (DCS TX) utilized for transmission of a transmitting frequency band of the second frequency band (DCS) and a receiving terminal R x 2 (DCS RX) utilized for receiving of a receiving frequency band of the second frequency band (DCS).

The duplexer 4 is connected to the third internal terminal 23 for the purpose of switching between transmitting and receiving of the first frequency band (W-CDMA) (to be more specific, switching between a transmitting terminal T x 3 (W-CDMA TX) utilized for transmission of a transmitting frequency band of the first frequency band (W-CDMA) and a receiving terminal R x 3 (W-CDMA RX) utilized for receiving of a receiving frequency band of the first frequency band (W-CDMA)).

Figure 4:
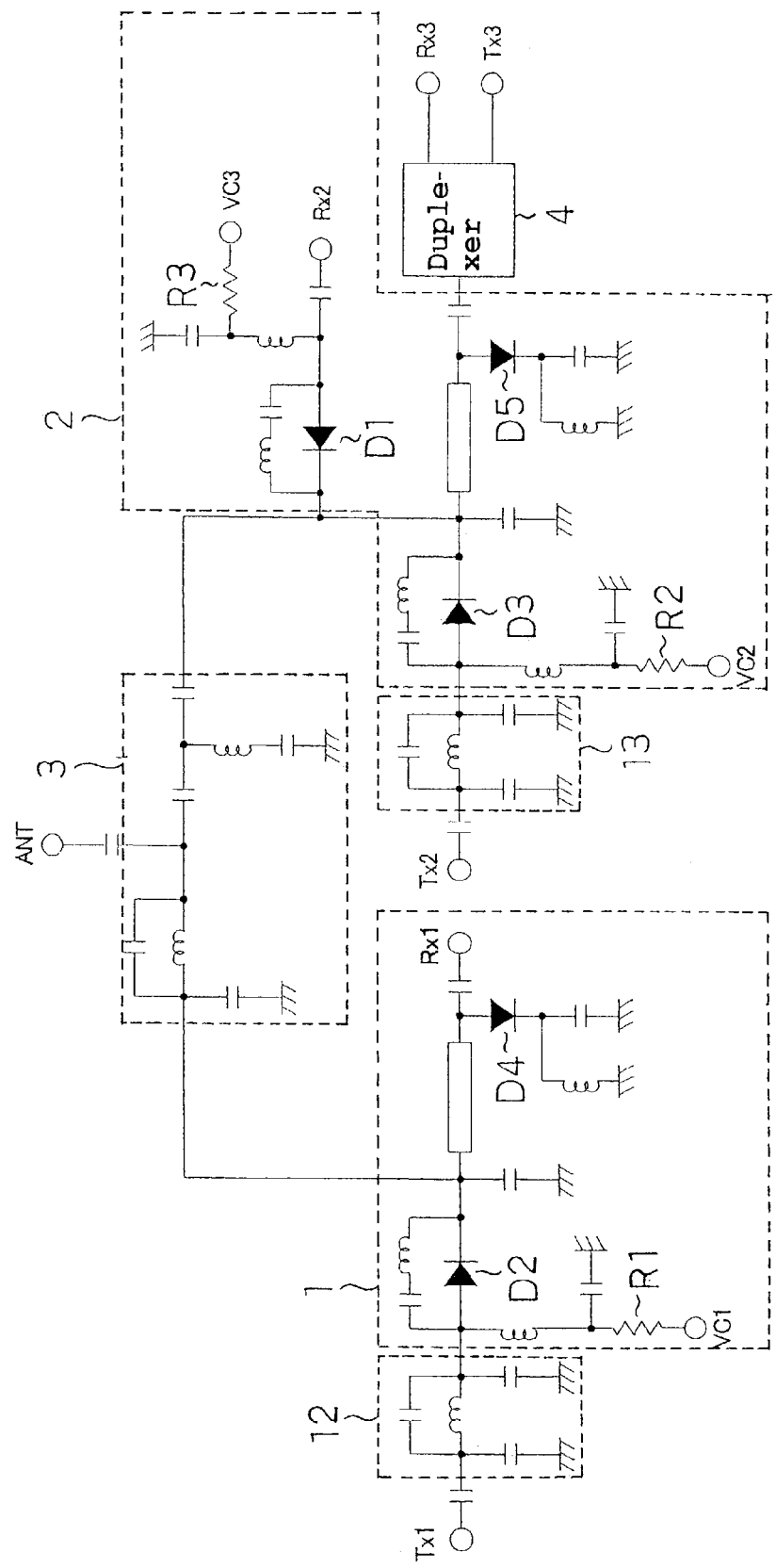
FIG. 4 is a circuit diagram of the 3-frequency branching circuit according to the first embodiment of the present invention.

Next, a circuit configuration of the 3-frequency branching circuit of this embodiment will be described by referring to FIG. 4. Moreover, FIG. 4 is a circuit diagram of the 3-frequency branching circuit according to this embodiment.

The transmitting terminal T x 1 is connected to the antenna side via a diode D2 which is in a forward direction when transmitting. In addition, the receiving terminal R x 1 is connected to the antenna side, and is also grounded via a diode D4 which is in the forward direction. Moreover, a control terminal VC1 is connected to a voltage control portion (omitted in the drawings) via a resistor R1. In addition, a low-pass filter 12 is inserted between the transmitting terminal T x 1 and the anode of diode D2 as a filter of reducing noise (signal distortion) due to amplification when transmitting by utilizing the transmitting terminal T x 1.

The transmitting terminal T x 2 is connected to the antenna side via a diode D3 which is in the forward direction when transmitting. In addition, the receiving terminal R x 2 is connected to the antenna side via a diode D1 which is in the opposite direction (off state) when transmitting by utilizing the transmitting terminal T x 2 (the diode D1 is in the forward direction when receiving by utilizing the receiving terminal R x 2). Moreover, a control terminal VC2 is connected to the voltage control portion (omitted in the drawings) via a resistor R2, and a control terminal VC3 is connected to the voltage control portion (omitted in the drawings) via a resistor R3. In addition, a low-pass filter 13 is inserted between the transmitting terminal T x 2 and the anode of diode D3 as a filter of reducing the noise due to the amplification when transmitting by utilizing the transmitting terminal T x 2.

The internal terminal 23 (refer to FIG. 1) is connected to the duplexer 4, and is also grounded high-frequency-wise via a diode D5 in the forward direction.

Figure 5:
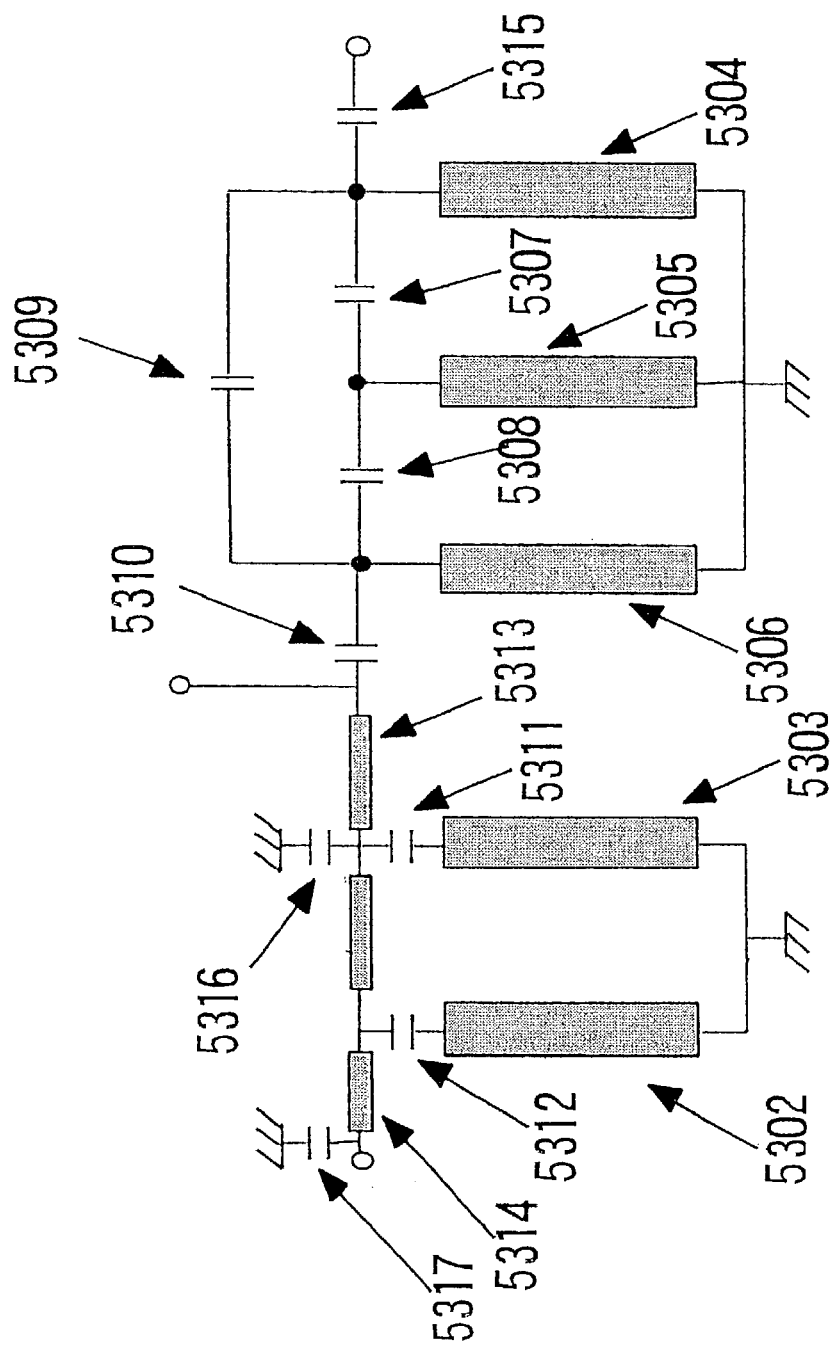
FIG. 5 is an equivalent circuit diagram of a duplexer 4 according to the first embodiment of the present invention.

Here, circuit configuration of the duplexer 4 will be described in detail by referring to FIG. 5. Moreover, FIG. 5 is an equivalent circuit diagram of the duplexer 4 (the duplexer 4 is the substantially same as the duplexer (refer to FIG. 15) in a third embodiment described later).

The duplexer 4 is comprised of a large number of dielectric layers consisting of layers A to H (omitted in the drawings). The layer A has a first ground electrode formed therein. In addition, the layer B has first to fifth resonator electrodes 5302 to 5306 formed therein, and the layer C has first to second capacitor coupling electrodes 5307 to 5308 formed therein. The layer D has third to sixth capacitor coupling electrodes 5309 to 5312 and first to second strip line electrodes 5313 to 5314 formed therein. The layers E to G have seventh to ninth capacitor coupling electrodes 5315 to 5317 formed therein. Furthermore, the layer H has a second ground electrode 318 formed therein.

An electrode to be the transmitting terminal T x 3 of W-CDMA (refer to FIGS. 1 and 4) is connected to the strip line electrode 5314, and is grounded by the ground electrode via the capacitor coupling electrode 5317. The other end of the strip line electrode 5314 is connected to one end of the capacitor coupling electrode 5312, and the capacitor coupling electrode 5312 is connected to the resonator electrode 5302 via the layers C to D. The other end of the capacitor coupling electrode 5312 is connected to one end of the capacitor coupling electrode 5311, and the capacitor coupling electrode 5311 is connected to the resonator electrode 5303 via the layers C to D. The other end of the capacitor coupling electrode 5311 is connected to one end of the strip line electrode 5313, and one end of the strip line electrode 5313 is connected to one end of the capacitor coupling electrode 5316 via the layers E to F. The other end of the capacitor coupling electrode 5316 is grounded by an external electrode. And the other end of the strip line electrode 5313 is connected to an internal terminal 23 (refer to FIG. 1) on the antenna terminal side so as to form a notch filter structure.

An electrode to be the receiving terminal R x 3 of W-CDMA (refer to FIGS. 1 and 4) is connected to one end of the capacitor coupling electrode 5315 The capacitor coupling electrode 5315 is connected to the resonator electrode 5304 via the layers C to E, and the resonator electrode 5304 is connected to the capacitor coupling electrode 5307 via the layer C, and the capacitor coupling electrode 5307 is connected to the resonator electrode 5305 via the layer C. In addition, the resonator electrode 5305 is connected to the capacitor coupling electrode 5308 via the layer C, and the capacitor coupling electrode 5308 is connected to the resonator electrode 5306 via the layer C, and capacitor coupling electrode 5307 is connected to the electrode 5308 via the layer D. The resonator electrode 5306 is connected to the capacitor electrode 5310 via the layers C and D. And the capacitor coupling electrode 5310 is connected to the internal terminal 23 (refer to FIG. 1) on the antenna terminal side so as to form a band-pass filter structure.

Moreover, the transmitting terminal T x 1 (GSM TX) is corresponding to a first transmitting terminal of the present invention, the receiving terminal R x 1 (GSM RX) is corresponding to a first receiving terminal of the present invention, and the switching circuit (transmitting and receiving switching circuit) 1 is corresponding to a first switching circuit of the present invention. In addition, the transmitting terminal T x 2 (DCS TX) is corresponding to a second transmitting terminal of the present invention and the receiving terminal R x 2 (DCS RX) is corresponding to a second receiving terminal of the present invention respectively, and the internal terminal 23 is corresponding to a third internal terminal of the present invention, and the switching circuit (transmitting and receiving switching circuit) 2 is corresponding to a second switching circuit of the present invention. Moreover, the internal terminal 21 to 22 are corresponding to the first and second internal terminals of the present invention respectively, the antenna terminal 20 is corresponding to the antenna terminal of the present invention, and the branching circuit 3 is corresponding to the branching circuit of the present invention. In addition, the transmitting terminal T x 3 (W-CDMA TX) is corresponding to a third transmitting terminal of the present invention, the receiving terminal R x 3 (W-CDMA RX) is corresponding to a third receiving terminal of the present invention, and the duplexer 4 is corresponding to the duplexer of the present invention.

Thus, it is possible to support a system having the TDMA method and the W-CDMA method mixed therein by rendering an antenna switch on the high-frequency band (2 GHz band) side as the switching circuit 2 of 1 input and 3 outputs (SP3T) and connecting the duplexer 4 thereto. Moreover, the internal terminal 23 (refer to FIG. 1) to have the duplexer 4 connected thereto is the terminal grounded via a diode D5 (refer to FIG. 4), and so no diode exists on a signal route for transmitting and receiving of W-CDMA and a low-loss characteristic may be obtained.

The embodiment 1 was described in detail as above.

Moreover, while the first frequency band of the present invention was the one corresponding to the W-CDMA method in the above-mentioned embodiment, it is not limited thereto but may be any frequency band, in short, as far as it is the one of performing simultaneous transmitting and receiving by utilizing the duplexer (for instance, it is possible to support the CDMA method of 800 MHz by connecting the switching circuits 1 and 2 to the internal terminal 22 and 21 respectively and using the duplexer 4 (refer to FIG. 1)).

Figure 6:
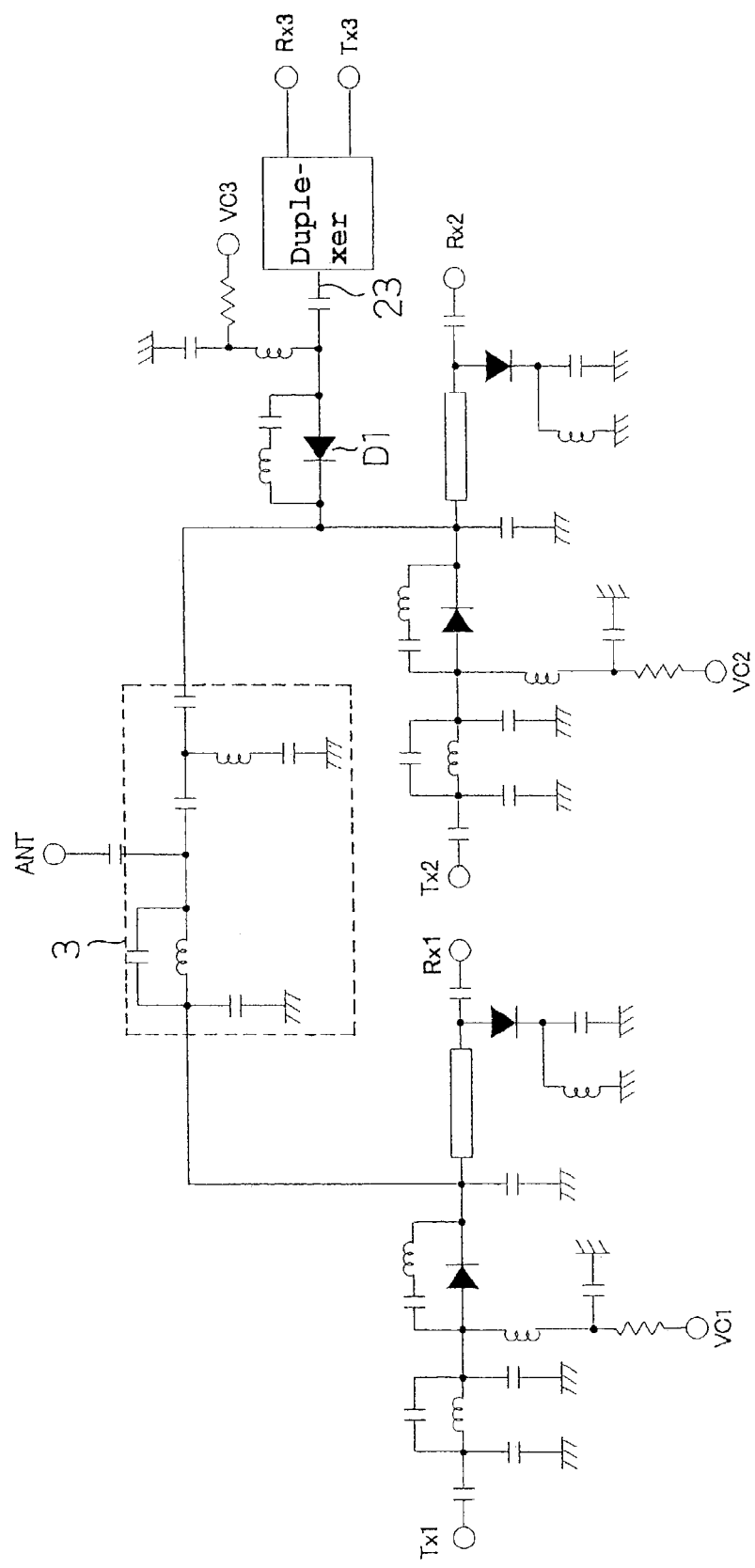
FIG. 6 is a circuit diagram of the 3-frequency branching circuit wherein an internal terminal 23 is connected to branching circuit 3 via a diode D1 according to the present invention.

In addition, the third internal terminal of the present invention was the terminal grounded via the diode D5 (refer to FIG. 4) as well as connected to the branching circuit 3 in this embodiment described above. However, not limiting thereto, but the third internal terminal of the present invention may be the terminal connected to the branching circuit via the diode to be in the forward direction on transmitting and receiving of the first frequency band as shown in FIG. 6 which is the circuit diagram of the 3-frequency branching circuit wherein, for instance, the internal terminal 23 (refer to FIG. 1) is connected to the branching circuit 3 via the diode D1. In such a 3-frequency branching circuit, on transmitting and receiving of W-CDMA for instance, (a) although the signal loss increases a little because the diode D1 exists on the signal route, (b) the occurrence of the signal distortion is reduced because only the diode D3 is the diode to be in the off state.

Figure 7:
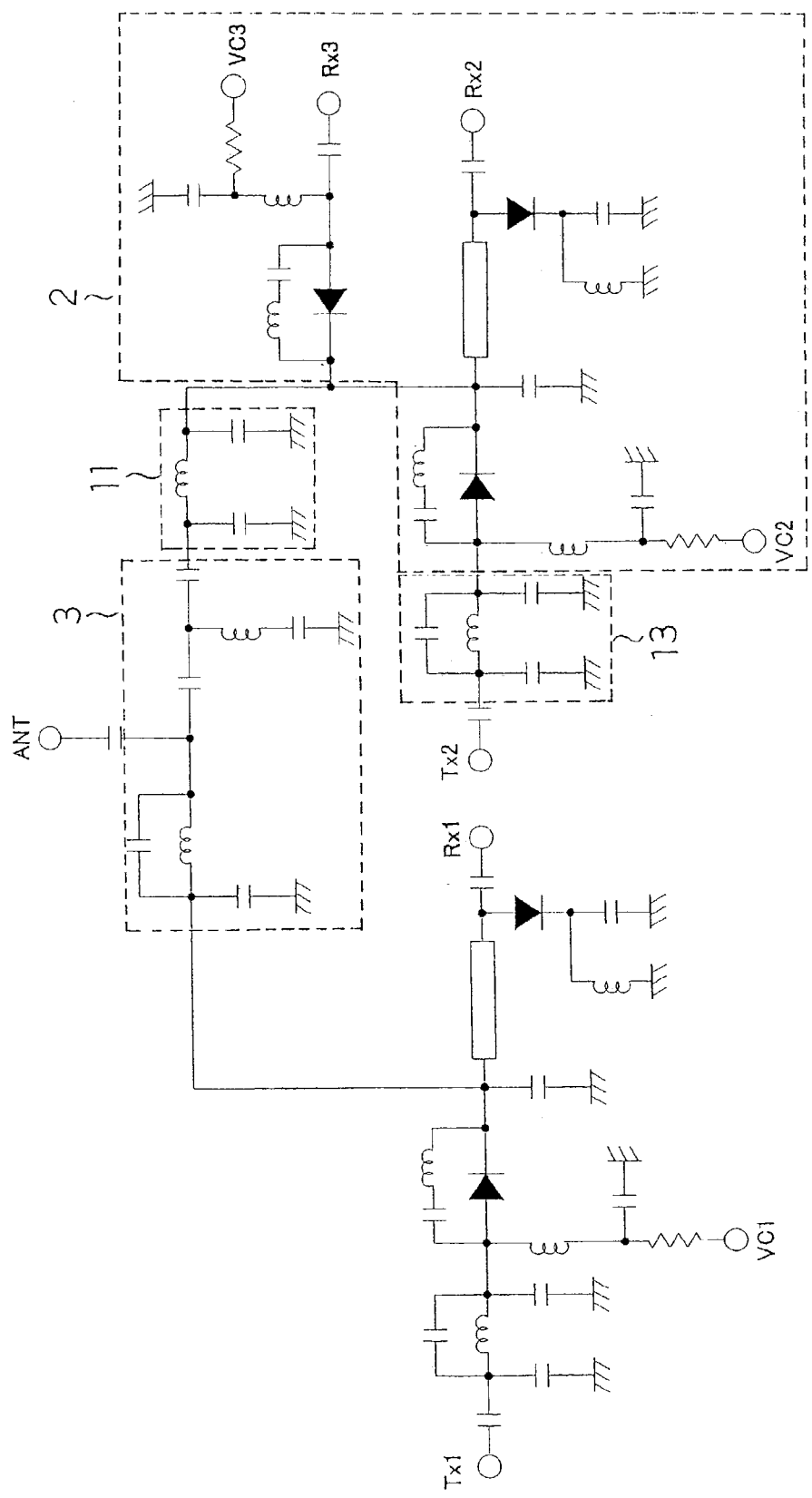
FIG. 7 is an explanatory view of the 3-frequency branching circuit having a low-pass filter 11 inserted between the branching circuit 3 and a switching circuit 2 according to the present invention.

Moreover, as shown in FIG. 7 which is an explanatory view of the 3-frequency branching circuit having a low-pass filter 11 inserted between the branching circuit 3 and a switching circuit 2 (moreover, the duplexer 4 (omitted in the drawing) is connected to the terminal R x 2 or the terminal RX), the 3-frequency branching circuit of the present invention may have the low-pass filter inserted between the branching circuit and the second switching circuit. In such a 3-frequency branching circuit, on transmitting and receiving of DCS for instance, the low-pass filter 11 (a) curbs the signal distortion occurring due to an amplifier (omitted in the drawing) in synergy with the low-pass filter 13, and (b) reduces the signal distortion occurring due to the diode D1 to be in the off state.

Figure 8:
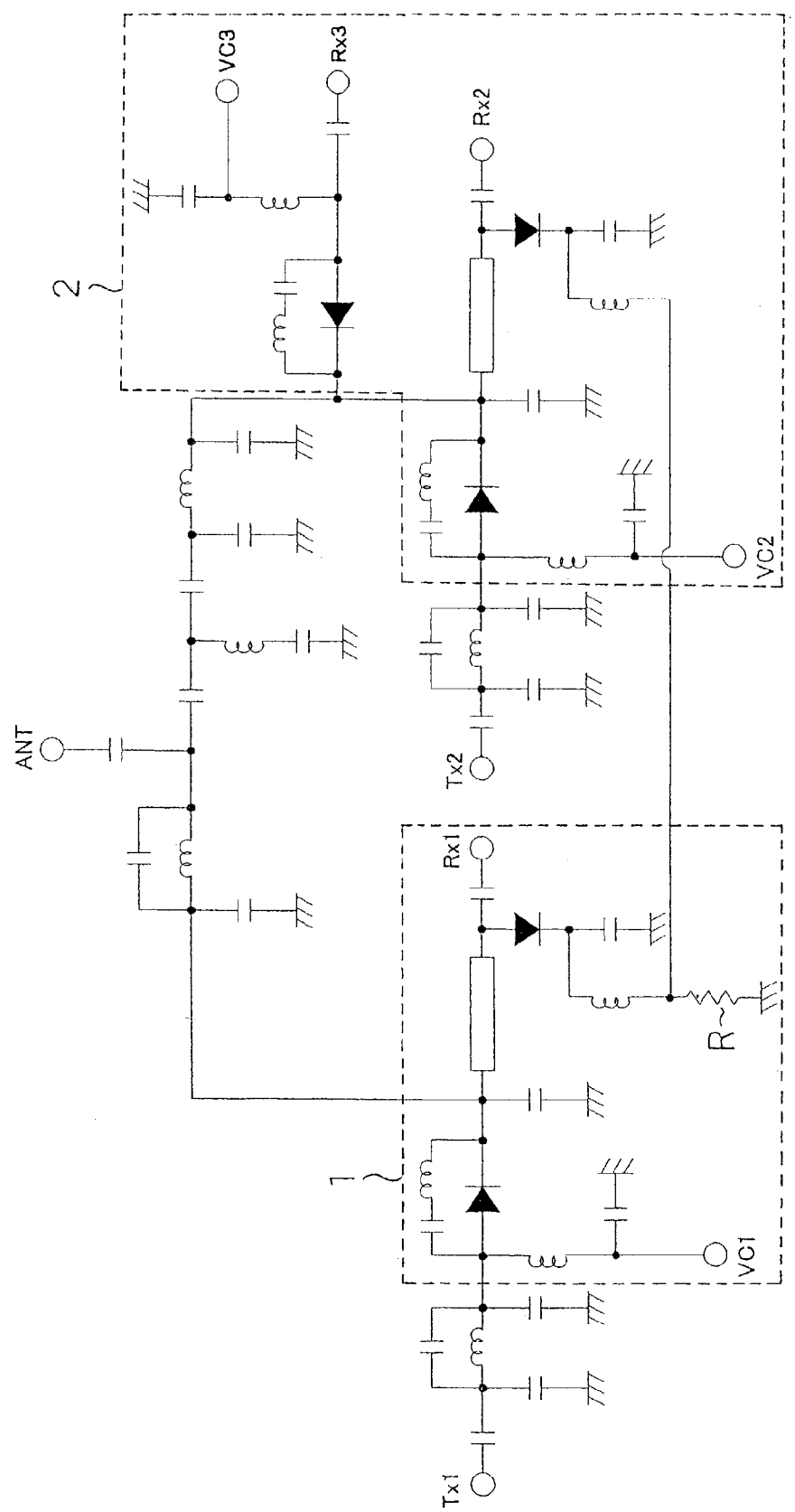
FIG. 8 is an explanatory view of the 3-frequency branching circuit having grounding resistor R shared between the switching circuits 1 and 2 according to the present invention.

In addition, as shown in FIG. 8 which is an explanatory view of the 3-frequency branching circuit having grounding resistor R shared between the switching circuits 1 and 2 (moreover, the duplexer 4 (omitted in the drawing) is connected to the terminal R x 2 or the terminal RX), the 3-frequency branching circuit of the present invention may have grounding resistor shared between the first switching circuit and the second switching circuit (in this case, resistors R1 to R3 (refer to FIG. 1) are unnecessary). In such a 3-frequency branching circuit, on transmitting of GSM (DCS, W-CDMA) for instance, the diodes D1, D3 and D5 (diodes D2 and D4) generates little signal distortion because a reverse bias voltage is applied.

In short, the present invention is the branching circuit having the filter function of passing the transmitting frequency band and the receiving frequency band in each of the first to Nth frequency bands for instance, and is equipped with the first and second internal terminals, the antenna terminal of connecting to the antenna, and the branching circuit having the first filter of passing the n+1-th ($2 \leq n \leq N-1$) to Nth frequency bands between the first internal terminal and the antenna terminal and the second filter of passing the first to nth frequency bands between the second internal terminal and the antenna terminal, the first switching circuit connected to the first internal terminal of switching between the transmitting frequency bands and the receiving frequency bands of the n+1-th to Nth frequency bands, the second switching circuit connected to the second internal terminal of switching between the transmitting frequency bands of the first frequency band and the second to the nth frequency bands and the receiving frequency bands of the second to the nth frequency bands, and the duplexer of branching the transmitting frequency band and the receiving frequency band of the first frequency band.

Moreover, the present invention is the above-mentioned 3-frequency branching circuit characterized in that at least one of the above described plurality of switching circuits includes the diode, for instance.

In addition, the present invention is the above-mentioned 3-frequency branching circuit characterized in that, for instance, the above described first switching circuit has the first diode of which anode is connected to the transmitting circuit side of the above-mentioned third frequency band and cathode is connected to the above described branching circuit, the first strip line of which one end is connected to the anode of the above described first diode and other end is grounded via the first capacitor and also connected to the first control terminal, the second diode of which anode is connected to the receiving circuit side of the above-mentioned third frequency band and cathode is grounded via the second capacitor and a parallel circuit of the first resistor, and the second strip line of which one end is connected to the anode of the above described second diode and other end is connected to the above described branching circuit, and the above described second switching circuit has the third diode of which anode is connected to the transmitting circuit side of the above-mentioned second frequency band and cathode is connected to the above described branching circuit side, the third strip line of which one end is connected to the anode of the above described third diode and other end is grounded via the third capacitor and also connected to the second control terminal, the fourth diode of which anode is connected to the receiving circuit side of the above-mentioned second frequency band and cathode is connected to the above described branching circuit side, and the fourth strip line of which one end is connected to the anode of the above described fourth diode and other end is grounded via the fourth capacitor and connected to the third control terminal, the fifth diode of which anode is connected to the transmitting and receiving circuit side of the above described first frequency band and cathode is grounded via the fifth capacitor and the parallel circuit of the second resistor, and the fifth strip line of which one end is connected to the anode of the above described fifth diode and other end is connected to the above described branching circuit.

In addition, the present invention is the above-mentioned 3-frequency branching circuit wherein the duplexer is connected to the third diode portion, for instance.

Moreover, the present invention is the above-mentioned 3-frequency branching circuit characterized by having at least one low-pass filter between a transmitting circuit terminal of the above described second frequency band and the antenna terminal, for instance.

In addition, the present invention is the above-mentioned 3-frequency branching circuit characterized by having the configuration in which a coaxial type resonator is used for the above described duplexer, for instance.

Moreover, the present invention is the above-mentioned 3-frequency branching circuit characterized by having the configuration in which a layered filter using a dielectric green sheet is used for the above described duplexer, for instance.

Figure 9A:
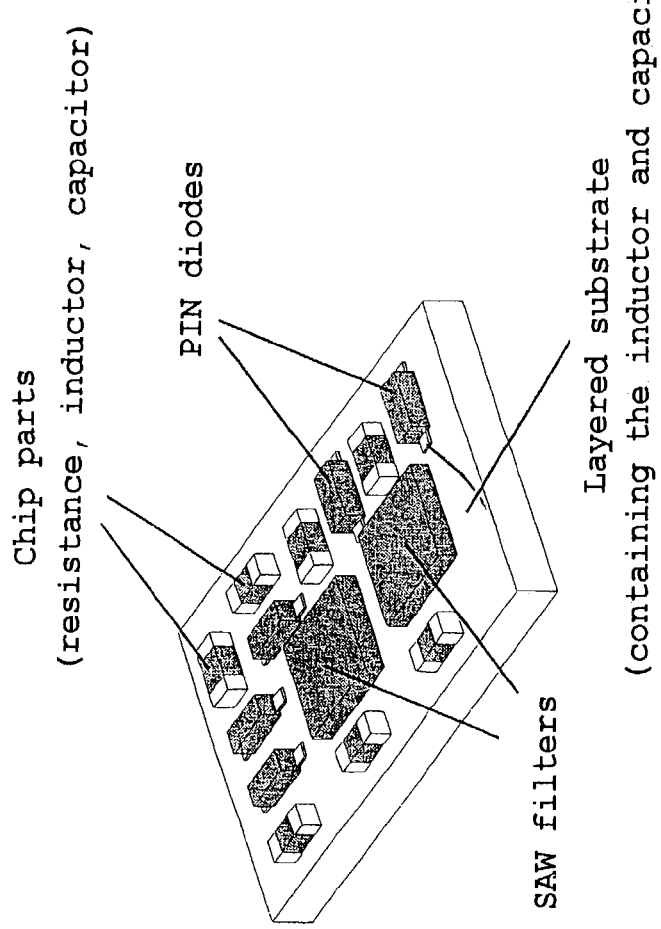
FIG. 9 are an explanatory view (FIG. 9 (*a*)) of the 3-frequency branching circuit (front) equipped with a SAW filter and an explanatory view (FIG. 9 (*b*)) of the same 3-frequency branching circuit (backside) according to the present invention.
Figure 9B:
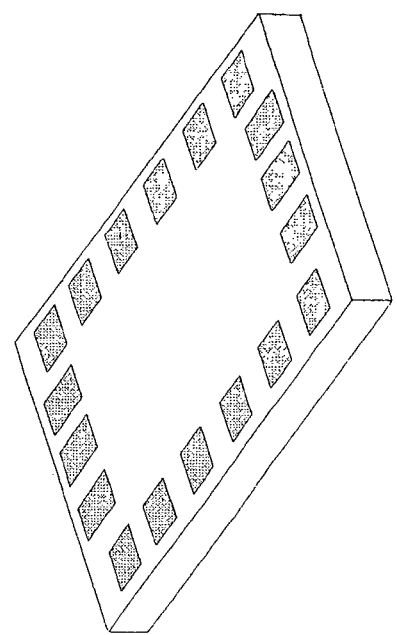

In addition, as shown in FIGS. 9 (*a*) to (*b*), for instance, the present invention is the above-mentioned 3-frequency branching circuit characterized by having the configuration in which a SAW filter is used for the above described duplexer. Moreover, FIG. 9 (*a*) is an explanatory view of the 3-frequency branching circuit (front) equipped with the SAW filter and FIG. 9 (*b*) is an explanatory view of the same 3-frequency branching circuit (backside), for instance.

Moreover, as to the above-mentioned, the duplexer may be constituted as a device different from other device (in this case, the third internal terminal of the present invention is the terminal of connecting the duplexer provided substantially outside the above described other device).

In addition, the present invention is the above-mentioned 3-frequency branching circuit characterized in that the above described duplexer is comprised of the notch filter and band pass filter, and the signal of the transmitting frequency band is transmitted via the notch filter and the signal of the receiving frequency band is transmitted via the band-pass filter, for instance.

Moreover, the present invention is the above-mentioned 3-frequency branching circuit characterized in that the above described notch filter is comprised of the layered filter, and the above described band-pass filter is comprised of the coaxial type resonator, for instance.

In addition, the present invention is the above-mentioned 3-frequency branching circuit characterized in that the above described notch filter is comprised of the layered filter, and the above described band-pass filter is comprised of the SAW filter, for instance.

Moreover, the present invention is the above-mentioned 3-frequency branching circuit characterized in that the above described first filter is a low-pass filter of passing the low frequency band and the above described second filter is a high-pass filter of passing the high frequency band, for instance.

In addition, the present invention is the above-mentioned 3-frequency branching circuit characterized in that the above described first filter is the low-pass filter of passing the low frequency band and the above described second filter is the band pass filter of passing the high frequency band, for instance.

Moreover, the present invention is the above-mentioned 3-frequency branching circuit characterized in that the above described first filter and second filter are comprised of multilayered products using the dielectric green sheets, for instance.

In addition, the present invention is the above-mentioned 3-frequency branching circuit characterized in that the above described first switching circuit and/or the second switching circuit are/is constituted by mounting a switching element on the multilayered product using the dielectric green sheets, for instance.

Moreover, the present invention is the above-mentioned 3-frequency branching circuit characterized in that the above described duplexer and multilayered product are formed by dielectrics mutually having different dielectric constants, for instance.

Figure 10A:
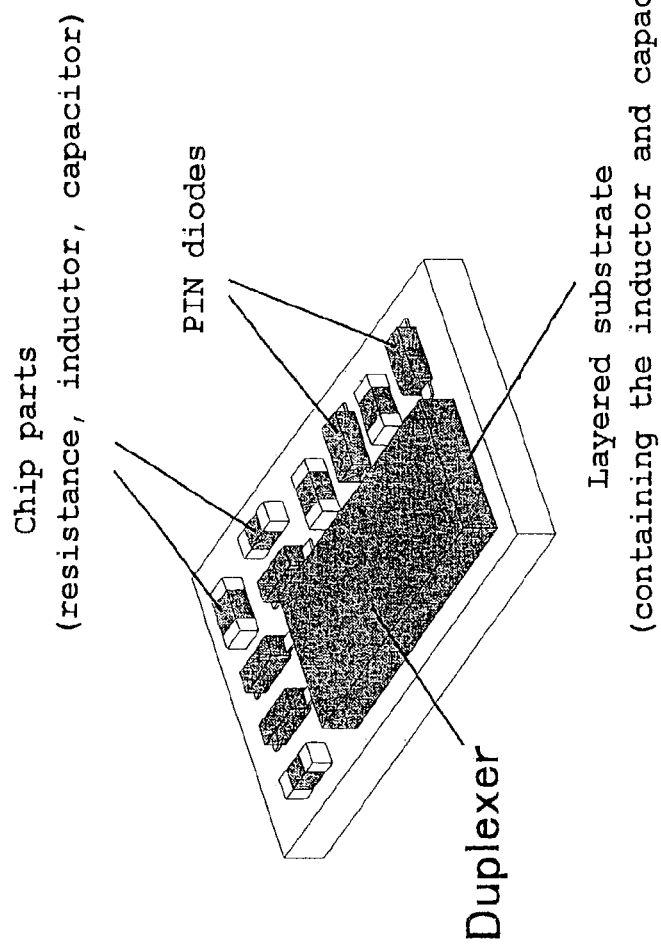
FIG. 10 are an explanatory view (FIG. 10 (*a*)) of the 3-frequency branching circuit (front) equipped with a duplexer on a multilayered product and an explanatory view (FIG. 10 (*b*)) of the same 3-frequency branching circuit (backside) according to the present invention.
Figure 10B:
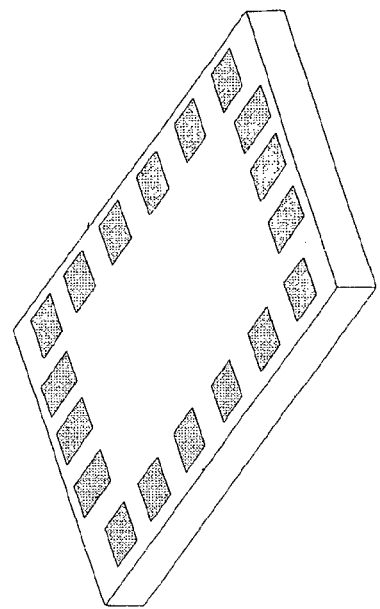

In addition, as shown in FIGS. 10 (*a*) to (*b*), the present invention is the above-mentioned 3-frequency branching circuit characterized by having the configuration in which the above described duplexer is mounted on the multilayered product, for instance. Moreover, FIG. 10 (*a*) is an explanatory view of the 3-frequency branching circuit (front) equipped with a duplexer on a multilayered product and FIG. 10 (*b*) is an explanatory view of the same 3-frequency branching circuit (backside), for instance.

Figure 11B:
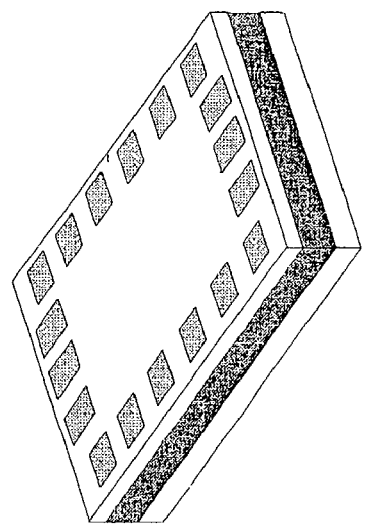
FIG. 11 are an explanatory view (FIG. 11 (*a*)) of the 3-frequency branching circuit (front) equipped with a duplexer inside a multilayered product and an explanatory view (FIG. 11 (*b*)) of the same 3-frequency branching circuit (backside) according to the present invention.
Figure 11A:
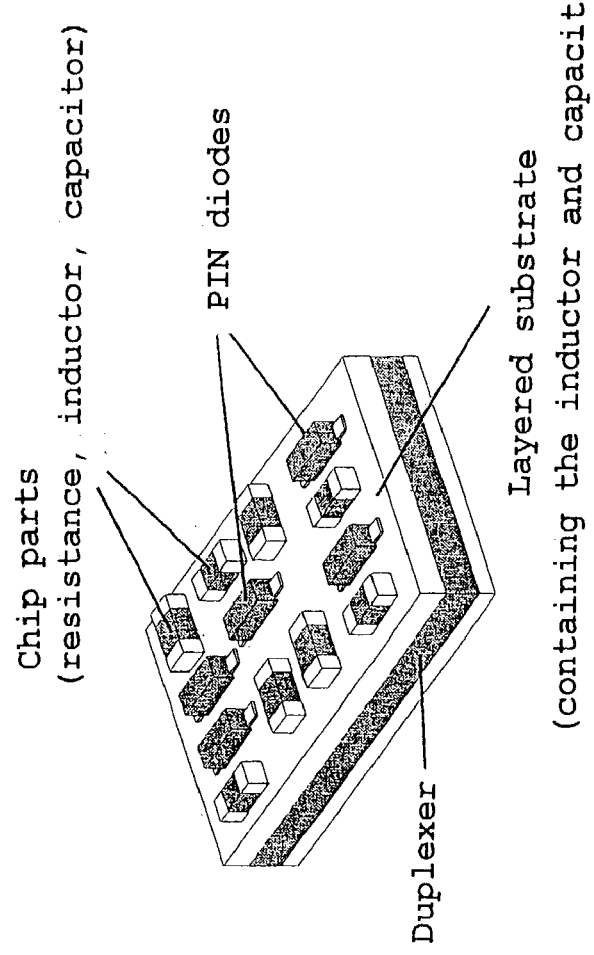

Moreover, as shown in FIGS. 11 (*a*) to (*b*), the present invention is the above-mentioned 3-frequency branching circuit characterized in that the above described duplexer is formed inside the above described multilayered product, for instance. Incidentally, FIG. 11 (*a*) is an explanatory view of the 3-frequency branching circuit (front) equipped with the duplexer in the multilayered product and FIG. 11 (*b*) is an explanatory view of the same 3-frequency branching circuit (backside).

In addition, the present invention is the above-mentioned 3-frequency branching circuit characterized by having the configuration in which an FET switch is used for at least one of the above described first and second switching circuits, for instance.

Moreover, the present invention is the above-mentioned 3-frequency branching circuit characterized by being a system method in which, of the above described plurality of frequency bands, the frequency band passing through the duplexer performs the simultaneous transmitting and receiving, for instance.

In addition, the present invention is radio communication equipment characterized by having an antenna of transmitting and receiving the signal, the above-mentioned 3-frequency branching circuit of inputting and outputting the above described transmitted and received signal, and signal processing device which processes the signal branched by the above-mentioned 3-frequency branching circuit, for instance.

Second Embodiment

Hereafter, the 3-frequency branching circuit according to a second embodiment of the present invention will be described by referring to FIG. 12, while taking as a concrete example the circuit of the filter of passing the transmitting frequency bands and receiving frequency bands of the three frequencies of the GSM and DCS methods used in the mobile communication in Europe and the W-CDMA method expected to be introduced in future. Moreover, FIG. 12 shows a circuit diagram of the 3-frequency branching circuit according to the second embodiment.

Figure 12:
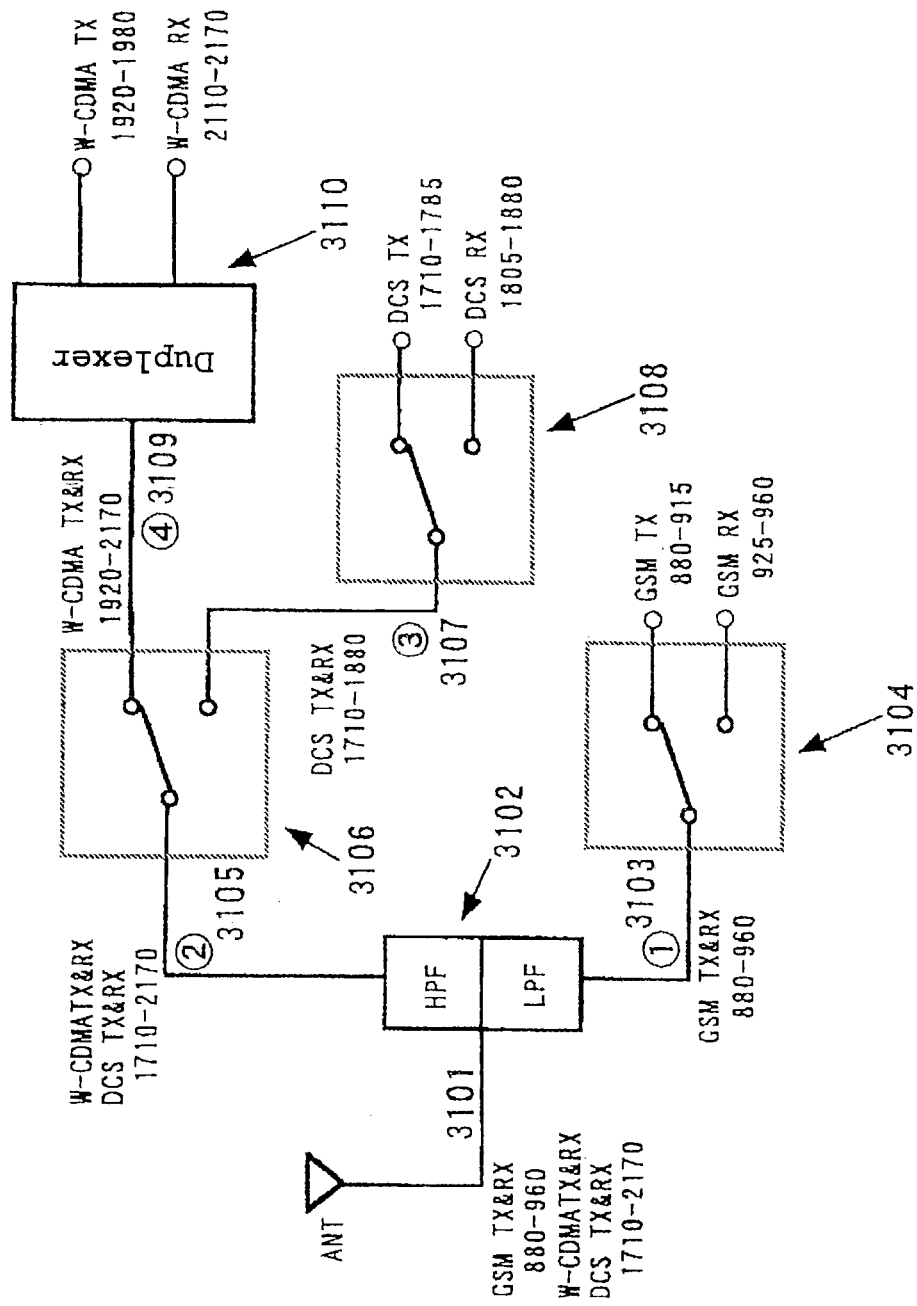
FIG. 12 is a circuit diagram of the 3-frequency branching circuit according to a second embodiment of the present invention.

In FIG. 12, a transmitting and receiving signal from an antenna terminal 3101 as a common terminal of the transmitting and receiving of GSM, the transmitting and receiving of W-CDMA and the transmitting and receiving of DCS are branched into the transmitting and receiving signal of GSM, the transmitting and receiving signal of W-CDMA and the transmitting and receiving signal of DCS by a branching circuit 3102 comprised of the low-pass filter and high-pass filter having a function of branching the low frequency band and high frequency band.

The transmitting and receiving signal of GSM branched by the branching circuit 3102 is branched into the transmitting signal and receiving signal of GSM by a first transmitting and receiving switching circuit 104 from a first internal terminal 3103 (refer to FIG. 12 <1>) which is a transmitting and receiving terminal of GSM. The transmitting and receiving signal of W-CDMA and the transmitting and receiving signal of DCS branched by the branching circuit 3102 are branched into the transmitting and receiving signal of W-CDMA and the transmitting and receiving signal of DCS by a 2-frequencieswitching circuit 3106 from a second internal terminal 3105 (refer to FIG. 12 <2>) which is a 2-frequency common terminal.

The transmitting and receiving signal of DCS branched by the 2-frequencieswitching circuit 3106 is branched into the transmitting signal and receiving signal of DCS by a second transmitting and receiving switching circuit 3108 from a third internal terminal 3107 (refer to FIG. 12 <3>) which is the transmitting and receiving terminal of DCS. The transmitting and receiving signal of W-CDMA branched by the 2-frequencieswitching circuit 3106 is branched into the transmitting signal and receiving signal of W-CDMA by a duplexer 3110 from a fourth terminal 3109 (refer to FIG. 12 <4>) which is the transmitting and receiving terminal of W-CDMA.

As described above, this embodiment allows simultaneous receiving of GSM and W-CDMA or DCS by performing the following around the antenna so as to implement the 3-frequency branching circuit including the W-CDMA method requiring the simultaneous transmitting and receiving. (1) To use the branching circuit of branching the low frequency band and high frequency band to branch the transmitting and receiving signal of GSM from the transmitting and receiving signal of W-CDMA and the transmitting and receiving signal of DCS, (2) and branch the transmitting and receiving signal of W-CDMA and the transmitting and receiving signal of DCS on the 2-frequencieswitching circuit. Furthermore, the transmitting and receiving switching circuits 3104 and 3108 do not pass a current for receiving of GSM and DCS, leading to reduction in current consumption.

Moreover, it has the configuration wherein two 2-frequencieswitching circuits (the 2-frequencieswitching circuit 3106 and the second transmitting and receiving switching circuit 3108) are passed through between the second internal terminal 3105 and the third internal terminal 3107 which is the transmitting and receiving terminal of DCS, so that isolation between W-CDMA terminals (W-CDMA TX and W-CDMA RX) and DCS terminals (DCS TX and DCS RX) is improved and distortion characteristics to mutual transmitting signals are also improved.

Third Embodiment

Next, the configuration and operation of the 3-frequency branching circuit according to a third embodiment of the present invention will be described. As the configuration and operation of the 3-frequency branching circuit according to this embodiment are almost the same as those in the above-mentioned first embodiment, the configuration and operation of the multilayered product of the 3-frequency branching circuit will be described as a major difference by referring to FIGS. 13 to 15. Moreover, FIG. 13 is a perspective view of the multilayered product constituting the 3-frequency branching circuit according to this embodiment, FIG. 14 is an exploded perspective view thereof, and FIG. 15 is an equivalent circuit diagram thereof.

Figure 13:
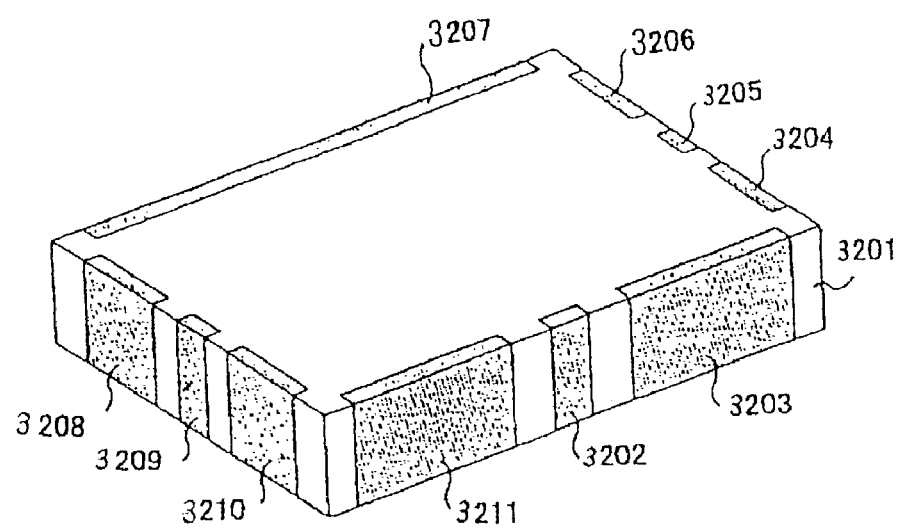
FIG. 13 is a perspective view of a layered type duplexer according to a third embodiment of the present invention.

In FIG. 13, a multilayered product 3201 using the dielectric green sheet of the 3-frequency branching circuit is formed by a large number of the dielectric layers, and external electrodes 3202, 3203, 3204, 3205, 3206, 3207, 3208, 3209, 3210 and 3211 are provided on and in the proximity of the sides of the multilayered product 3201.

Figure 14:
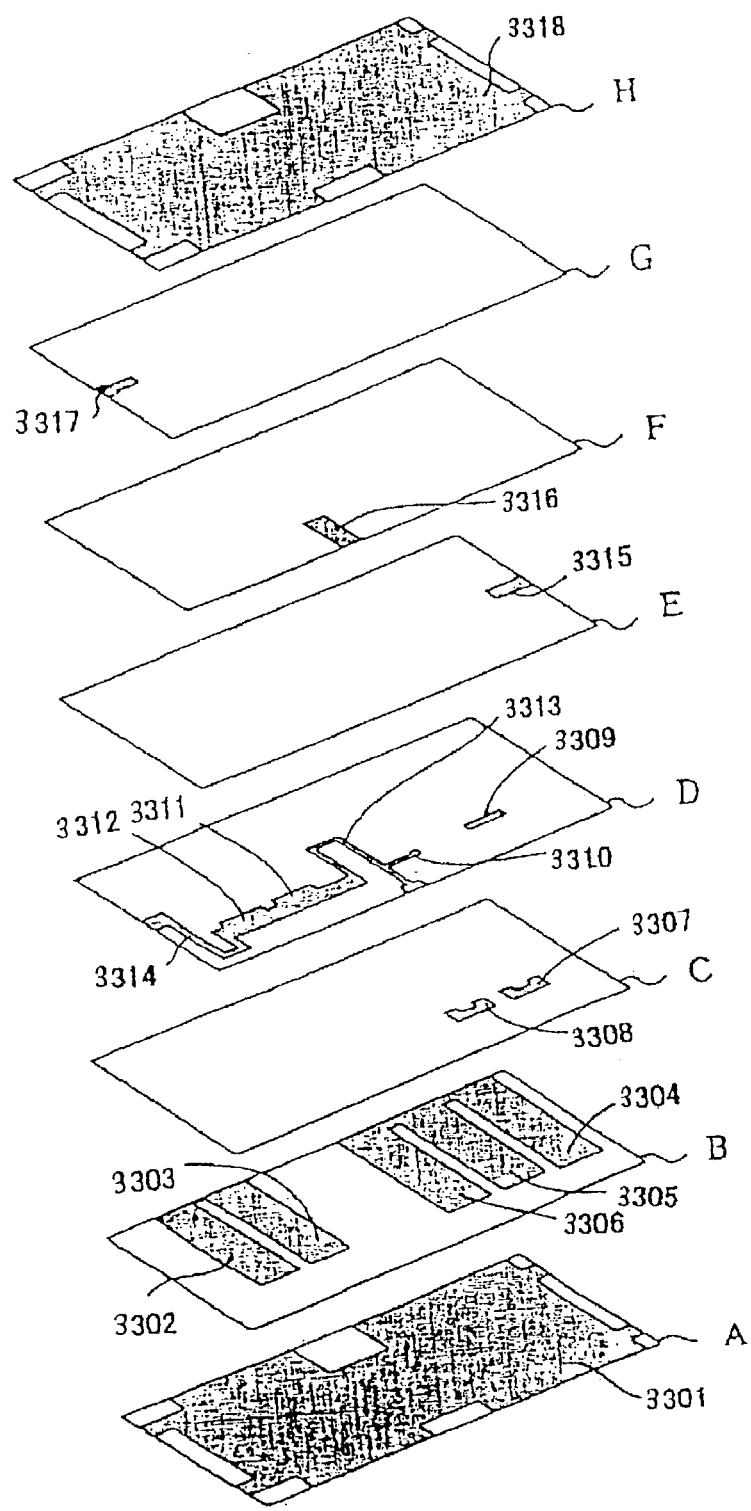
FIG. 14 is an exploded perspective view of the layered type duplexer according to the third embodiment of the present invention.
Figure 15:
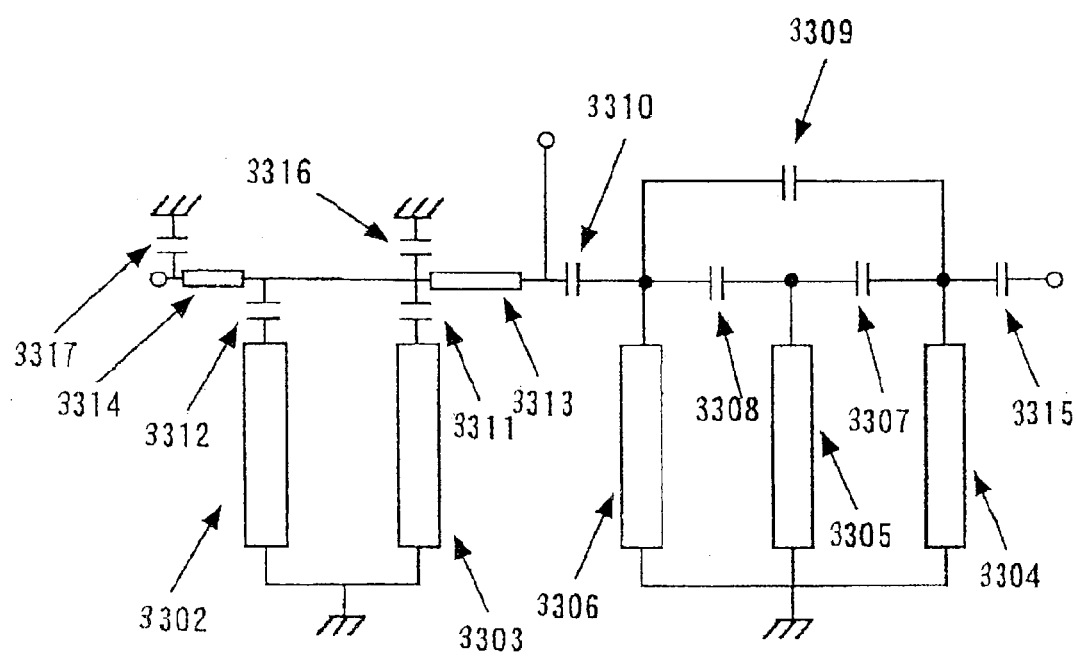
FIG. 15 is an equivalent circuit diagram of the layered type duplexer according to the third embodiment of the present invention.

In FIG. 14, the layer A has a first ground electrode 3301 formed therein. In addition, the layer B has first, second, third, fourth and fifth resonator electrodes 3302, 3303, 3304, 3305 and 3306 formed therein, and furthermore, the layer C has first and second capacitor coupling electrodes 3307 and 3308 formed therein. Moreover, the layer D has third, fourth, fifth and sixth capacitor coupling electrodes 3309, 3310, 3311, 3312 and first and second strip line electrodes 3313 and 3314 formed therein. The layers E, F and G have seventh, eighth and ninth capacitor coupling electrodes 3315, 3316 and 3317 formed therein. Furthermore, the layer H has a second ground electrode 3318 formed therein.

An external electrode 3209 is the transmitting terminal of W-CDMA, and the strip line electrode 3314 is connected thereto. Furthermore, a capacity is formed between the ground electrode 3318 and the external electrode 3209 to which the capacitor coupling electrode 3317 is connected.

One end of the strip line electrode 3314 is connected to one end of the capacitor coupling electrode 3312, and the capacitor coupling electrode 3312 is connected to the resonator electrode 3302 via the layers C and D. The other end of the capacitor coupling electrode 3312 is connected to one end of the capacitor coupling electrode 3311, and the capacitor coupling electrode 3311 is connected to the resonator electrode 3303 via the layers C and D.

The other end of the capacitor coupling electrode 3311 is connected to one end of the strip line electrode 3313, one end of the strip line electrode 3313 is connected to one end of the capacitor coupling electrode 3316 via the layers E and F, and the other end of the capacitor coupling electrode 3316 is connected to the ground by the external electrode 3207, and furthermore, the other end of the strip line electrode 3313 is connected to the external electrode 3202 (refer to FIG. 13) which is a fourth terminal (refer to FIG. 12 <4>) so as to form the notch filter structure.

The external electrode 3205 (refer to FIG. 13) is the receiving terminal of W-CDMA, and is connected to one end of the capacitor coupling electrode 3315. The capacitor coupling electrode 3315 is connected to the resonator electrode 3304 via the layers C, D and E, and the resonator electrode 3304 is connected to the capacitor coupling electrode 3307 via the layer C, and the capacitor coupling electrode 3307 is connected to the resonator electrode 3305 via the layer C. In addition, the resonator electrode 3305 is connected to the capacitor coupling electrode 3308 via the layer C, and the capacitor coupling electrode 3308 is connected to the resonator electrode 3306 via the layer C, and furthermore, the capacitor coupling electrode 3307 is connected to the capacitor coupling electrode 3308 via the layer D.

The resonator electrode 3306 is connected to the capacitor coupling electrode 3310 via the layers C and D, and the capacitor coupling electrode 3310 is connected to the external electrode 3202 (refer to FIG. 13) which is the fourth terminal (refer to FIG. 12 <4>) so as to form the band-pass filter structure. Moreover, the external electrodes 3203, 3204, 3206, 3207, 3208, 3210 and 3211 (refer to FIG. 13) form the ground electrode.

As described above, according to this embodiment, it is possible to implement a smaller size by using a layered type duplexer, and a coupling portion of the notch filter passing the transmitting frequency band of W-CDMA can curb waves by two to three times more than the transmitting frequency band of W-CDMA by implementing the low-pass filter structure of LC. As above, this embodiment was described in detail by taking the layered type duplexer as an example, but it is also possible to implement the smaller size by using the SAW (surface acoustic wave) filter as the duplexer.

Figure 16:
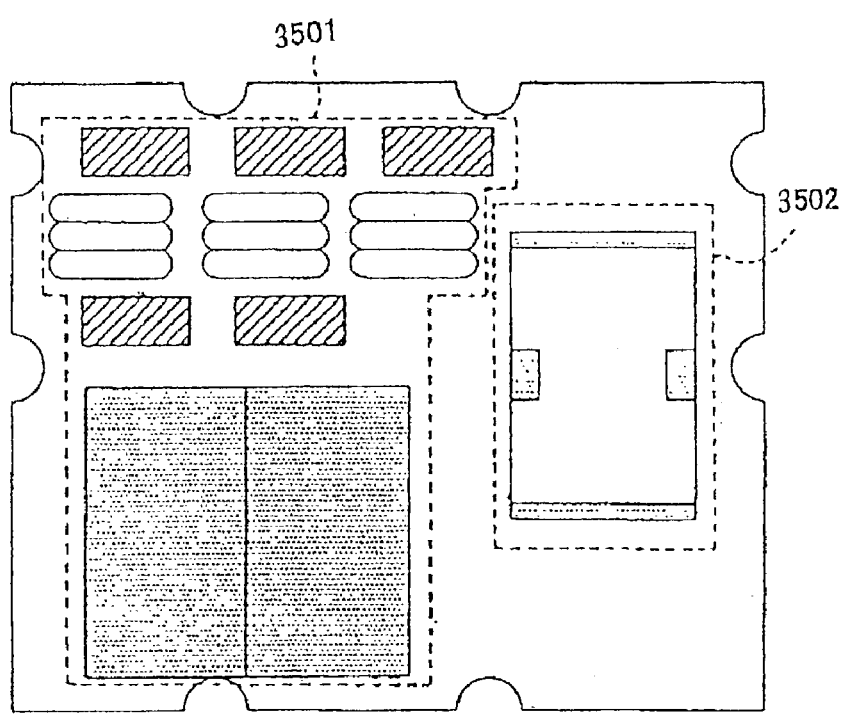
FIG. 16 is a top view of the duplexer combining a coaxial type and the layered type described in the third embodiment of the present invention.

Moreover, as shown in FIG. 16, it is possible, according to requirement characteristics, to reduce losses by using a combined configuration of constituting with the coaxial type resonator a notch filter 3501 passing the transmitting frequency band of W-CDMA of the duplexer and constituting with a multilayered product 3502 the band pass filter passing the receiving frequency band of W-CDMA of the duplexer.

Figure 17:
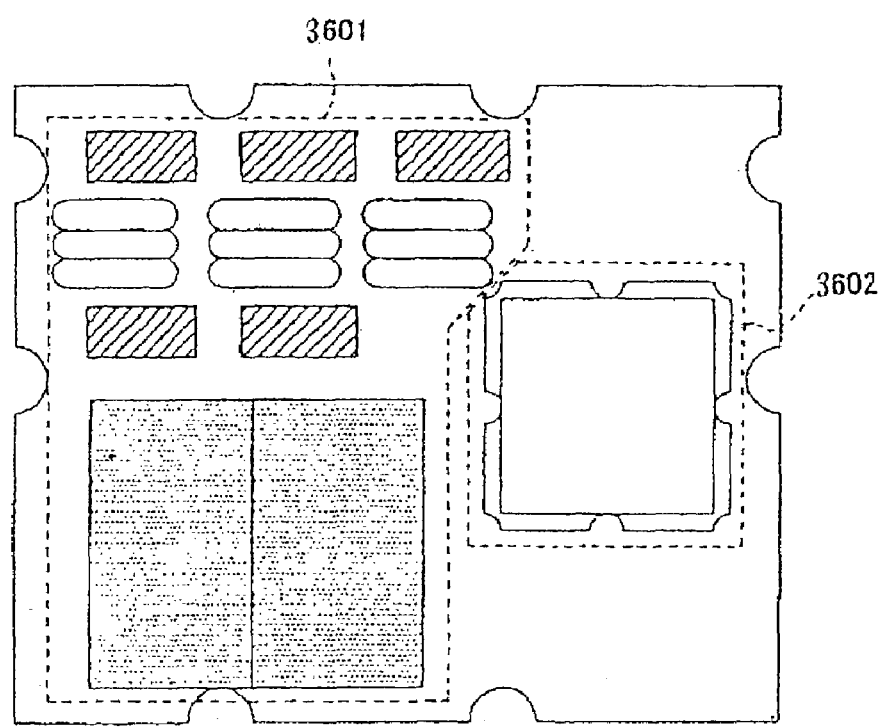
FIG. 17 is a top view of the duplexer combining the coaxial type and a SAW filter described in the third embodiment of the present invention.

In addition, as shown in FIG. 17, it is possible, according to the requirement characteristics, to implement the smaller size by using the combined configuration of constituting with the coaxial type resonator a notch filter 3601 passing the transmitting frequency band of W-CDMA of the duplexer and constituting with a surface acoustic wave filter 3602 the band pass filter passing the receiving frequency band of W-CDMA of the duplexer.

Figure 18:
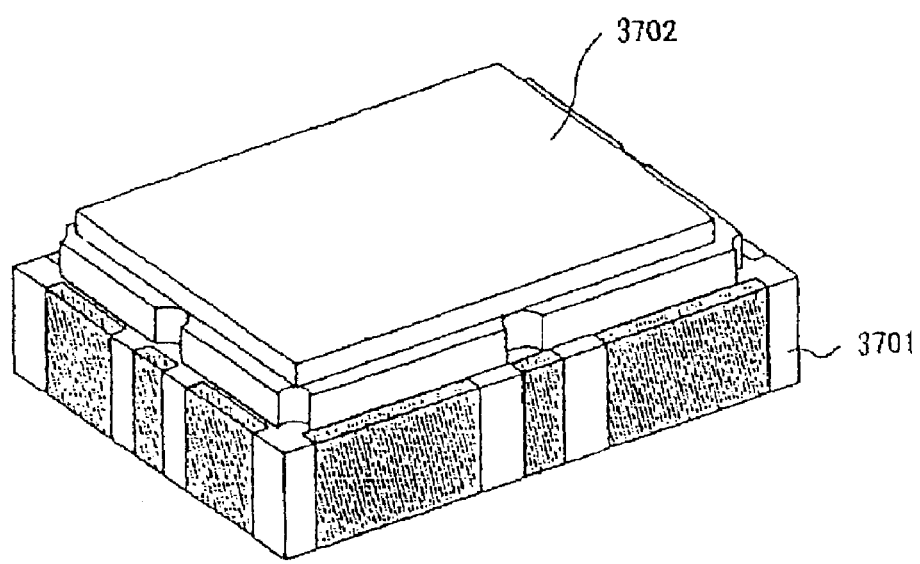
FIG. 18 is a top view of the duplexer combining the layered type and SAW filter described in the third embodiment of the present invention.

Furthermore, as shown in FIG. 18, it is possible, according to the requirement characteristics, to implement the smaller size by using the combined configuration of constituting with the multilayered product a notch filter 3701 passing the transmitting frequency band of W-CDMA of the duplexer and constituting with a surface acoustic wave filter 3702 the band pass filter passing the receiving frequency band of W-CDMA of the duplexer.

Fourth Embodiment

Next, the configuration and operation of the 3-frequency branching circuit according to a fourth embodiment of the present invention will be described. As the configuration and operation of the 3-frequency branching circuit according to the fourth embodiment of the present invention are almost the same as those in the above-mentioned first embodiment, the following will be described as the major differences therefrom by referring to FIG. 19. (1) A branching filter of branching the low frequency band in the transmitting and receiving frequency band of GSM and the high frequency band in the transmitting and receiving frequency band of W-CDMA and DCS, (2) the switching circuit of switching among the transmitting and receiving frequency bands of W-CDMA, DCS and GSM, (3) the switching circuit of switching between the transmitting frequency band of DCS and the receiving frequency band of DCS, and (4) a connection terminal of the duplexer of switching between the transmitting frequency band of W-CDMA and the receiving frequency band of W-CDMA. Moreover, FIG. 19 is an equivalent circuit diagram of the 3-frequency branching circuit according to this embodiment.

Figure 19:
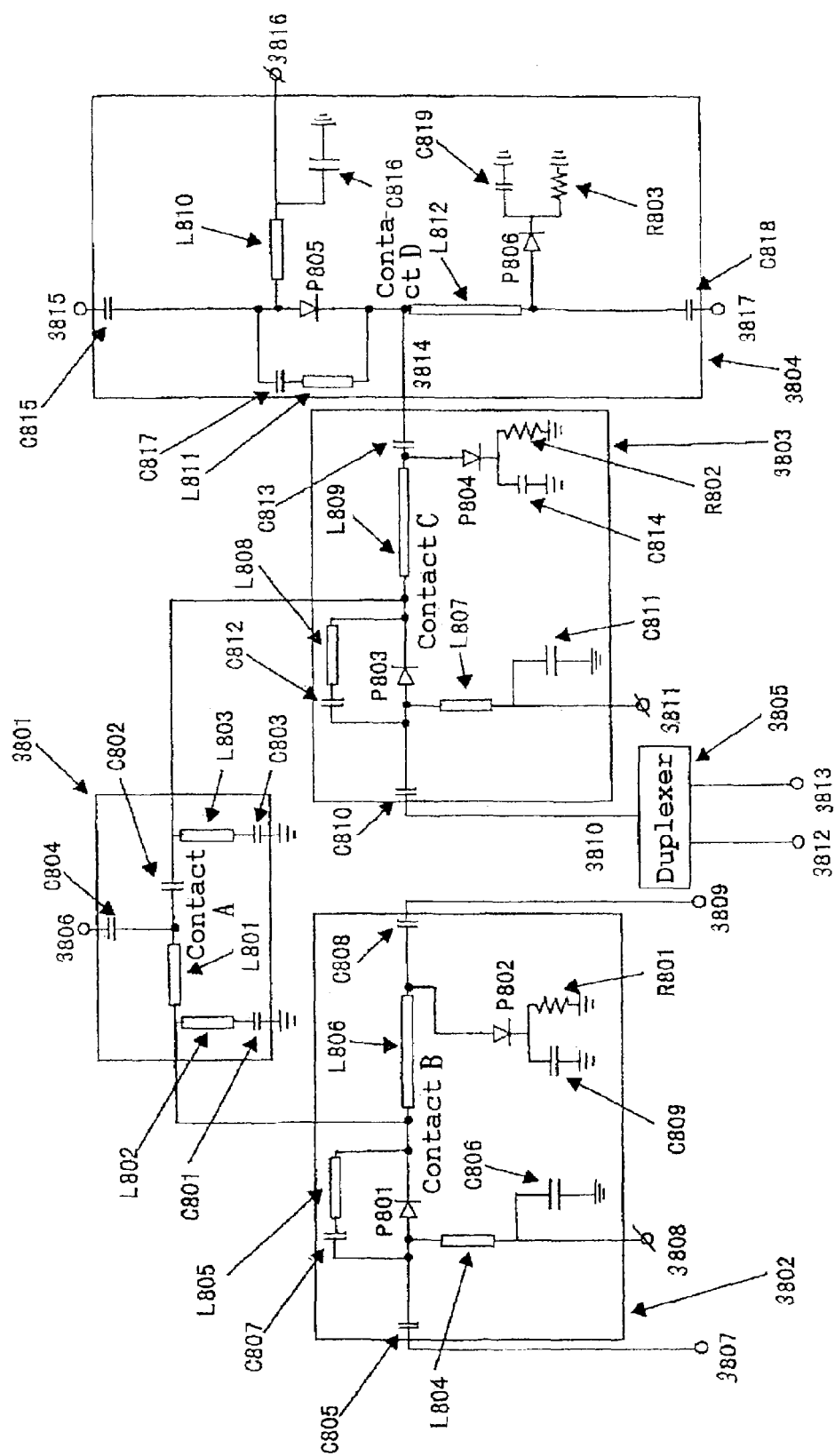
FIG. 19 is an equivalent circuit diagram of the 3-frequency branching circuit according to a fourth embodiment of the present invention.

In FIG. 19, reference numeral 3801 denotes a first branching circuit, 3802 denotes a first transmitting and receiving switching circuit, 3803 denotes the 2-frequencieswitching circuit, 3804 denotes a second transmitting and receiving switching circuit, and 3805 denotes the duplexer. A first strip line L801, a second strip line L802 and a first capacitor C801 in FIG. 19 form the low-pass filter of passing a low frequency as shown by a waveform 1 in the example of a branching circuit characteristic shown in FIG. 20, and the second strip line L802 and first capacitor C801 are serially connected to the ground side so as to form an attenuation pole point A (refer to FIG. 20).

Figure 20:
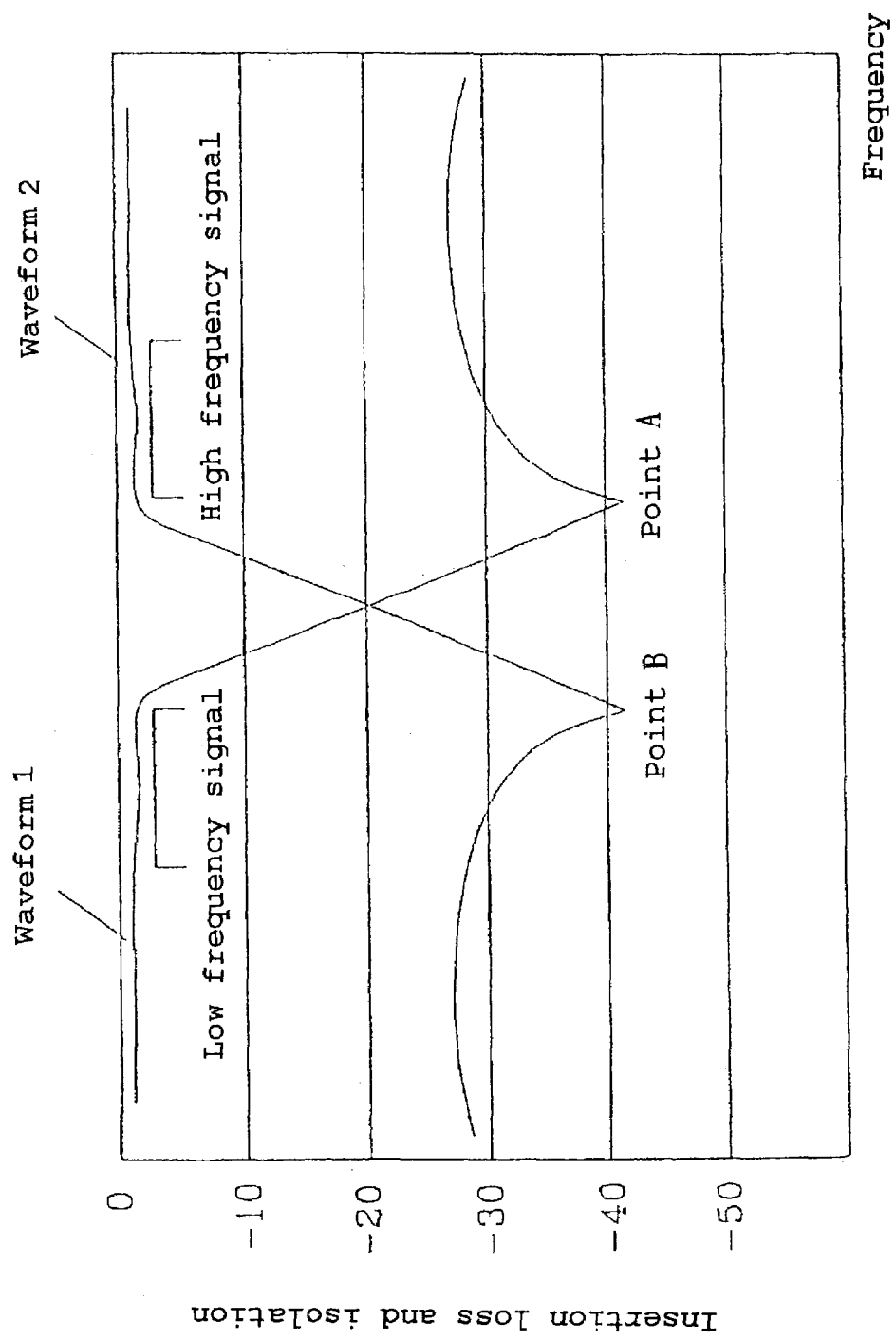
FIG. 20 is a diagram showing an example of a characteristic of a branching filter according to the fourth embodiment of the present invention.

In addition, a second capacitor C802, a third strip line L803 and a third capacitor C803 in FIG. 19 form the high-pass filter of passing a high frequency as shown by a waveform 2 in FIG. 20, and the third strip line L803 and third capacitor C803 are serially connected to the ground side so as to form an attenuation pole point B (refer to FIG. 20).

A connection is made via such low-pass filter and high-pass filter to an antenna terminal 3806 which is the common terminal of the transmitting and receiving signal of GSM, the transmitting and receiving signal of W-CDMA and the transmitting and receiving signal of DCS so that, when transmitting or receiving a low frequenciesignal such as the transmitting and receiving signal of GSM, isolation is well provided to the low frequenciesignal by the attenuation pole B on the high-pass filter side from a contact A (refer to FIG. 19) and the signal will not be leaked to the high-pass filter side.

Moreover, when transmitting or receiving a high frequenciesignal such as the transmitting and receiving signals of W-CDMA and those of DCS, the isolation is well provided to the high frequenciesignal by the attenuation pole A on the low-pass filter side from the contact A (refer to FIG. 19) and the signal will not be leaked to the low-pass filter side. To be more specific, the branching circuit 3801 provides the function of branching the low frequenciesignal such as the transmitting and receiving signal of GSM and the high frequenciesignal such as the transmitting and receiving signal of W-CDMA and that of DCS. In addition, the contact A (refer to FIG. 19) is connected to the antenna terminal 3806 via a fourth capacitor C804. The transmitting and receiving signal of GSM branched by the branching circuit 3801 is transmitted via a contact B (refer to FIG. 19) of the first transmitting and receiving switching circuit.

A transmitting circuit side terminal 3807 of GSM in the first transmitting and receiving switching circuit 3802 is connected to the anode of a first diode P801 via a fifth capacitor C805, and the cathode of the diode P801 is connected to the contact B. Furthermore, one end of a fourth strip line L804 is connected between the anode of the first diode P801 and the fifth capacitor C805, and the other end of the fourth strip line L804 is connected to a first control terminal 3808.

The other end of the fourth strip line L804 is further connected to the ground via a sixth capacitor C806, and the first control terminal 3808 plays a role of switching the transmitting and receiving signal of one of transmitting and receiving change-over switches of GSM. In addition, the first diode P801 has a fifth strip line L805 and a series circuit of a seventh capacitor C807 connected in parallel thereto.

A receiving circuit side terminal 3809 of GSM in the first transmitting and receiving switching circuit 3802 is connected to the anode of a second diode P802 via an eighth capacitor C808. The cathode of the second diode P802 is connected to the ground via a resistor R801 and a parallel circuit of a ninth capacitor C809. The anode of the second diode P802 is further connected to one end of a sixth strip line L806, and the other end of the sixth strip line L806 is connected to the contact B (refer to FIG. 19). The transmitting and receiving signals of W-CDMA and DCS branched by the branching circuit 3801 are transmitted via a contact C (refer to FIG. 19) of the first transmitting and receiving switching circuit.

A fourth terminal 3810 on the W-CDMA side of the 2-frequenciesswitching circuit 3803 is connected to the anode of a third diode P803 via a tenth capacitor C810, and the cathode of the third diode P803 is connected to the contact C. Furthermore, one end of a seventh strip line L807 is connected between the anode of the third diode P803 and the tenth capacitor C810, and the other end of the seventh strip line L807 is connected to a second control terminal 3811.

The other end of the seventh strip line L807 is further connected to the ground via an eleventh capacitor C811, and the second control terminal 3811 plays a role of switching between the W-CDMA transmitting and receiving signal and the DCS transmitting and receiving signal. In addition, the third diode P803 further has an eighth strip line L808 and a series circuit of a twelfth capacitor C812 connected in parallel thereto. Moreover, the internal terminal 3810 is connected to the duplexer 3805, and the duplexer 3805 is connected to a W-CDMA transmitting side terminal 3812 and a receiving side terminal 3813.

An internal terminal 3814 on the DCS side in the 2-frequenciesswitching circuit 3803 is connected to the anode of a fourth diode P804 via a thirteenth capacitor C813, and the cathode of the fourth diode P804 is connected to the ground via a resistor R802 and the parallel circuit of a fourteenth capacitor C814. In addition, the anode of the fourth diode P804 is further connected to one end of a ninth strip line L809, and the other end of the ninth strip line L809 is connected to the contact C (refer to FIG. 19). The transmitting and receiving signal of DCS branched by the 2-frequenciesswitching circuit 3803 is transmitted via a contact D (refer to FIG. 19) of the second transmitting and receiving switching circuit.

A transmitting circuit side terminal 3815 of DCS of the second transmitting and receiving switching circuit 3804 is connected to the anode of a fifth diode P805 via a fifteenth capacitor C815, and the cathode of the fifth diode P805 is connected to the contact D. Furthermore, one end of a tenth strip line L810 is connected between the anode of the fifth diode P805 and the fifteenth capacitor C815, and the other end of the tenth strip line L810 is connected to a third control terminal 3816. The other end of the tenth strip line L810 is further connected to the ground via a sixteenth capacitor C816, and the third control terminal 3816 plays a role of switching between the transmitting and receiving of the DCS. In addition, the fifth diode P805 further has an eleventh strip line L811 and the series circuit of a seventeenth capacitor C817 connected in parallel thereto.

A receiving circuit side terminal 3817 of DCS in the second transmitting and receiving switching circuit 3804 is connected to the anode of a sixth diode P806 via an eighteenth capacitor C818. The cathode of the sixth diode P806 is connected to the ground via a resistor R803 and a parallel circuit of a nineteenth capacitor C819. The anode of the sixth diode P806 is further connected to one end of a twelfth strip line L812, and the other end of the twelfth strip line L812 is connected to the contact D (refer to FIG. 19).

The transmitting and receiving signal of W-CDMA branched by the 2-frequency branching circuit 3803 is transmitted to the duplexer 3805 via the internal terminal 3810 on the W-CDMA side. As a configuration of the duplexer, it is possible to render the 3-frequency branching circuit smaller-size and reduce the losses by implementing the configuration shown in the second embodiment.

Moreover, the same results can be obtained by adding inductance elements instead of the resistors R801, R802 and R803 and putting the resistors R801, R802 and R803 between the fourth strip line L804 and the first control terminal 3808, between the seventh strip line L807 and the second control terminal 3811, and between the tenth strip line L810 and the third control terminal 3816 respectively.

In the case of transmitting by GSM, the first diode P801 and second diode P802 will be in the on state by applying a positive voltage to the first control terminal 3808. At this time, the capacitors C804, C805, C806 and C808 cut a DC component, and so the current does not run to each terminal. A current value can be controlled by rendering the resistor R801 variable, and the signal transmitted from a transmitting terminal 3807 is not transmitted to the receiving side because impedance of the sixth strip line L806 becomes an infinite size due to the second diode P802 connected to the ground side.

Moreover, as the inductance component of the second diode P802 resonates with the capacitor C809, it is possible to render the impedance infinite when seeing the receiving side from the contact B at the transmitting frequency of the transmitting signal, and the transmitting signal is transmitted to the antenna terminal 3806 through the low-pass filter of the branching circuit 3801.

Next, on receiving, the first diode P801 and second diode P802 are in the off state because no voltage is applied to the first control terminal 3808 so that the signal is transmitted to the receiving side of GSM. At this time, as there is a capacitance component of the first diode P801, the receiving signal is not always transmitted from the antenna to the receiving terminal 3809, and so the capacitance component of the first diode P801 is resonated with the fifth strip line L805. It is thereby possible to take the isolation of the transmitting terminal 3807 satisfactorily from the contact A at the receiving frequency of the receiving signal so that the receiving signal can be transmitted from the antenna terminal 3806 to the receiving terminal 3809 of GSM via the low-pass filter.

Next, the cases of branching the transmitting and receiving signal of W-CDMA or that of DCS will be described. The third diode P803 and the fourth diode P804 will be in the on state by applying the positive voltage to the second control terminal 3811. At this time, the capacitors C810, C811, C812 and C813 cut the DC component, and so the current does not run to each terminal.

A current value can be controlled by rendering the resistor R802 variable, and the signal transmitted and received from the fourth terminal 3810 on the W-CDMA side is not transmitted to the DCS side because impedance of the ninth strip line L809 becomes infinite due to the fourth diode P804 connected to the ground side.

At this time, the inductance component of the fourth diode P804 resonates with the capacitor C814, it is possible to render the impedance infinite when seeing the DCS side from the contact C at the frequency of W-CDMA, and the transmitting and receiving signal of W-CDMA is transmitted to the antenna terminal 3806 through the high-pass filter of the branching circuit 3801. The internal terminal 3810 on the W-CDMA side is connected to the duplexer 3805, and the duplexer 3805 is connected to the transmitting side terminal 3812 and the receiving side terminal 3813 of W-CDMA, allowing the simultaneous transmitting and receiving by W-CDMA.

In addition, on operation of DCS, no voltage is applied to the second control terminal 3811 so that the third diode P803 and the fourth diode P804 are in the off state, and the transmitting and receiving signal of DCS is transmitted to the antenna terminal 3806 via the high-pass filter of the branching circuit 3801. At this time, as there is the capacitance component of the third diode P803, the transmitting and receiving signal of DCS is not always transmitted to the antenna terminal 3806, and so the capacitance component of the third diode P803 is resonated with the eighth strip line L808. It is thereby possible to take the isolation of the internal terminal 3810 on the W-CDMA side satisfactorily from the contact C against the receiving frequency of the transmitting and receiving signal of DCS so that the transmitting and receiving signal of DCS can be efficiently transmitted from the antenna terminal 3806 via the high-pass filter of the branching circuit 3801.

In the case of transmitting by DCS, the fifth diode P805 and sixth diode P806 will be in the on state by applying the positive voltage to the third control terminal 3814. At this time, the capacitors C815, C816, C817 and C818 cut the DC component, and so the current does not run to each terminal. The current value can be controlled by rendering the resistor R803 variable, and the signal transmitted from the transmitting terminal 3815 is not transmitted to the receiving side because the impedance of the twelfth strip line L812 becomes infinite due to the sixth diode P806 connected to the ground side. Moreover, as the inductance component of the sixth diode P806 resonates with the capacitor C819, it is possible to render the impedance infinite when seeing the receiving side from the contact D at the transmitting frequency of the transmitting signal, and the transmitting signal is transmitted to the antenna terminal 3806 through the 2-frequencieswitching circuit 3803 and the high-pass filters of the branching circuit 3801.

Next, on receiving, the fifth diode P805 and sixth diode P806 are in the off state because no voltage is applied to the third control terminal 3816 so that the signal is transmitted to the receiving side of DCS.

At this time, as there is a capacitance component of the fifth diode P805, the receiving signal is not always transmitted from the antenna to the receiving terminal 3816, and so the capacitance component of the fifth diode P805 is resonated with the eleventh strip line L811. It is thereby possible to take the isolation of the transmitting terminal 3815 satisfactorily from the contact D at the receiving frequency of the receiving signal so that the receiving signal can be transmitted from the antenna terminal 3806 to the receiving terminal 3809 of DCS via the high-pass filter of the branching circuit 3801 and the 2-frequencieswitching circuit 3803.

Moreover, in the case of transmitting and receiving by DCS, no voltage is applied to the second control terminal 3811 as previously mentioned.

As described above, as for the transmitting and receiving signal of GSM, the transmitting and receiving signal of W-CDMA and the transmitting and receiving signal of DCS, this embodiment allows the simultaneous receiving of GSM and W-CDMA or DCS and also the simultaneous transmitting and receiving of W-CDMA by providing the branching circuit comprised of the low-pass filter of passing the low frequency and the high-pass filter of passing the high frequency immediately below the antenna terminal and placing the 2-frequencieswitching circuit on the terminal on the high frequencieside, and after the branching, the duplexer on the W-CDMA side, and the transmitting and receiving switching circuit on the DCS side.

In addition, it is possible to eliminate undesired signals by two or three times of the waves of the transmitting frequency bands of the W-CDMA and DCS by using the band pass filter for the high-pass filter portion of the branching circuit 3801.

Figure 21:
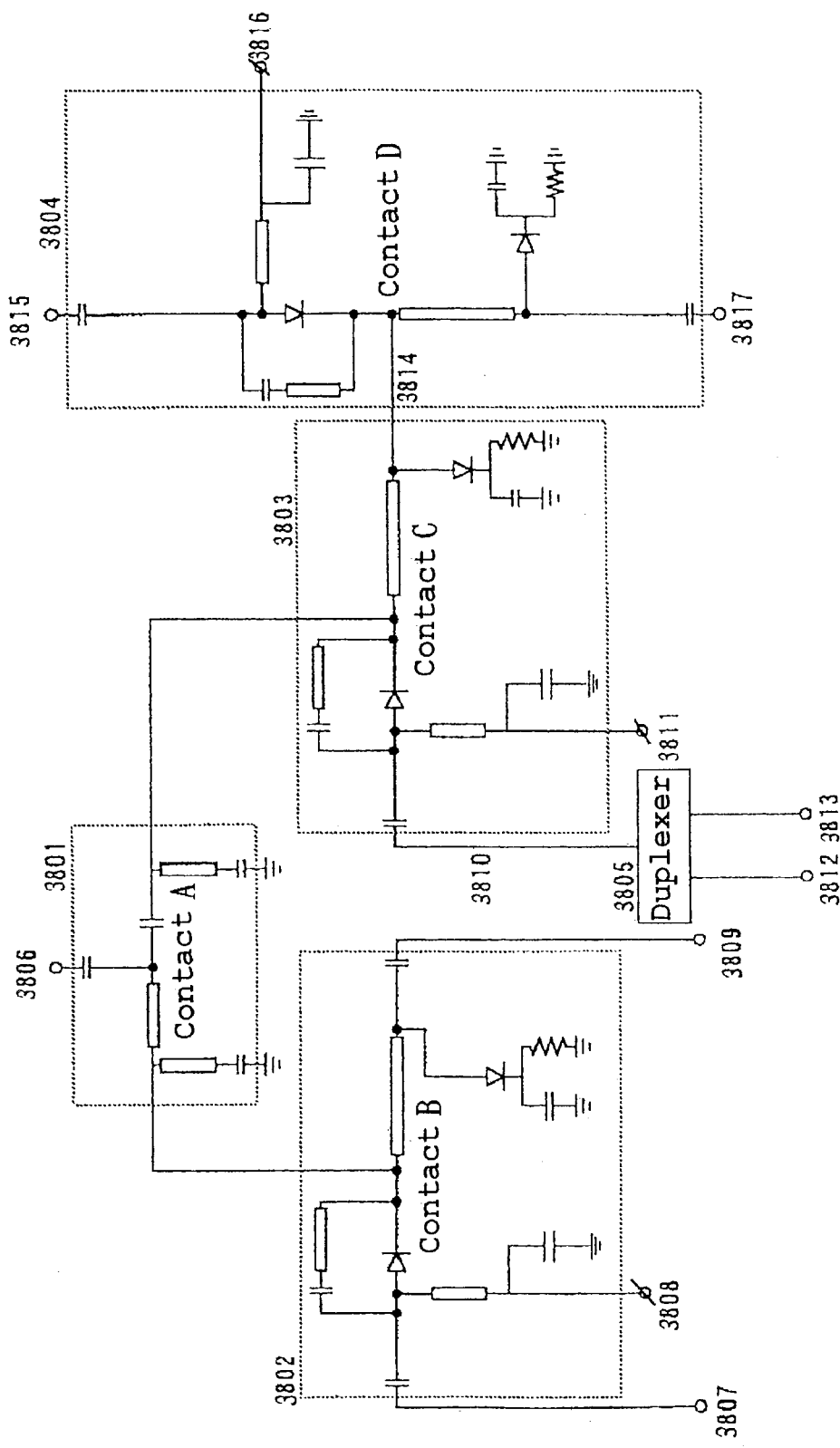
FIG. 21 is an equivalent circuit diagram of another form of the 3-frequency branching circuit according to the fourth embodiment of the present invention.

Moreover, the 3-frequency branching circuit may have the configuration as shown in FIG. 21. The difference from FIG. 19 is that the 2-frequencieswitching circuit 3803 is directly connected with the second transmitting and receiving switching circuit 3804 not via the thirteenth capacitor C813. In this case, when transmitting W-CDMA, the positive voltage is applied to the second control terminal 3811 and the reverse bias voltage is provided to the fifth diode P805 without cutting a direct current, so that the distortion generated by applying high power to the fifth diode P805 when it is off is improved. In addition, when transmitting DCS, the positive voltage is applied to the third control terminal 3814 and the reverse bias voltage is provided to the third diode P803 without cutting the direct current, so that the distortion generated by applying the high power to the third diode P803 when it is off is improved.

Figure 22:
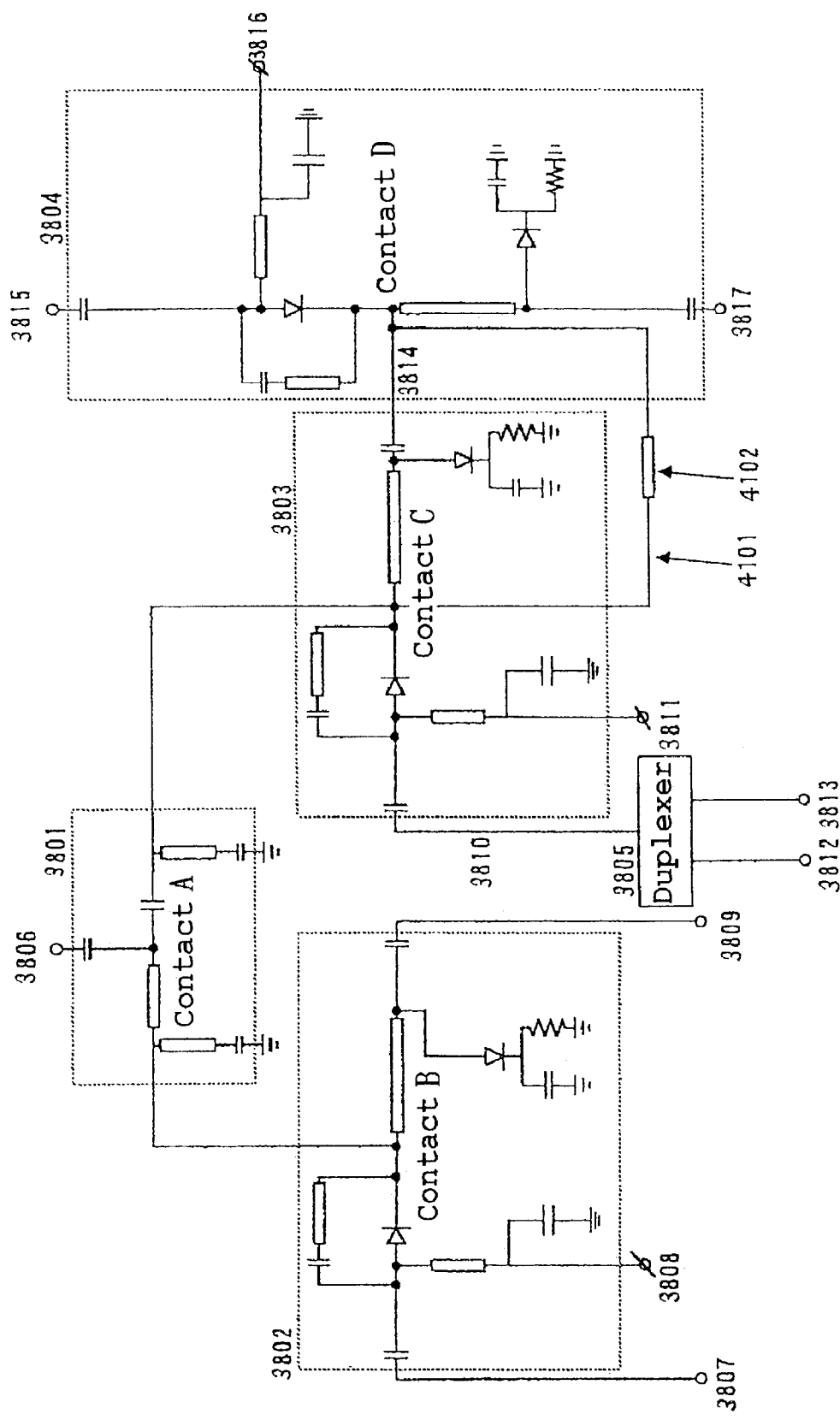
FIG. 22 is an equivalent circuit diagram of another form of the 3-frequency branching circuit according to the fourth embodiment of the present invention.

Moreover, as for this configuration, the same effect can be obtained, as shown in FIG. 22, by connecting the contact C to the contact D via a strip line 4101. In this case, the strip line 4101 has the function, as a choke coil, of blocking leaking of the signal of the frequency on the W-CDMA side to the DCS side.

Fifth Embodiment

Figure 23:
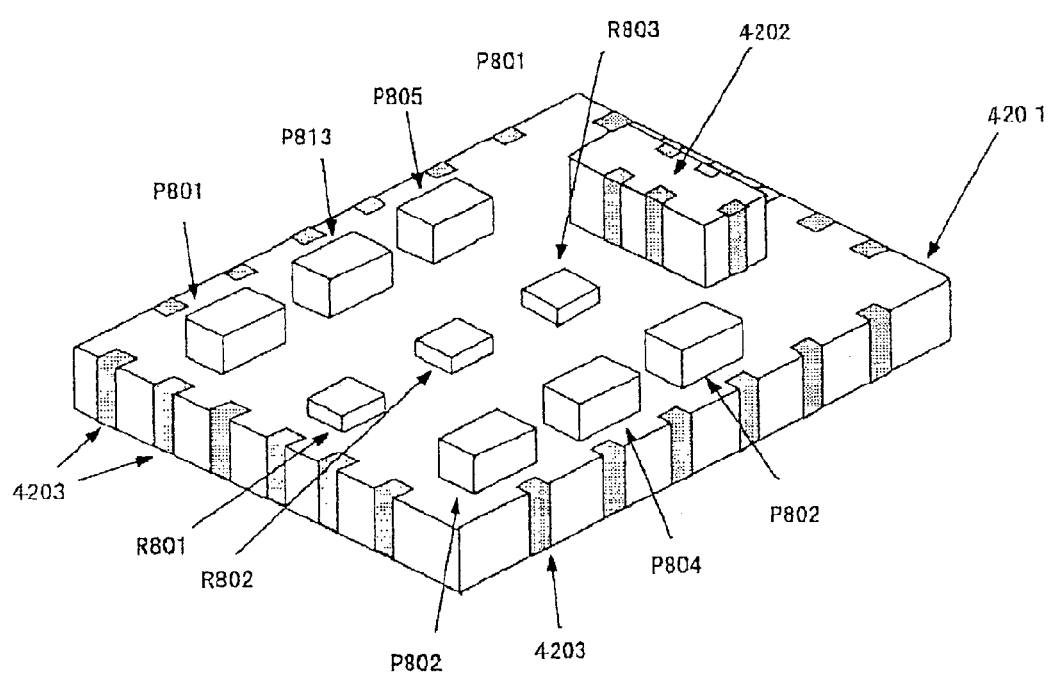
FIG. 23 is a perspective view of the 3-frequency branching circuit according to a fifth embodiment of the present invention.

Next, the configuration of the 3-frequency branching circuit according to a fifth embodiment of the present invention will be described. FIG. 23 is a perspective view of the configuration of the 3-frequency branching circuit. In FIG. 23, it has the configuration wherein a second multilayered product 4202 is placed on a first multilayered product 4201. In addition, first to sixth pin diodes P801, P802, P803, P804, P805 and P806 and the first to third resistors R801, R802 and R803 are placed on the top face of the first multilayered product. Moreover, the diodes may be welding-packaged, bare chip-packaged or flip chip-packaged, and the resistor may be a printed resistor.

The first multilayered product 4201 is formed by a large number of dielectric layers, and internal layers have a circuit configuration including a branching circuit 4801, first and second transmitting and receiving switching circuits 4802 and 4804 and a 2-frequencieswitching circuit 4803. In addition, the first multilayered product 4201 also has the function of a laminated substrate, and a plurality of terminal electrodes 4203 are formed around it. The terminal electrodes 4203 are connected to the respective circuits formed in the internal layers. Moreover, the terminal electrodes 4203 are the ground electrodes, control terminals and transmitting and receiving terminals of various methods, and are appropriately placed by external circuit configuration.

It is preferable to use the dielectric of which specific inductive capacity is 10 or less for the dielectric of the first multilayered product 4201, and it may have the configuration wherein a crystal phase includes at least one of $AL_2O_3$, MgO, $SiO_2$ and ROa (R is at least one element selected from La, Ce, Pr, Nd, Sm and Gd, and a is a numerical value stoichiometrically determined according to the value of the above described R). The second multilayered product 4202 is formed by a large number of dielectric layers, and the duplexer is formed in the internal layer. It is preferable to use the dielectric of which specific inductive capacity is comparatively large for the dielectric of the second multilayered product 4202, and it may be have the configuration wherein main components are $Bi_2O_3$, and $Nb_2O_5$. In addition, the terminal electrodes 4203 can have the same effect if formed not around it but on the bottom face of it.

Figure 24:
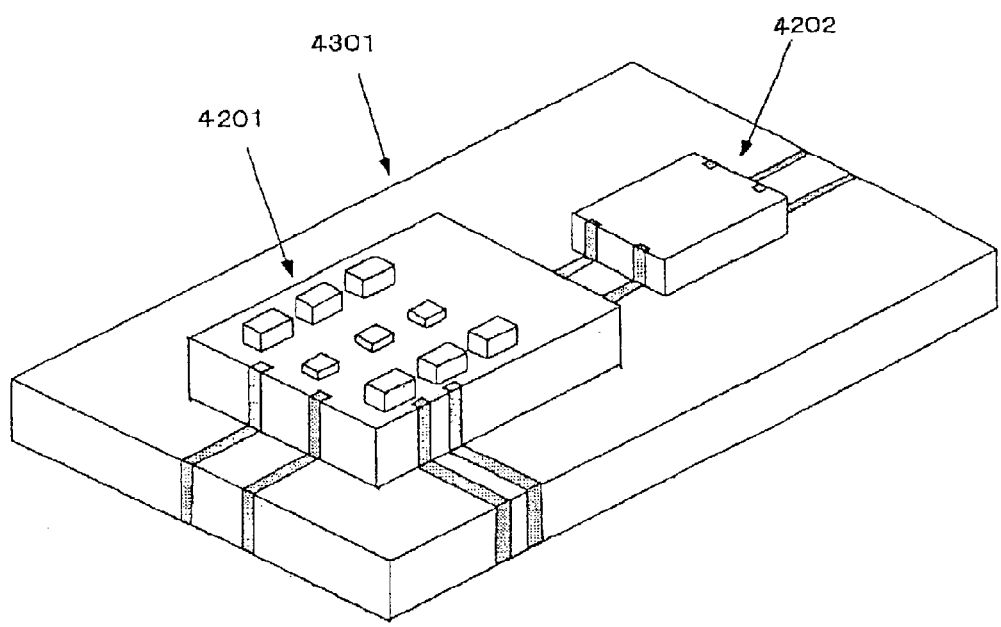
FIG. 24 is a perspective view of another form of the 3-frequency branching circuit according to the fifth embodiment of the present invention.

In addition, while the second multilayered product 4202 is placed on a top surface of the first multilayered product 4201 in this embodiment, it may also be the placement configuration wherein the first multilayered product 4201 and the second multilayered product 4202 are separated and arranged sideways on a substrate 4301 as shown in FIG. 24. In this case, the circuit configuration in the internal layer of the first multilayered product 4201 is formed with an allowance to allow the isolation among the elements to be enhanced by increasing the ground electrodes for instance and also to allow height of the second multilayered product 4202 to be higher, and so the thickness of the resonator in the internal layer can be increased so as to further reduce the losses.

In addition, on the top surface of the first multilayered product 4201 it is possible to have an inductor (or the strip line) and the capacitor in the internal layers of the first multilayered product 4201 mounted as discrete parts. These are placed as appropriate according to the characteristics of the 3-frequency branching circuit. In addition, placement of other parts is not limited thereto but they are placed as appropriate according to an internal layer pattern and a terminal position. As described above, in this embodiment, it is possible to implement the smaller size by having the transmitting and receiving switching circuits, 2-frequencieswitching circuits and duplexer formed by the multilayered products.

Moreover, while this embodiment was described in detail by taking the layered type duplexer as an example, it is also possible to implement the smaller size by using the SAW filter utilizing the surface acoustic wave as the duplexer. In addition, it is also possible, according to the requirement characteristics, to implement it by combining the coaxial type, layered type and SAW filter.

The above description was made on the second to fifth embodiments of the present invention in detail.

Moreover, the branching circuit of the present invention was the 3-frequency branching circuit exemplified by the GSM, W-CDMA and DCS in the above-mentioned second to fifth embodiments. However, not limiting thereto, the branching circuit of the present invention is, in short, the branching circuit having the filter function of passing the transmitting frequency band and receiving frequency band in each of the first to Nth frequency bands, and is equipped with the first, second, third and fourth internal terminals, the antenna terminal of connecting to the antenna, and the branching circuit having the first filter of passing the n+1-th ($2 \leq n \leq N-1$) to Nth frequency bands between the first internal terminal and the antenna terminal and the second filter of passing the first to nth frequency bands between the second internal terminal and the antenna terminal, the first switching circuit connected to the first internal terminal of switching among the n+1-th to Nth frequency bands, the second switching circuit connected to the second internal terminal of switching the second to the nth frequency bands to the third internal terminal and switching the first frequency band to the fourth internal terminal for transmission, the third switching circuit connected to the third internal terminal of switching among the second to the nth frequency bands, and the duplexer connected to the fourth internal terminal of branching the transmitting frequency band and the receiving frequency band of the first frequency band (in addition, the branching circuit of the present invention may be the one having interchanged the roles of the input and output in such a branching circuit).

In addition, mobile communication equipment of the present invention is characterized by having the antenna of transmitting and receiving the signal, the branching circuit of the present invention (3-frequency branching circuit) of inputting and outputting the transmitted and received signal, and the signal processing device which processes the signal branched by the branching circuit (3-frequency branching circuit), and it is applicable, by using the 3-frequency branching circuit of the present invention, to the mobile communication equipment of the W-CDMA method or the like requiring the simultaneous transmitting and receiving.

Thus, according to the present invention, for instance, it allows the simultaneous receiving of GSM and W-CDMA or DCS by using the branching circuit of branching the low frequency band and high frequency band around the antenna portion to branch the GSM transmitting and receiving signal from the W-CDMA and DCS transmitting and receiving signals first and using the 2-frequencieswitching circuit to branch the W-CDMA transmitting and receiving signal from the DCS transmitting and receiving signal, and it also allows the simultaneous transmitting and receiving of W-CDMA by branching the transmitting and receiving frequencies of the W-CDMA transmitting and receiving signals with the duplexer.

In addition, it is possible, according to the requirement characteristics, to implement the 3-frequency branching circuit of the smaller size and reduced losses by using in the duplexer portion the coaxial type duplexer using the coaxial type resonator if reduction in losses is required, the duplexer of the layered type or using the SAW filter if the smaller size is required, and further combining them, and it is feasible to provide the 3-frequency branching circuit, branching circuit and radio communication equipment also usable for the system wherein the TDMA method and the W-CDMA method assuring high tone quality and high speed data communication for instance are mixed.

Sixth Embodiment

Hereafter, the 3-frequency branching circuit according to a sixth embodiment of the present invention will be described by referring to FIG. 25, while taking as a concrete example the circuit of the filter of passing the transmitting frequency bands and receiving frequency bands of the three frequencies of the GSM and DCS methods used in the mobile communication in Europe and the W-CDMA method expected to be introduced in future. Moreover, FIG. 25 shows a circuit diagram of the 3-frequency branching circuit according to the sixth embodiment.

Figure 25:
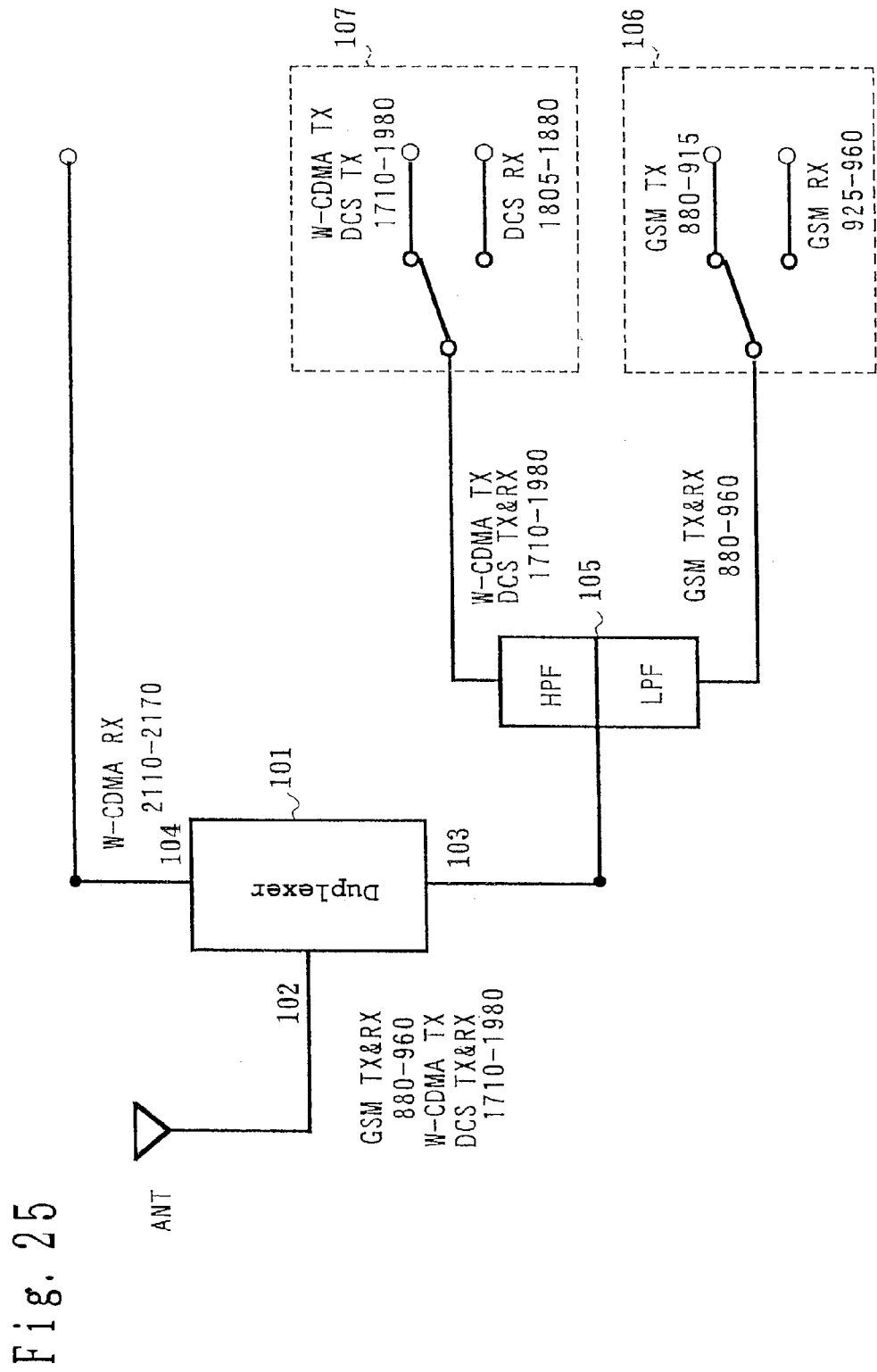
FIG. 25 is a circuit diagram of the 3-frequency branching circuit according to a sixth embodiment of the present invention.

In FIG. 25, reference numeral 101 denotes the duplexer of which band widths are broad bands such as 880 to 960 MHz as the transmitting and receiving frequency band of GSM, 1710 to 1980 MHz as the transmitting frequency band of W-CDMA and the transmitting and receiving frequency band of DCS and 2110 to 2170 MHz as the receiving frequency band of W-CDMA, and having the function of branching narrow bands among the bands.

880 to 960 MHz as the transmitting and receiving frequency band of GSM and 1710 to 1980 MHz as the transmitting frequency band of W-CDMA and the transmitting and receiving frequency band of DCS are branched first from an antenna terminal 102 to a first internal terminal 103 which is the common terminal of the transmitting and receiving of GSM, the transmitting of W-CDMA and the transmitting and receiving of DCS or to a second internal terminal 104 which is the receiving terminal of W-CDMA.

The transmitting and receiving signals from the first internal terminal 103 which is the common terminal of the transmitting and receiving of GSM, the transmitting of W-CDMA and the transmitting and receiving of DCS are branched by a branching circuit 105 comprised of the low-pass filter and high-pass filter having the function of branching the low frequency band and high frequency band so that the transmitting and receiving signal of GSM is branched to a transmitting and receiving switching circuit (hereafter, also referred to as the first transmitting and receiving change-over switch) 106 side and the transmitting signal of W-CDMA and the transmitting and receiving signal of DCS are branched to a transmitting and receiving switching circuit (hereafter, also referred to as the second transmitting and receiving change-over switch) 107 side respectively.

The transmitting and receiving signal of GSM branched by the branching circuit is branched into the transmitting signal and receiving signal of GSM by the first transmitting and receiving switching circuit 106.

In addition, the transmitting signal of W-CDMA and the transmitting and receiving signal of DCS branched by the branching circuit is branched into the transmitting signal of W-CDMA and the transmitting signal of DCS and receiving signal of DCS by the second transmitting and receiving switching circuit 107.

As described above, this embodiment allows the simultaneous receiving of W-CDMA, GSM and DCS by using the duplexer around the antenna portion so as to (1) branch the W-CDMA receiving signal first and (2) branch the GSM transmitting and receiving signal from the W-CDMA transmitting signal and the DCS transmitting and receiving signal by using the branching circuit of branching the low frequency band and high frequency band.

Furthermore, the transmitting and receiving switching circuits 106 and 107 do not pass a current on receiving of GSM and DCS not to mention receiving of W-CDMA, leading to reduction in current consumption, and in addition, it also has the effect of rendering the circuit scale smaller, implementing the smaller size and reducing insertion losses by simultaneously performing the transmitting of W-CDMA and the transmitting of DCS.

Moreover, in the case of taking the circuit configuration described above, the receiving signal of W-CDMA is branched first by the duplexer around the antenna portion and so the receiving signal of W-CDMA can be received in a low-loss state so that high tone quality is assured for instance.

Seventh Embodiment

Figure 27:
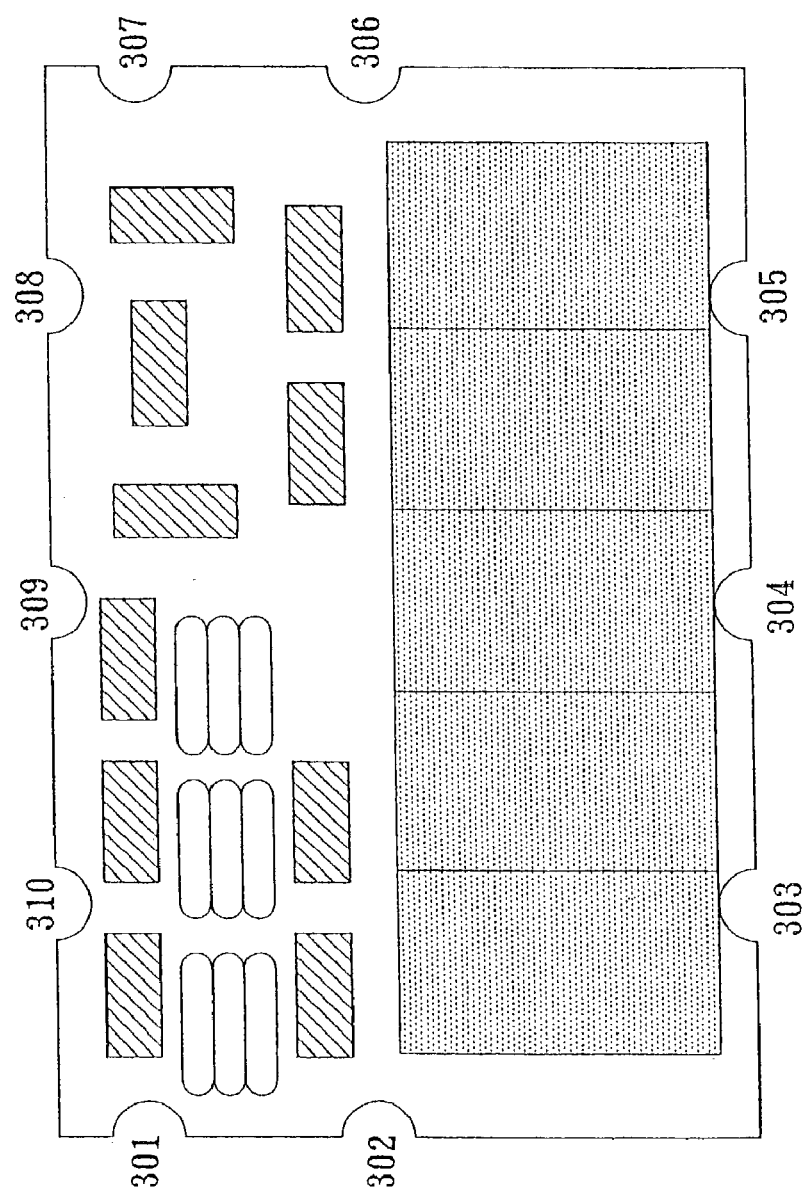
FIG. 27 is a top view of the coaxial type duplexer according to the seventh embodiment of the present invention.
Figure 28:
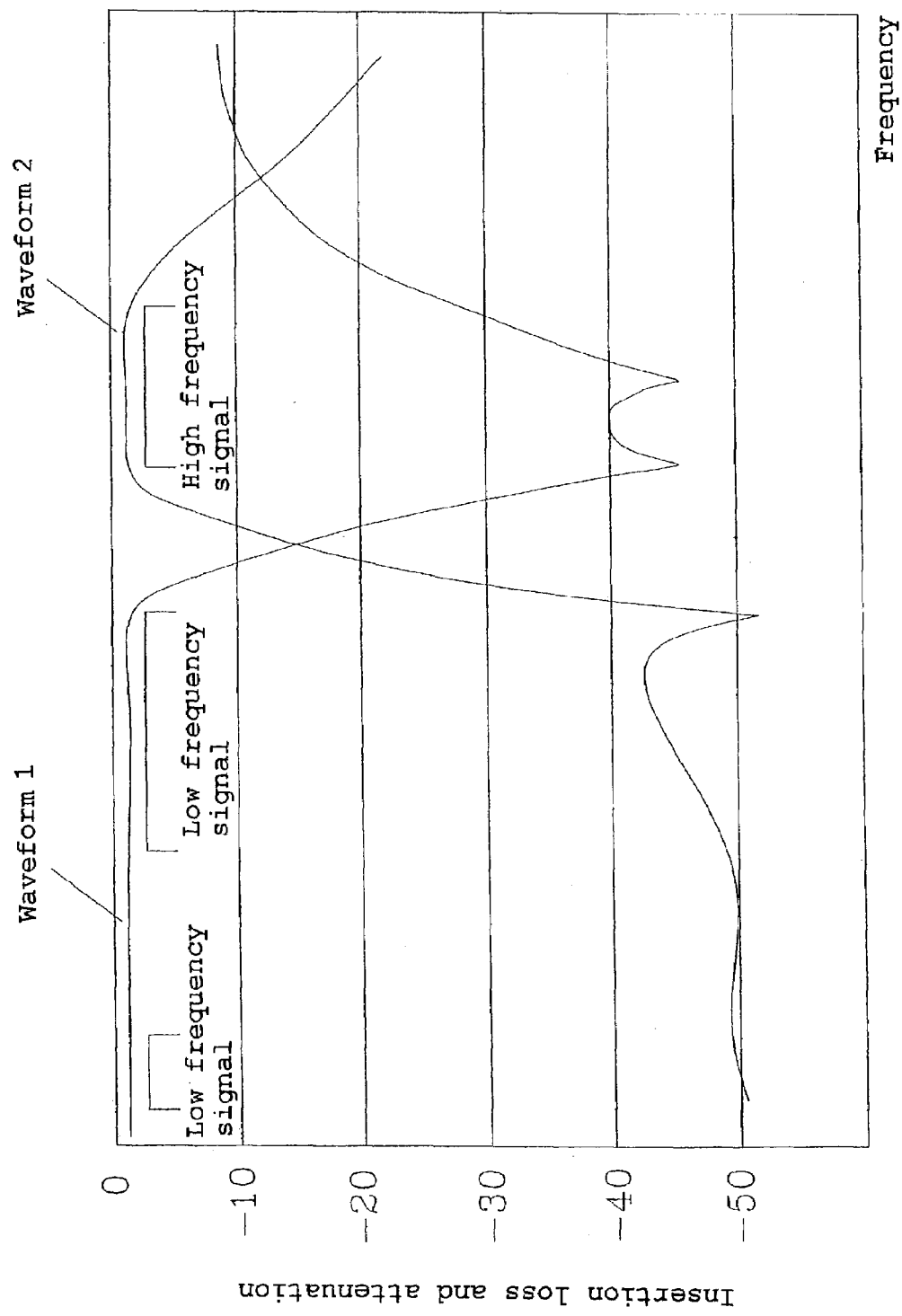
FIG. 28 is a characteristic view of the duplexer according to the seventh embodiment of the present invention.

Next, the configuration and operation of the 3-frequency branching circuit according to a seventh embodiment of the present invention will be described. As the configuration and operation of the 3-frequency branching circuit according to this embodiment are almost the same as those in the above-mentioned sixth embodiment, the configuration and operation of the coaxial type duplexer of the 3-frequency branching circuit as the major differences will be described by referring to FIGS. 26 to 28. Moreover, FIG. 26 is an equivalent circuit diagram of the coaxial type duplexer, FIG. 27 is a top view of thereof, and FIG. 28 is a characteristic view thereof.

Figure 26:
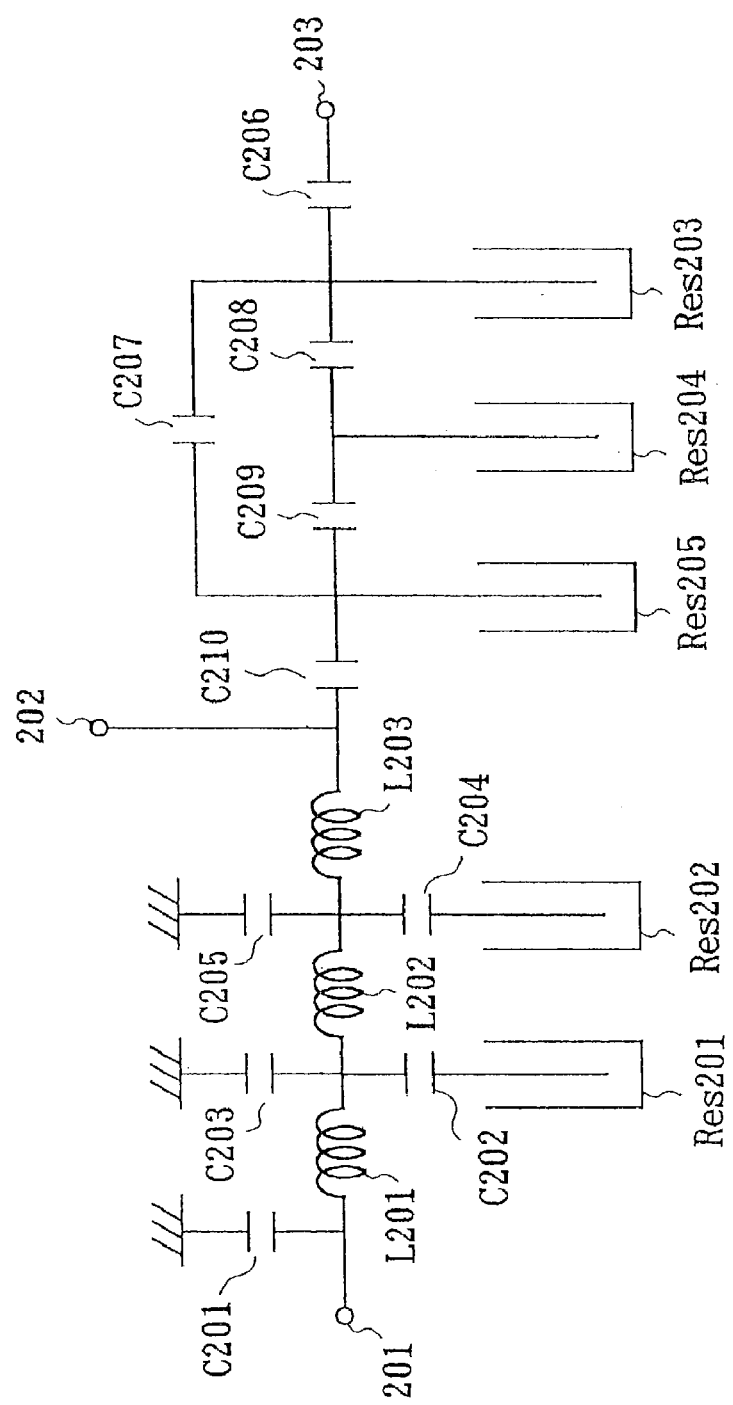
FIG. 26 is an equivalent circuit diagram of the coaxial type duplexer according to a seventh embodiment of the present invention.

In FIG. 26, a common terminal 201 for the transmitting and receiving of GSM, the transmitting of W-CDMA and the transmitting and receiving of DCS is connected to a first capacitor C201 connected to the ground and a first inductor L201.

The other end of the first inductor L201 is connected to a coaxial type resonator Res 201 via a second capacitor C202. In addition, a third capacitor C203 is connected to the ground and further a second inductor L202 is connected thereto.

The other end of the second inductor L202 is connected to a coaxial type resonator Res 202 via a fourth capacitor C204, and a fifth capacitor C205 connected to the ground and a third inductor L203 are further connected thereto.

The other end of the third inductor L203 is connected to an antenna terminal 202 connected to the antenna.

A receiving terminal 203 of W-CDMA is connected to a sixth capacitor C206, and the other end of the sixth capacitor C206 is connected to a coaxial type resonator Res 203 in parallel, and to a seventh capacitor C207 and further to an eighth capacitor C208.

The other end of the eighth capacitor C208 is connected to a coaxial type resonator Res 204 in parallel, and to a ninth capacitor C209.

The other end of the ninth capacitor C209 is connected to a coaxial type resonator Res 205 in parallel, and to the other end of the seventh capacitor C207 and further to a tenth capacitor C210, and to the antenna terminal 202.

The coaxial type duplexer comprised of such equivalent circuits will be described further by referring to FIG. 27.

In FIG. 27, a wiring substrate P301 is made of a resin such as glass epoxy. In addition, the coaxial type resonator Res 201 to 205 are made of dielectrics and so on, and are mounted on the wiring substrate P301 by soldering together with the inductor elements such as an air core coil and a chip capacitor.

The substrate P301 has external electrodes 301, 302, 303, 304, 305, 306, 307, 308, 309 and 310 provided thereon. Moreover, the external electrode 301 is the common terminal of the transmitting and receiving of GSM, the transmitting of W-CDMA and the transmitting and receiving of DCS, the external electrode 309 is the antenna terminal, the external electrode 307 is the receiving terminal of W-CDMA, and the external electrodes 302, 303, 304, 305, 306, 308 and 310 have the ground terminals placed thereon.

Next, the characteristics of the duplexer will be described by referring to FIG. 28.

In FIG. 28, a waveform 1 is a waveform diagram of the transmitting and receiving signal of GSM, the transmitting signal of W-CDMA and the transmitting and receiving signal of DCS.

In the waveform 1, the transmitting and receiving frequency band of GSM, the transmitting frequency band of W-CDMA and the transmitting and receiving frequency band of DCS are passed by using the notch filter. Moreover, selectivity is improved by attenuating the receiving frequency band of W-CDMA.

A waveform 2 is a waveform diagram of the receiving signal of W-CDMA. In the waveform 2, the receiving frequency band of W-CDMA is passed by using the band pass filter. Moreover, selectivity is improved by attenuating the transmitting and receiving frequency band of GSM, the transmitting frequency band of W-CDMA and the transmitting and receiving frequency band of DCS.

As described above, it is possible, according to this embodiment, to reduce the insertion losses of the transmitting and receiving signal of GSM, the transmitting signal of W-CDMA, the transmitting and receiving signal of DCS and the receiving signal of W-CDMA by using the coaxial type duplexer. And the coupling portion of the notch filter passing the transmitting and receiving band of GSM, the transmitting frequency band of W-CDMA and the transmitting and receiving band of DCS has the configuration of the low-pass filter of LC so that it can curb waves by two to three times more than the transmitting frequency band of DCS or W-CDMA.

Eighth Embodiment

Next, the configuration and operation of the 3-frequency branching circuit according to an eighth embodiment of the present invention will be described. As the configuration and operation of the 3-frequency branching circuit according to this embodiment are almost the same as those in the above-mentioned sixth embodiment, the configuration and operation of the multilayered product of the 3-frequency branching circuit as the major differences will be described by referring to FIGS. 29 to 31. Moreover, FIG. 29 is a perspective view of the multilayered product constituting the 3-frequency branching circuit according to this embodiment, FIG. 30 is an exploded perspective view thereof, and FIG. 31 is an equivalent circuit diagram thereof.

Figure 29:
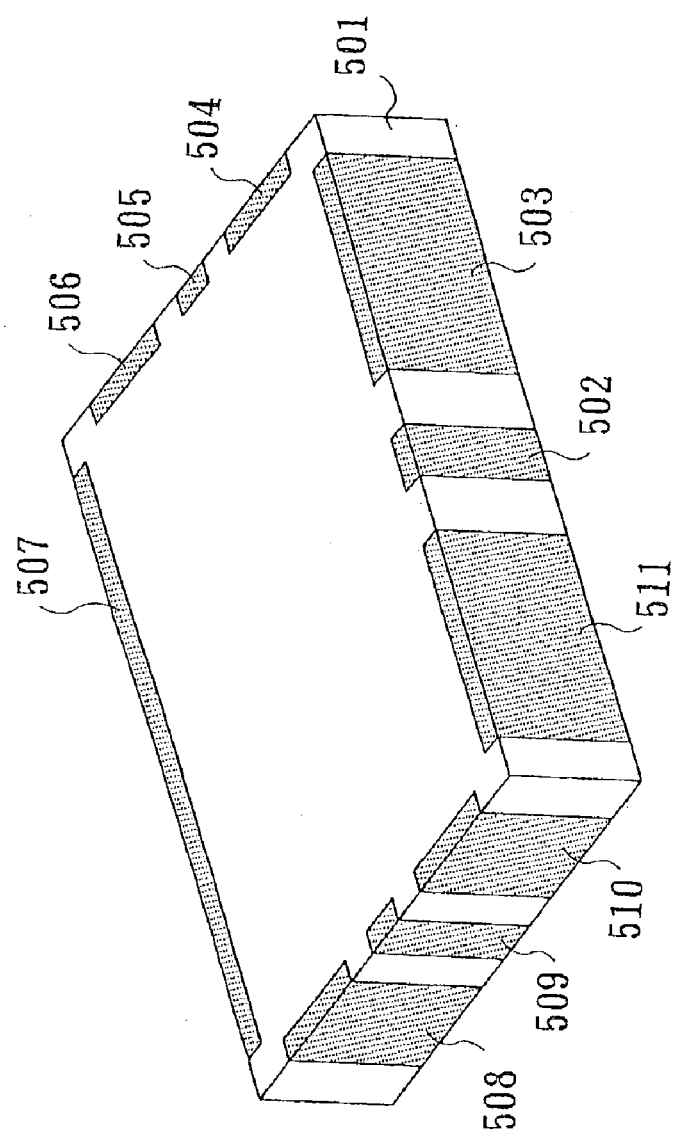
FIG. 29 is a perspective view of the layered type duplexer according to an eighth embodiment of the present invention.

In FIG. 29, a multilayered product 501 using the dielectric green sheet of the 3-frequency branching circuit is formed by a large number of dielectric layers, and external electrodes 502, 503, 504, 505, 506, 507, 508, 509, 510 and 511 are provided on and in the proximity of the side of the multilayered product 501.

Figure 30:
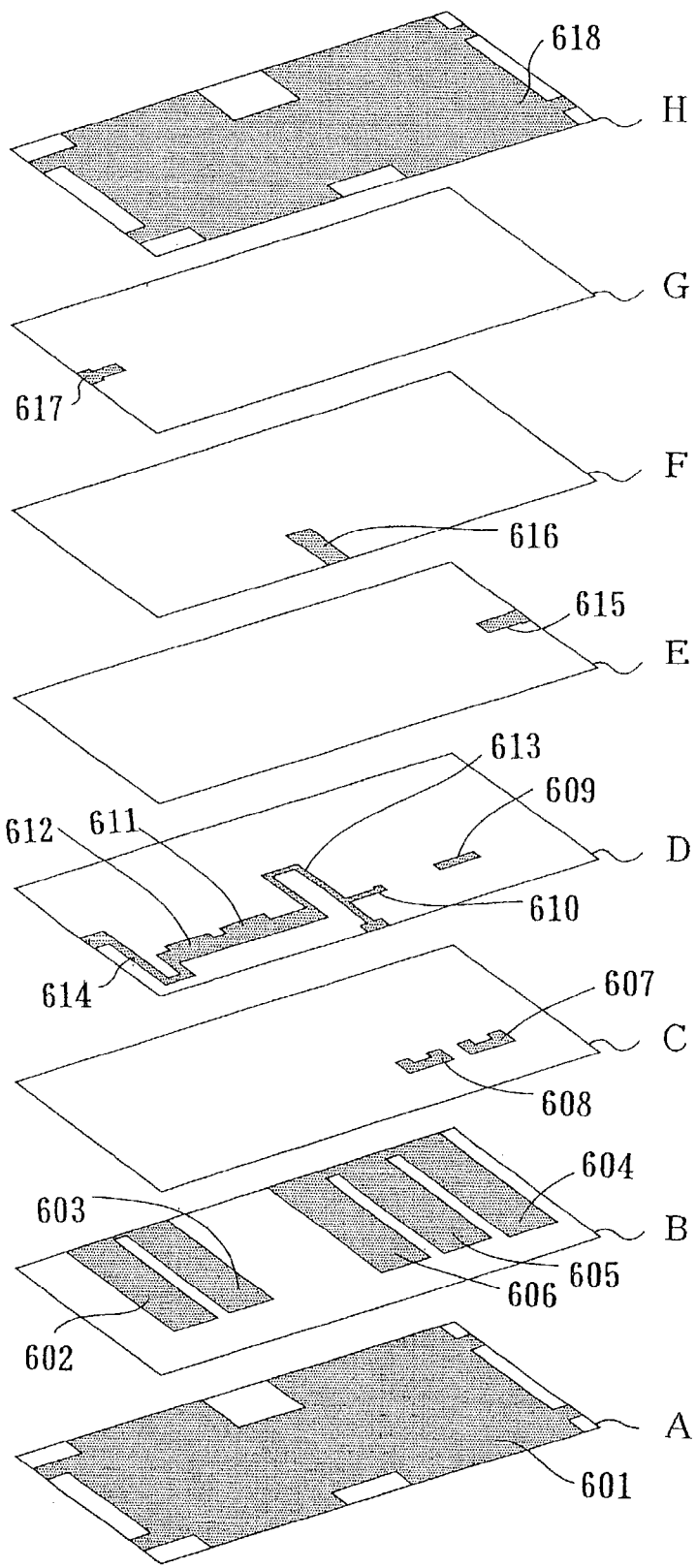
FIG. 30 is an exploded perspective view of the layered type duplexer according to the eighth embodiment of the present invention.
Figure 31:
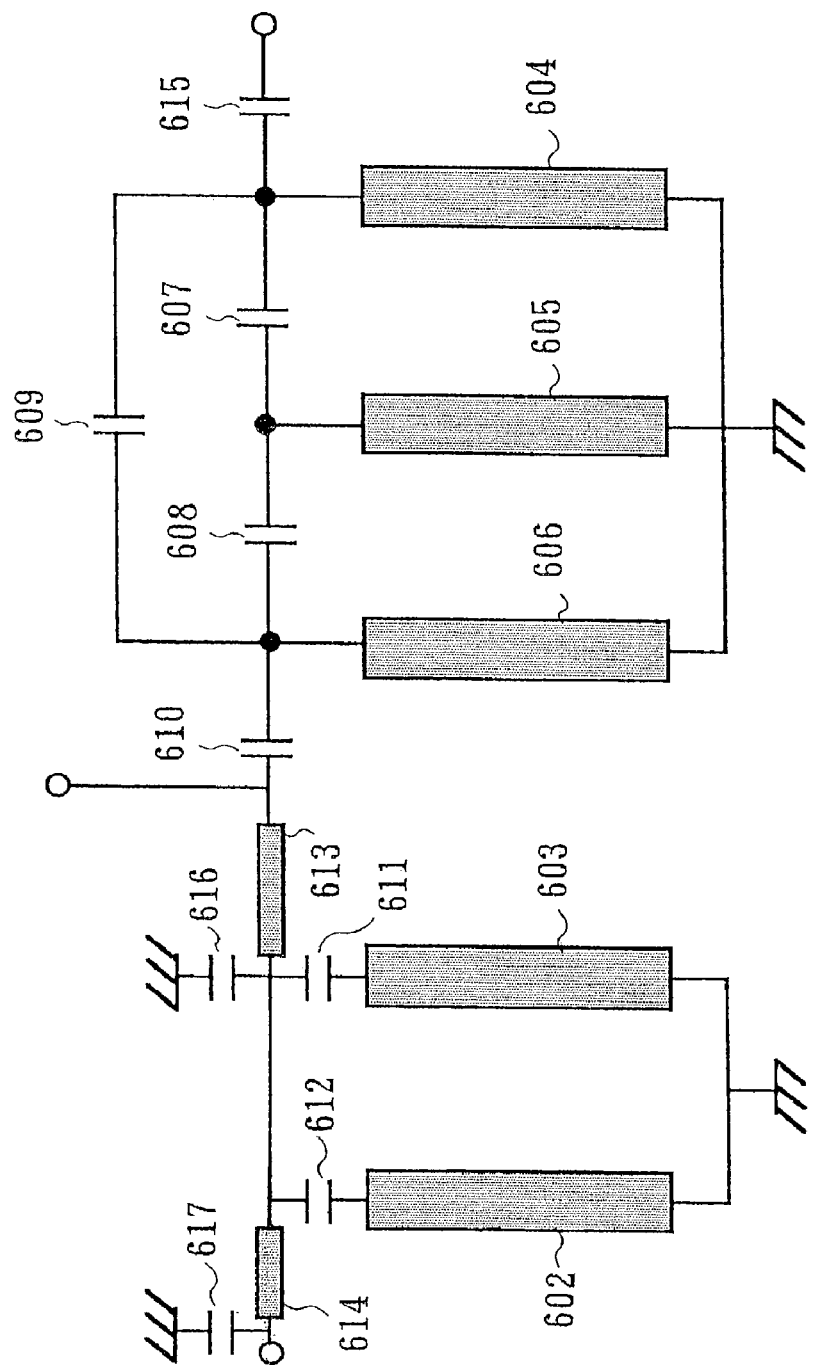
FIG. 31 is an equivalent circuit diagram of the layered type duplexer according to the eighth embodiment of the present invention.

In FIG. 30, the layer A has a first ground electrode 601 formed thereon. In addition, the layer B has first, second, third, fourth and fifth resonator electrodes 602, 603, 604, 605 and 606 formed thereon, and the layer C has first and second capacitor coupling electrodes 607 and 608 formed thereon.

In addition, the layer D has third, fourth, fifth and sixth capacitor coupling electrodes 609, 610, 611 and 612 and first and second strip line electrodes 613 and 614 formed thereon.

The layers E, F and G have seventh, eighth and ninth capacitor coupling electrodes 615, 616 and 617 formed thereon. Furthermore, the layer H has a second ground electrode 618 formed thereon.

The external electrode 509 is the common terminal of the transmitting and receiving of GSM, the transmitting of W-CDMA and the transmitting and receiving of DCS, and is connected to the strip line electrode 614. Furthermore, the external electrode 509 has the capacitor coupling electrode 617 connected to the ground by the ground electrode 618.

One end of the strip line electrode 614 is connected to one end of the capacitor coupling electrode 612, and the capacitor coupling electrode 612 is connected to the resonator electrodes 602 via the layers C and D.

The other end of the capacitor coupling electrode 612 is connected to one end of the capacitor coupling electrode 611, and the capacitor coupling electrode 611 is connected to the resonator electrode 603 via the layers C and D.

The other end of the capacitor coupling electrode 611 is connected to one end of the strip line electrode 613, the one end of the strip line electrode 613 is connected to one end of the capacitor coupling electrode 616 via the layers E and F, and the other end of the capacitor coupling electrode 616 is connected to the ground by the external electrode 507, and furthermore, the other end of the strip line electrode 613 is connected to the external electrode 502 which is the antenna terminal so as to form the notch filter structure.

The external electrode 505 (refer to FIG. 29) is the receiving terminal of W-CDMA, and is connected to one end of the capacitor coupling electrode 615.

The capacitor coupling electrode 615 has the resonator electrode 604 connected thereto via the layers C, D and E, and the resonator electrode 604 has the capacitor coupling electrode 607 connected thereto via the layer C, and the capacitor coupling electrode 607 has the resonator electrode 605 connected thereto via the layer C. In addition, the resonator electrode 605 has the capacitor coupling electrode 608 connected thereto via the layer C, and the capacitor coupling electrode 608 has the resonator electrode 606 connected thereto via the layer C, and furthermore, the capacitor coupling electrode 607 has the capacitor coupling electrode 608 connected thereto via the layer D.

The resonator electrode 606 has the capacitor coupling electrode 610 connected thereto via the layers C and D, and the capacitor coupling electrode 610 is connected to the external electrode 502 (refer to FIG. 29) which is the antenna terminal so as to form the band pass filter structure. Moreover, the external electrodes 503, 504, 506, 507, 508, 510 and 511 (refer to FIG. 29) form the ground electrode.

As described above, according to this embodiment, it is possible to implement the smaller size by using the layered type duplexer, and it is also possible to curb the waves by two to three times more than the transmitting frequency bands of DCS and W-CDMA for instance by implementing the low-pass filter structure of LC with the coupling portion of the notch filter passing the transmitting and receiving frequency band of GSM, the transmitting frequency band of W-CDMA and the transmitting and receiving frequency band of DCS.

As above, this embodiment was described in detail by taking the layered type duplexer as an example, but it is also possible to implement the smaller size by using the SAW filter utilizing the surface acoustic wave as the duplexer.

Figure 32:
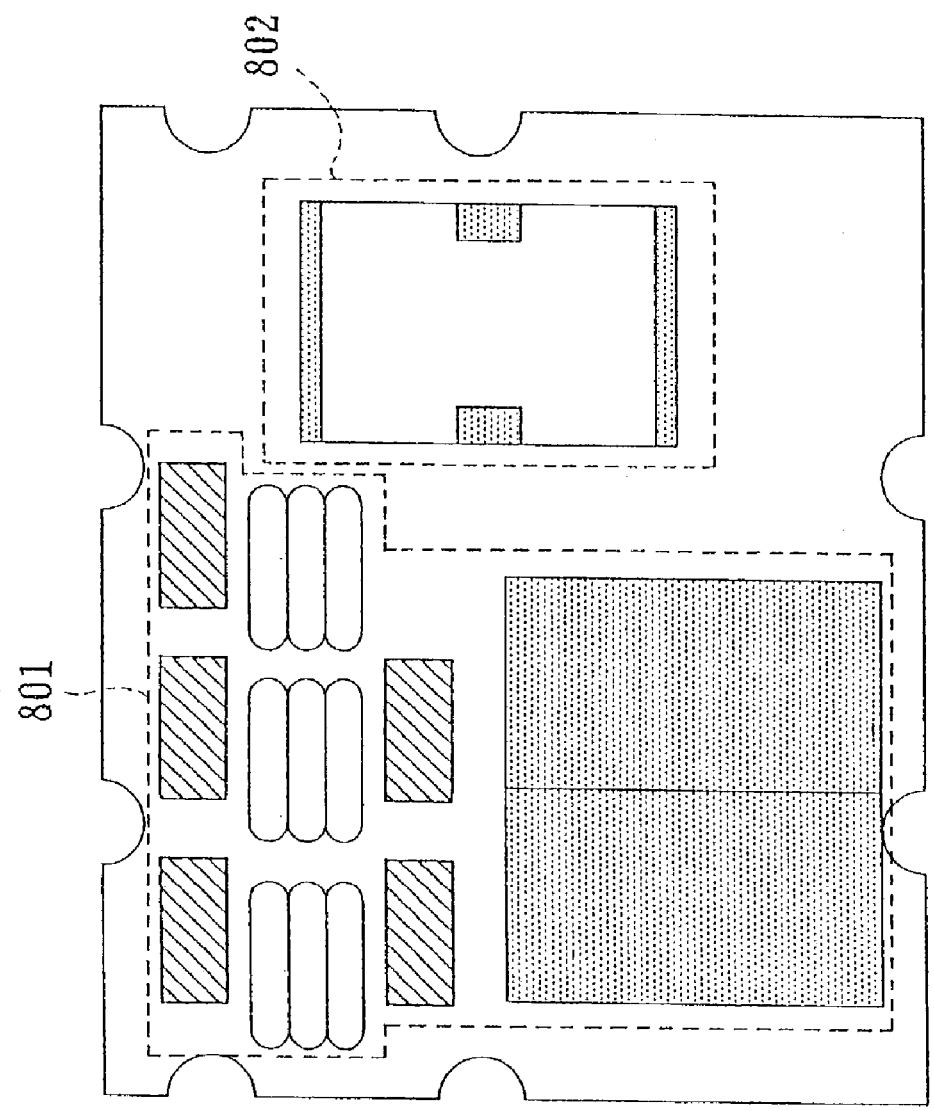
FIG. 32 is a top view of the duplexer combining the coaxial type and the layered type described in the eighth embodiment of the present invention.

Moreover, as shown in FIG. 32, it is possible, according to the requirement characteristics, to implement the smaller size by using a combination of a notch filter 801 passing the transmitting and receiving frequency band of GSM, the transmitting frequency band of W-CDMA and the transmitting and receiving frequency band of DCS of the coaxial type duplexer and a band pass filter 802 passing the receiving frequency band of W-CDMA of the layered type duplexer.

Figure 33:
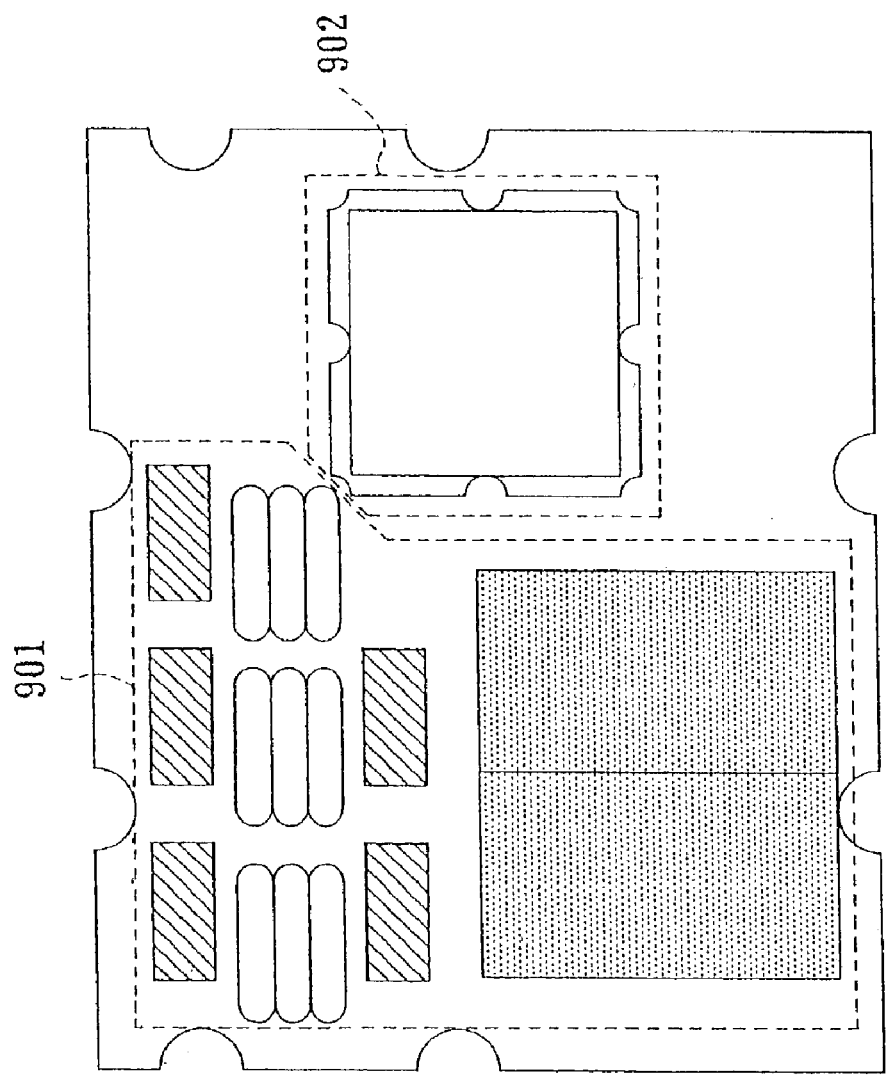
FIG. 33 is a top view of the duplexer combining the coaxial type and the SAW filter described in the eighth embodiment of the present invention.

In addition, as shown in FIG. 33, it is possible, according to the requirement characteristics, to implement the smaller size by using a coaxial type notch filter 901 passing the transmitting and receiving frequency band of GSM, the transmitting frequency band of W-CDMA and the transmitting and receiving frequency band of DCS of the coaxial type duplexer and using a SAW filter 902 utilizing a surface acoustic wave as the band pass filter passing the receiving frequency band of W-CDMA.

Figure 34:
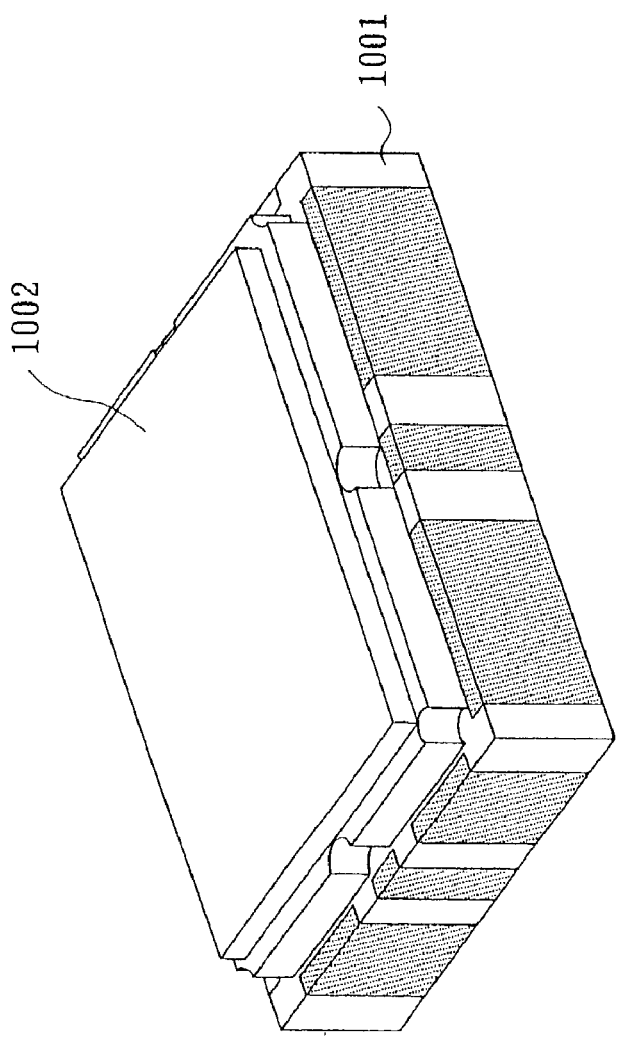
FIG. 34 is a top view of the duplexer combining the layered type and the SAW filter described in the eighth embodiment of the present invention.

Furthermore, as shown in FIG. 34, it is possible, according to the requirement characteristics, to further implement the smaller size by using a layered type notch filter 1001 passing the transmitting and receiving frequency band of GSM, the transmitting frequency band of W-CDMA and the transmitting and receiving frequency band of DCS of the layered type duplexer and using a SAW filter 1002 utilizing a surface acoustic wave as the band pass filter passing the receiving frequency band of W-CDMA.

Ninth Embodiment

Next, the configuration and operation of the 3-frequency branching circuit according to a ninth embodiment of the present invention will be described. As the configuration and operation of the 3-frequency branching circuit according to this embodiment are almost the same as those in the above-mentioned sixth embodiment, the following will be described as the major differences therefrom by referring to FIG. 35. (1) The branching filter of branching the low frequency band in the transmitting and receiving frequency band of GSM from the high frequency band in the transmitting frequency band of W-CDMA and the transmitting and receiving frequency band of DCS, (2) the switching circuit of switching between the transmitting and receiving of the low frequency band in the transmitting and receiving frequency band of GSM, (3) the switching circuit of switching between the transmitting and receiving of the high frequency band in the transmitting frequency band of W-CDMA and the transmitting and receiving frequency band of DCS. Moreover, FIG. 35 is an equivalent circuit diagram of the 3-frequency branching circuit according to this embodiment.

Figure 35:
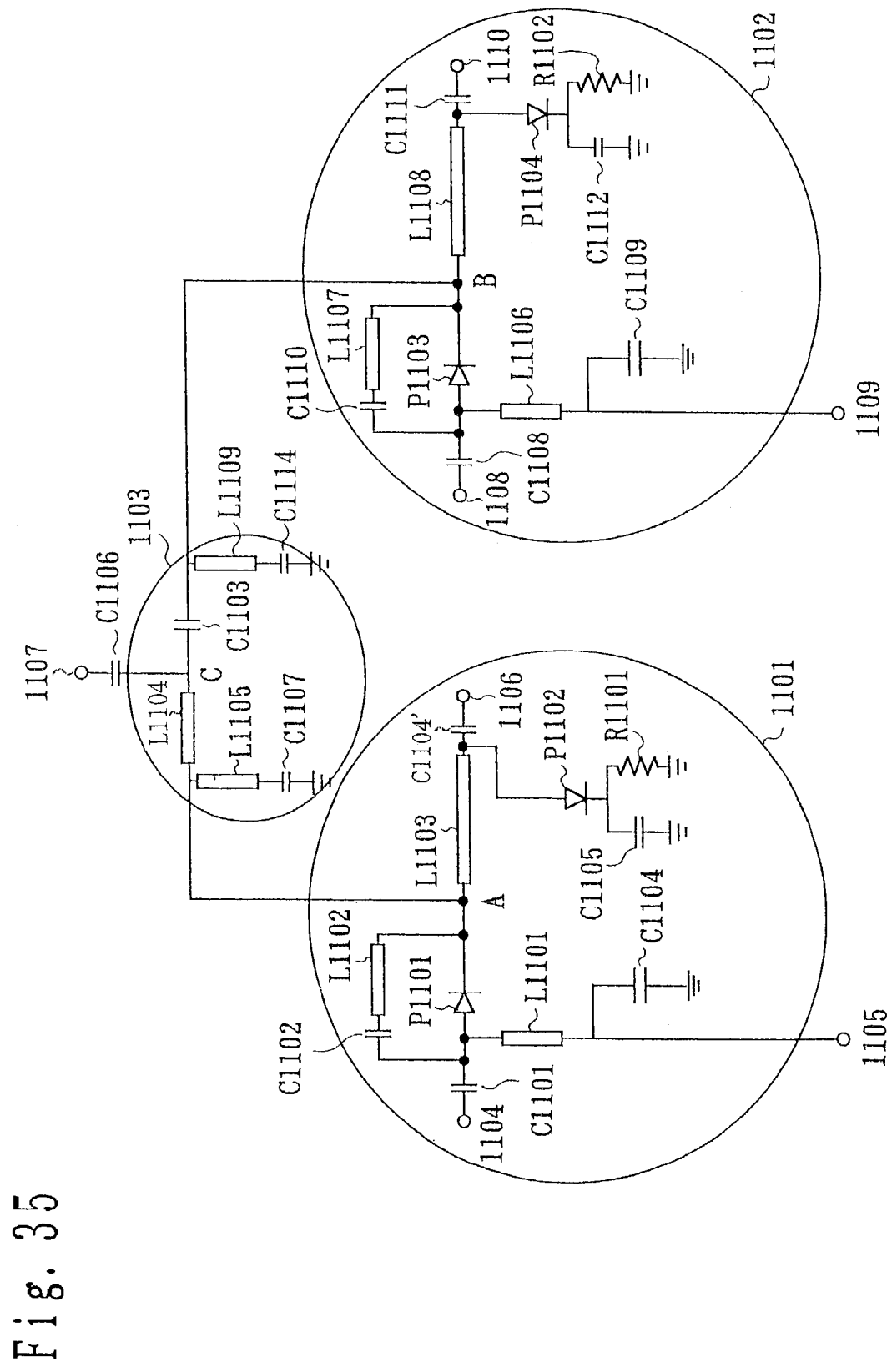
FIG. 35 is an equivalent circuit diagram of the 3-frequency branching circuit according to a ninth embodiment of the present invention.

In FIG. 35, reference numeral 1101 denotes a first transmitting and receiving switching circuit, 1102 denotes a second transmitting and receiving switching circuit, and 1103 denotes the branching circuit.

A GSM transmitting circuit side terminal 1104 in the first transmitting and receiving switching circuit 1101 has the anode of a first diode P1101 connected thereto via a first capacitor C1101, and the cathode of the diode P1101 is connected to the contact A. Furthermore, one end of a first strip line L1101 is connected between the anode of the first diode P1101 and the first capacitor C1101, and the other end of the first strip line L1101 is connected to a control terminal 1105.

The other end of the first strip line L1101 is further connected to the ground via a second capacitor C1102, and the control terminal 1105 plays a role of switching the transmitting and receiving signal of one of the GSM transmitting and receiving change-over switches. In addition, the first diode P1101 has a second strip line L1102 and the series circuit of a third capacitor C1103 connected thereto in parallel.

A GSM receiving circuit side terminal 1106 in the first transmitting and receiving switching circuit 1101 has the anode of a second diode P1102 connected thereto via a fourth capacitor C1104. The cathode of the second diode P1102 is connected to the ground via a resistor R1101 and the parallel circuit of a fifth capacitor C1105. The anode of the second diode P1102 further has one end of a third strip line L1103 connected thereto, and the other end of the third strip line L1103 is connected to the contact A.

The first transmitting and receiving switching circuit 1101 is connected to one end of a fourth strip line L1104 at the contact A, and the other end of the fourth strip line L1104 is connected to a common terminal 1107 of the GSM transmitting and receiving signal, the W-CDMA transmitting signal and DCS transmitting and receiving signal via a sixth capacitor C1106 through the contact C. In addition, the one end of the fourth strip line L1104 is connected to the ground side via a fifth strip line L1105 and the series circuit of a seventh capacitor C1107.

A W-CDMA and DCS transmitting circuit side terminal 1108 in the second transmitting and receiving switching circuit 1102 has the anode of a third diode P1103 connected thereto via an eighth capacitor C1108, and the cathode of the third diode P1103 is connected to the contact B. Furthermore, one end of a sixth strip line L1106 is connected between the anode of the third diode P1103 and the eighth capacitor C1108, and the other end of the sixth strip line L1106 is connected to a control terminal 1109.

The other end of the sixth strip line L1106 is connected to the ground via a ninth capacitor C1109, and the control terminal 1109 plays a role of switching the transmitting and receiving signal of one of the W-CDMA and DCS transmitting and receiving change-over switches. In addition, the third diode P1103 further has a seventh strip line L1107 and the series circuit of a tenth capacitor C1110 connected in parallel.

A DCS receiving circuit side terminal 1110 in the second transmitting and receiving switching circuit 1102 has the anode of a fourth diode P1104 connected thereto via an eleventh capacitor C1111, and the cathode of the fourth diode P1104 is connected to the ground via a resistor R1102 and the parallel circuit of a twelfth capacitor C1112. In addition, the anode of the fourth diode P1104 further has one end of an eighth strip line L1108 connected thereto, and the other end of the eighth strip line L1108 is connected to the contact B.

The second transmitting and receiving switching circuit 1102 is connected to a thirteenth capacitor C1113 at the contact B, and is connected to the common terminal 1107 of the GSM transmitting and receiving signal, the W-CDMA transmitting signal and DCS transmitting and receiving signal via the sixth capacitor C1106 through the contact C. In addition, the one end of the thirteenth capacitor C1113 is connected to the ground via a ninth strip line L1109 and the series circuit of a fourteenth capacitor C1114.

Moreover, the same results can be obtained by adding the inductance elements instead of the resistors R1101 and R1102 and putting the resistors R1101 and R1102 between the first strip line L1101 and the control terminal 1105 and between the sixth strip line L1106 and the control terminal 1109 respectively.

Next, the following operation will be described while referring to FIG. 36. (1) The branching filter of branching the low frequency band in the transmitting and receiving frequency band of GSM from the high frequency band in the transmitting frequency band of W-CDMA and the transmitting and receiving frequency band of DCS, (2) the switching circuit of switching between the transmitting and receiving of the low frequency band in the transmitting and receiving frequency band of GSM, (3) the switching circuit of switching between the transmitting and receiving of the high frequency band in the transmitting frequency band of W-CDMA and the transmitting and receiving frequency band of DCS. Moreover, FIG. 36 is a characteristic view of the duplexer of the 3-frequency branching circuit according to this embodiment.

Figure 36:
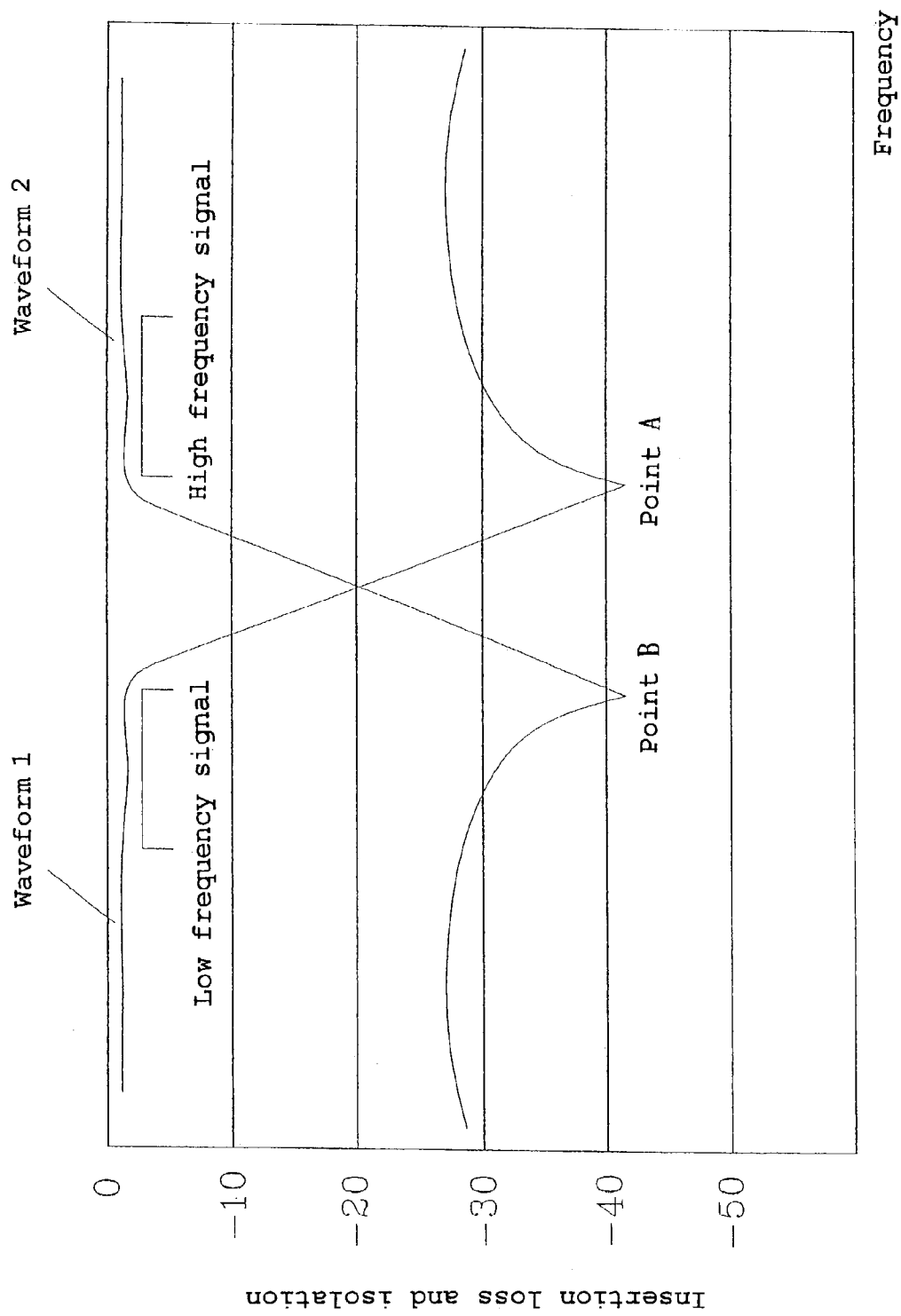
FIG. 36 is a characteristic view of the duplexer according to the ninth embodiment of the present invention.

The fourth strip line L1104, the fifth strip line L1105 and the seventh capacitor C1107 in FIG. 35 form the low-pass filter of passing the low frequency as shown by the waveform 1 in FIG. 36, and the fifth strip line L1105 and the seventh capacitor C1107 are serially connected to the ground side so as to form the attenuation pole point A (refer to FIG. 36).

In addition, the thirteenth capacitor C1113, the ninth strip line L1109 and the fourteenth capacitor C1114 in FIG. 35 form the high-pass filter of passing the high frequency as shown by the waveform 2 in FIG. 26, and the ninth strip line L1109 and the fourteenth capacitor C1114 are serially connected to the ground side so as to form the attenuation pole point B (refer to FIG. 36).

A connection is made via such low-pass filter and high-pass filter to the common terminal of the GSM transmitting and receiving signal, the W-CDMA transmitting signal and DCS transmitting and receiving signal so that, when transmitting or receiving the low frequenciesignal such as the transmitting and receiving signal of GSM, the isolation is well provided to the low frequenciesignal by the attenuation pole B on the high-pass filter side from the contact C (refer to FIG. 35) and the signal will not be leaked to the high-pass filter side.

Moreover, when transmitting or receiving the high frequenciesignal such as the transmitting signal of W-CDMA and the transmitting and receiving signal of DCS, the isolation is well provided to the high frequenciesignal by the attenuation pole A on the low-pass filter side from the contact C (refer to FIG. 35) and the signal will not be leaked to the low-pass filter side. To be more specific, the branching circuit 1107 provides the function of branching the low frequenciesignal such as the transmitting and receiving signal of GSM and the high frequenciesignal such as the transmitting signal of W-CDMA or transmitting and receiving signal of DCS.

In case of transmitting the low frequenciesuch as the transmitting signal GSM, the first diode P1101 and the second diode P1102 will be in the on state by applying the positive voltage to the control terminal 1105.

At this time, the capacitors C1101, C1104 and C1106 cut the DC component, and so the current does not run to each terminal. The current value can be controlled by rendering the resistor R1101 variable, and the signal transmitted from the transmitting terminal 1104 is not transmitted to the receiving side because the impedance of the second strip line L1102 becomes infinite due to the second diode P1102 connected to the ground side. Moreover, as the inductance component of the second diode P1102 resonates with the capacitor C1103, it is possible to render the impedance infinite when seeing the receiving side from the contact A at the transmitting frequency of the transmitting signal, and the transmitting signal is transmitted to the common terminal 1107 of the transmitting and receiving signal of GSM, the transmitting signal of W-CDMA and transmitting and receiving signal of DCS through the low-pass filter.

Next, on receiving, the first diode P1101 and second diode P1102 are in the off state because no voltage is applied to the control terminal 1105 so that the signal is transmitted to the receiving side from the common terminal of the transmitting and receiving signal of GSM, the transmitting signal of W-CDMA and transmitting and receiving signal of DCS.

At this time, as there is the capacitance component of the first diode P1101, the receiving signal is not always transmitted from the antenna to the receiving terminal 1106, and so the capacitance component of the first diode P1101 is resonated with the third strip line L1103. It is thereby possible to take the isolation of the transmitting terminal 1104 satisfactorily from the contact A at the receiving frequency of the receiving signal so that the receiving signal can be transmitted via the low-pass filter to the receiving terminal 1107 of GSM from the common terminal 1107 of the transmitting and receiving signal of GSM, the transmitting signal of W-CDMA and transmitting and receiving signal of DCS.

Next, the cases of transmitting the high frequencies such as the transmitting signal of W-CDMA or the transmitting and receiving signal of DCS will be described.

The third diode P1103 and the fourth diode P1104 will be in the on state by applying the positive voltage to the control terminal 1109. At this time, the capacitors C1108, C1111 and C1106 cut the DC component, and so the current does not run to each terminal.

The current value can be controlled by rendering the resistor R1102 variable, and the signal transmitted from the transmitting terminal 1108 of W-CDMA and DCS is not transmitted to the receiving side because impedance of the eighth strip line L1108 becomes infinite due to the fourth diode P1104 connected to the ground side.

At this time, as the inductance component of the fourth diode P1104 resonates with the capacitor C1112, it is possible to render the impedance infinite when seeing the receiving side from the contact B at the transmitting frequency of the transmitting signal, and the transmitting signals of W-CDMA and DCS are transmitted to the common terminal 1107 of the transmitting and receiving signal of GSM, the transmitting signal of W-CDMA and transmitting and receiving signal of DCS through the high-pass filter.

In addition, on receiving DCS, no voltage is applied to the control terminal 1109 so that the third diode P1103 and the fourth diode P1104 are in the off state, and the receiving signal of DCS is transmitted to the receiving side from the common terminal of the transmitting and receiving signal of GSM, the transmitting signal of W-CDMA and transmitting and receiving signal of DCS.

At this time, as there is the capacitance component of the third diode P1103, the receiving signal of DCS is not always transmitted to the receiving terminal 1110 from the common terminal of the transmitting and receiving signal of GSM, the transmitting signal of W-CDMA and transmitting and receiving signal of DCS, and so the capacitance component of the third diode P1103 is resonated with the seventh strip line L1107. It is thereby possible to take the isolation of the transmitting terminal 1108 satisfactorily from the contact B against the receiving frequency of the receiving signal of DCS so that the receiving signal of DCS can be efficiently transmitted via the high-pass filter to the receiving terminal 1110 of DCS from the common terminal 1107 of the transmitting and receiving signal of GSM, the transmitting signal of W-CDMA and transmitting and receiving signal of DCS.

As described above, this embodiment provides the low-pass filter of passing the low frequency through the common terminal of the transmitting and receiving signal of GSM, the transmitting signal of W-CDMA and transmitting and receiving signal of DCS and the high-pass filter of passing the high frequency through it, and provides the circuit of dividing the transmitting and receiving signals of GSM on the low-pass filter side, and also provides the circuit of dividing the transmitting and receiving as to the transmitting signals of W-CDMA and DCS and the receiving signal of DCS on the high-pass filter side so as to allow the transmitting and receiving of the three frequencies.

In addition, it provides the low-pass filter of passing the low frequency through the common terminal of the transmitting and receiving signal of GSM, the transmitting signal of W-CDMA and transmitting and receiving signal of DCS and the high-pass filter of passing the high frequency through it. It is possible to eliminate undesired signals of the waves by two to three times more than the transmitting frequency band of W-CDMA and DCS by using the band pass filter in the high-pass filter portion of the branching circuit.

Tenth Embodiment

Figure 37:
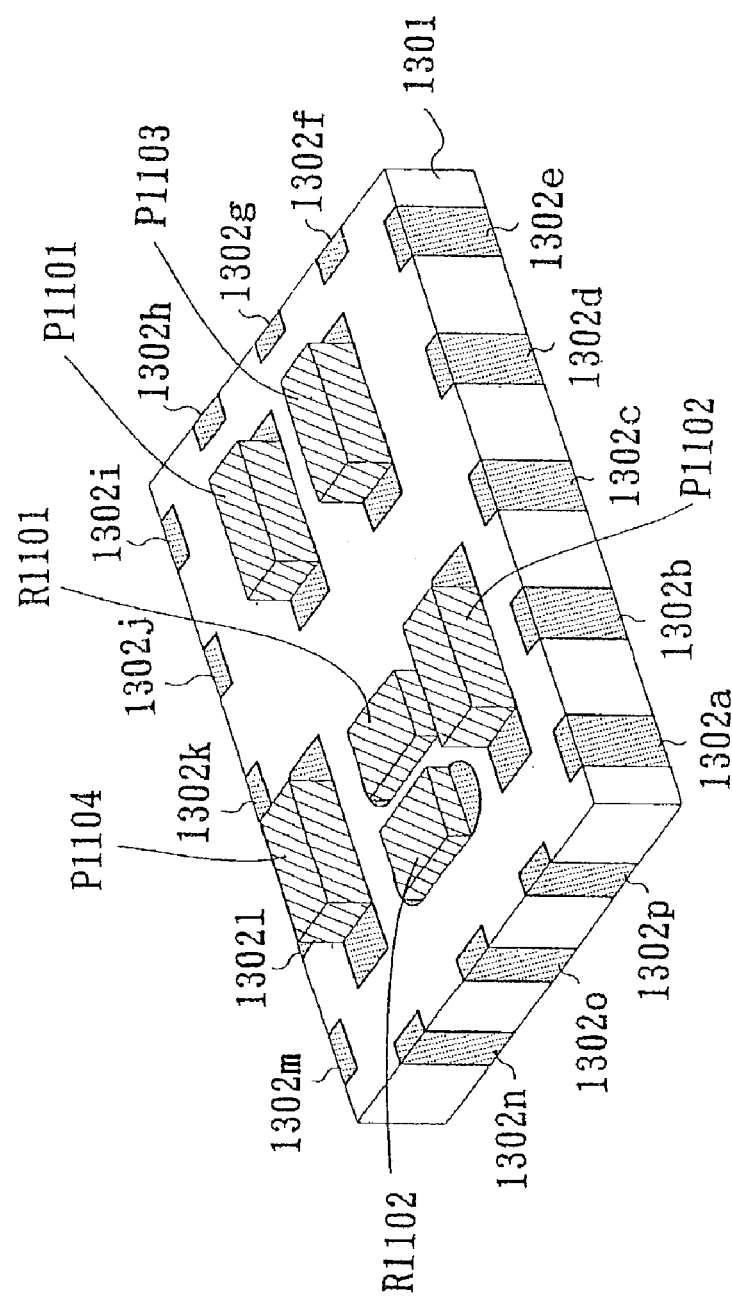
FIG. 37 is a perspective view of the multilayered product of the branching filter according to a tenth embodiment of the present invention.
Figure 38:
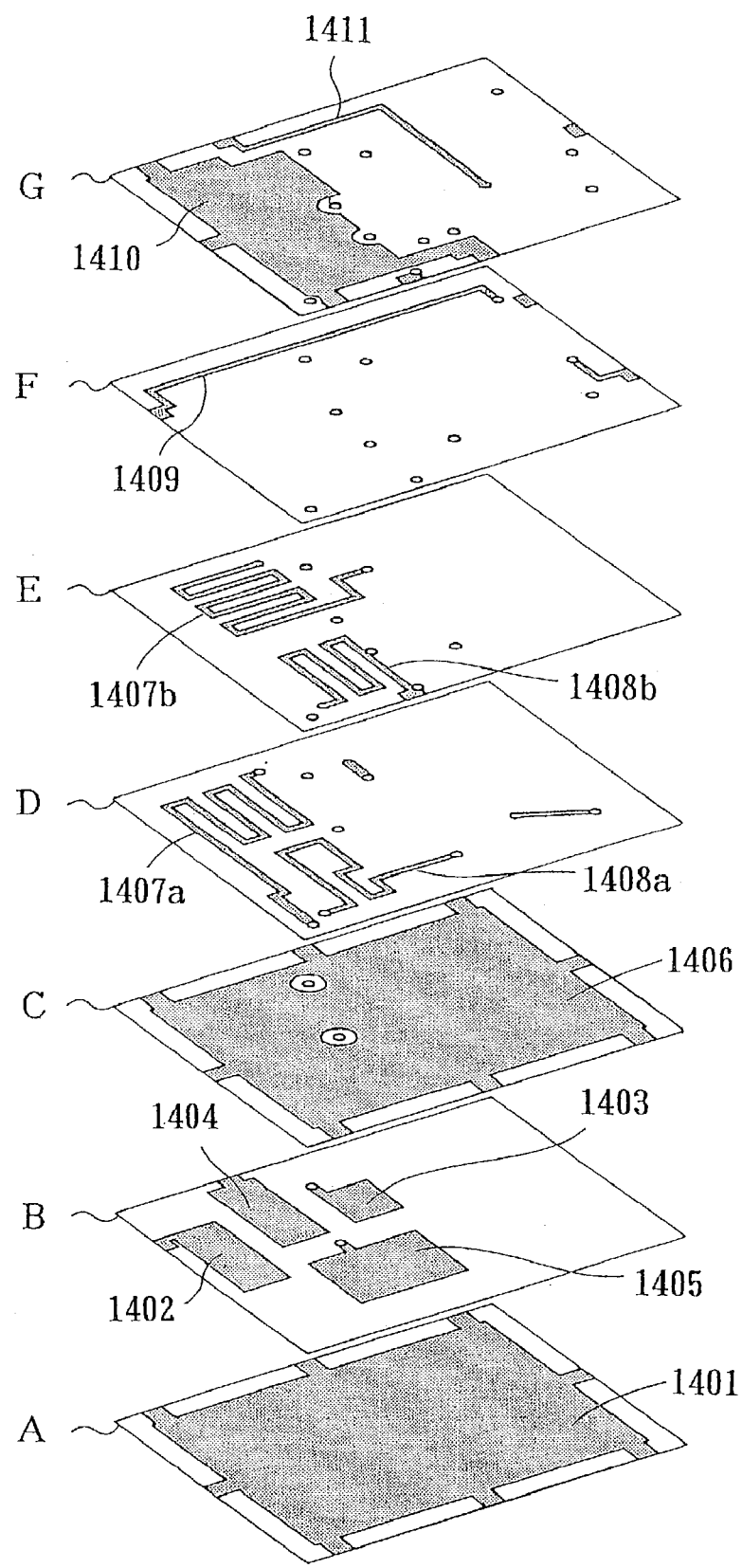
FIG. 38 is an exploded perspective view of the device (lower half) including a first switching circuit and a second switching circuit according to the tenth embodiment of the present invention.
Figure 39:
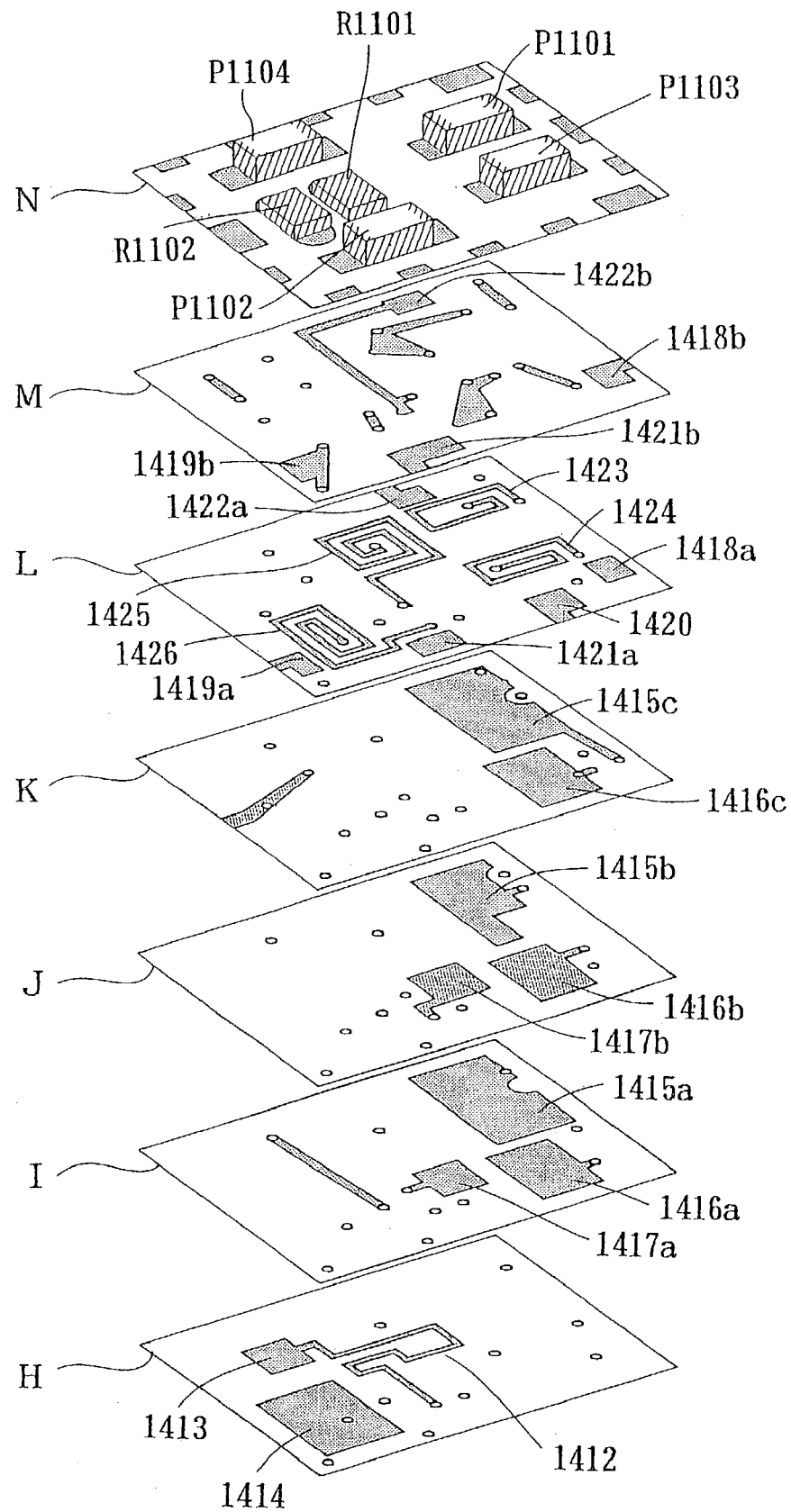
FIG. 39 is an exploded perspective view of the device (upper half) including the first switching circuit and second switching circuit according to the tenth embodiment of the present invention.

Next, the configuration and operation of the 3-frequency branching circuit according to a tenth embodiment of the present invention will be described. As the configuration and operation of the 3-frequency branching circuit according to this embodiment are almost the same as those in the above-mentioned sixth embodiment, the following will be described as the major differences therefrom by referring to FIGS. 37 to 39. (1) The branching filter of branching the high frequency band in the transmitting frequency band of W-CDMA and the transmitting and receiving frequency band of DCS from the low frequency band in the transmitting and receiving frequency band of GSM, (2) the switching circuit of switching between the transmitting and receiving of the low frequency band in the transmitting and receiving frequency band of GSM, (3) the switching circuit of switching between the transmitting and receiving of the high frequency band in the transmitting frequency band of W-CDMA and the transmitting and receiving frequency band of DCS. Moreover, FIG. 37 is a perspective view of the multilayered product of the branching filter of branching the low frequency band of the transmitting and receiving frequency band of GSM and the high frequency band of the transmitting frequency band of W-CDMA and transmitting and receiving frequency band of DCS according to this embodiment. In addition, FIGS. 38 and 39 are exploded perspective views of the lower half and upper half of the device including the switching circuit of switching the low frequency band of the transmitting and receiving frequency band of GSM and the switching circuit of switching the transmitting and receiving of the high frequency band of the transmitting frequency band of W-CDMA and transmitting and receiving frequency band of DCS respectively.

In FIG. 37, a multilayered product 1301 is formed by a large number of dielectric layers, wherein there are the branching filter of branching the low frequency band in the transmitting and receiving frequency band of GSM and the high frequency bands in the transmitting frequency band of W-CDMA and the transmitting and receiving frequency band of DCS, the switching circuit of switching between the transmitting and receiving of the low frequency band in the transmitting and receiving frequency band of GSM, and the switching circuit of switching between the transmitting and receiving of the high frequency bands in the transmitting frequency band of W-CDMA and the transmitting and receiving frequency band of DCS.

External electrodes 1302a, 1302b, 1302c, 1302d, 1302e, 1302f, 1302g, 1302h, 1302i, 1302j, 1302k, 1302l, 1302m, 1302n, 1302o and 1302p are provided on and in the proximity of the sides of the multilayered product 1301.

In addition, the diodes P1101, P1102, P1103 and P1104 and the resistor R1101, and R1102 are mounted on the top face of the multilayered product 1301 by soldering and so on. Moreover, the diodes may be bare chip-packaged or flip chip-packaged, and the resistor may be a printed resistor.

In FIG. 38, the layer A has a first ground electrode 1401 formed therein. In addition, the layer B has second, fifth, ninth and twelfth capacitor coupling electrodes 1402, 1403, 1404 and 1405 formed therein, and furthermore, the layer C has a second ground electrode 1406 formed therein.

The layers D and E have third and eighth strip line electrodes 1407a, 1407b, 1408a and 1408b formed therein by dividing them in two layers. The layer F has a strip line electrode 1409 of the first strip line formed therein. The layer G has a third ground electrode 1410 and a strip line electrode 1411 of the sixth strip line formed therein.

In FIG. 39, the layer H has a strip line electrode 1412 of the fifth strip line, a capacitor coupling electrode 1413 of the seventh capacitor and a capacitor coupling electrode 1414 of the fourteenth capacitor formed therein.

The layer I has capacitor coupling electrodes 1415a, 1416a and 1417a on one side each of the third, tenth and thirteenth capacitors formed therein, and the layer J has capacitor coupling electrodes 1415b, 1416b and 1417b on the one side each of the third, tenth and thirteenth capacitors formed therein. The layer K has capacitor coupling electrodes 1415c and 1416c on the other side each of the third and tenth capacitors formed therein. The layer L has capacitor coupling electrodes 1418a, 1419a, 1420, 1421a and 1422a on one side each of the first, second, eighth, eleventh and sixth capacitors formed therein, and further has strip line electrodes 1423, 1424, 1425 and 1426 of the second, fourth, seventh and ninth strip lines. The layer M has capacitor coupling electrodes 1418b, 1419b, 1421b and 1422b on one side each of the first, second, eleventh and sixth capacitors formed therein. The layer N has the first, second, third and fourth diodes P1101, P1102, P1103 and P1104 and the first and second resistor R1101, and R1102 mounted thereon.

Moreover, it goes without saying that the layers A to N described above are layered in this order.

The external electrode 1302n (refer to FIG. 37) has the capacitor coupling electrode 1402 connected thereto, and the capacitor coupling electrode 1402 is sandwiched between the ground electrodes 1401 and 1406 and connected to the ground. Furthermore, the external electrode 1302n is connected to one end of the strip line electrode 1409, and the other end of the strip line electrode 1409 is connected to the capacitor coupling electrodes 1418a, 1415a and 1415c and to the anode side of the diode P1101 through a via hole. The external electrode 1302n plays a role of the control terminal, and is connected to an external control circuit.

The external electrode 1302f (refer to FIG. 37) has the capacitor coupling electrode 1418b forming a capacitor with the capacitor coupling electrode 1418a connected thereto. The capacitor coupling electrode 1415b sandwiched between the capacitor coupling electrodes 1415a and 1415c is connected to the cathode side of the diode P1101 via the strip line electrode 1423 through the via hole.

The external electrode 1302p (refer to FIG. 37) has the capacitor coupling electrode 1419a connected thereto, and the capacitor coupling electrode 1419b forming the capacitor with the capacitor coupling electrode 1419a is connected to the anode of the diode P1102 through the via hole.

Moreover, the cathode side of the diode P1102 is connected to one end of the resistor R1101, and the other end of the resistor R1101 is connected to the ground from the external electrode 1302o through the via hole. In addition, the cathode side of the diode P1102 is connected to the capacitor coupling electrode 1405 through the via hole, and is connected to the ground via the ground electrodes 1401 and 1406.

Furthermore, the capacitor coupling electrode 1419b is connected to the cathode side of the diode P1101 via the strip line electrodes 1407a and 1407b through the via hole. The cathode side of the diode P1101 is connected to one end of the strip line 1425 through the via hole, and the other end of the strip line 1425 is connected to the capacitor coupling electrode 1422b through the via hole.

The capacitor coupling electrode 1422a forming the capacitor with the capacitor coupling electrode 1422b is connected to the external electrode 1302j (refer to FIG. 37). In addition, one end of the strip line 1425 has one end of the strip line 1412 connected thereto, and the other end of the strip line 1412 is connected to the capacitor coupling electrode 1413 to be connected to the ground via the ground electrode 1410.

The external electrode 1302l (refer to FIG. 37) has the capacitor coupling electrode 1404 connected thereto, and the capacitor coupling electrode 1404 is sandwiched between the ground electrodes 1401 and 1406 to be connected to the ground.

The external electrode 1302l (refer to FIG. 37) is connected to one end of the strip line electrode 1411, and the other end of the strip line electrode 1411 is connected to the capacitor coupling electrodes 1416a, 1416c and to the anode side of the diode P1103 through the via hole.

The external electrode 1302i (refer to FIG. 37) plays a role of the control terminal, and is connected to the external control circuit.

The external electrode 1302d (refer to FIG. 37) has the capacitor coupling electrode 1420 forming the capacitor with the capacitor coupling electrode 1416c connected thereto. Moreover, the capacitor coupling electrode 1416b sandwiched between the capacitor coupling electrodes 1416a and 1416c is connected to the cathode side of the diode P1103 via the strip line electrode 1424 through the via hole.

The external electrode 1302b (refer to FIG. 37) has the capacitor coupling electrode 1421b connected thereto, and the capacitor coupling electrode 1421a forming the capacitor with the capacitor coupling electrode 1421b is connected to the anode of the diode P1104 through the via hole.

Moreover, the cathode side of the diode P1104 is connected to one end of the resistor R1102, and the other end of the resistor R1102 is connected to the ground from the external electrode 1302o through the via hole. In addition, the cathode side of the diode P1104 is connected to the capacitor coupling electrode 1403 through the via hole, and is connected to the ground via the ground electrodes 1401 and 1406.

Furthermore, the capacitor coupling electrode 1421a is connected to the cathode side of the diode P1103 via the strip line electrodes 1408a and 1408b through the via hole. The cathode side of the diode P1103 is connected to the capacitor coupling electrode 1417b through the via hole, and the capacitor coupling electrode 1417a forming the capacitor with the capacitor coupling electrode 1417b is connected to the capacitor coupling electrode 1422b through the via hole.

The capacitor coupling electrode 1417b has one end of the strip line 1426 connected thereto, and the other end of the strip line 1426 is connected to the capacitor coupling electrode 1416 through the via hole to be connected to the ground via the ground electrode 1410.

Furthermore, the external electrodes 1302a, 1302c, 1302e, 1302g, 1302i, 1302k, 1302m and 1302p (refer to FIG. 37) are connected to the ground electrodes 1401, 1406 and 1410 respectively.

In addition, the external electrode 1302f (refer to FIG. 37) is connected to the transmitting circuit in a subsequent stage of GSM, and the external electrode 1302p (refer to FIG. 37) is connected to the receiving circuit in the subsequent stage of GSM.

The external terminal 1302d (refer to FIG. 37) is connected to the transmitting circuit in a subsequent stage of W-CDMA and DCS, and the external electrode 1302b (refer to FIG. 37) is connected to the receiving circuit in the subsequent stage of DCS. Furthermore, the external terminal 1302j (refer to FIG. 37) is connected to the common terminal of the transmitting and receiving signal of GSM, the transmitting signal of W-CDMA and the transmitting and receiving signal of DCS.

It is possible, by using a multilayered substrate using the dielectrics shown in FIGS. 37 to 39, to implement the smaller sizes of the branching filter of branching the low frequency band in the transmitting and receiving frequency band of GSM and the high frequency bands in the transmitting frequency band of W-CDMA and the transmitting and receiving frequency band of DCS, the switching circuit of switching between the transmitting and receiving of the low frequency band in the transmitting and receiving frequency band of GSM, and the switching circuit of switching between the transmitting and receiving of the high frequency bands in the transmitting frequency band of W-CDMA and the transmitting and receiving frequency band of DCS of this embodiment.

In addition, it is possible to use the strip line electrodes 1409 and 1411 as stubs by rendering them n times longer than wavelengths of the respective transmitting frequencies thereof so as to improve selectivity of the signals.

Furthermore, as the ground electrode is formed on the bottom face, it has an effect that, when mounted on the mobile communication equipment by the soldering and so on, it can be shielded from the undesired signals of a mounting substrate or peripheral circuit parts of the mobile communication equipment.

In addition, while the strip line has one-layer or two-layer structure in the above-mentioned embodiment, the same effect can also be obtained by rendering it as a structure of three or more layers.

Eleventh Embodiment

Figure 40:
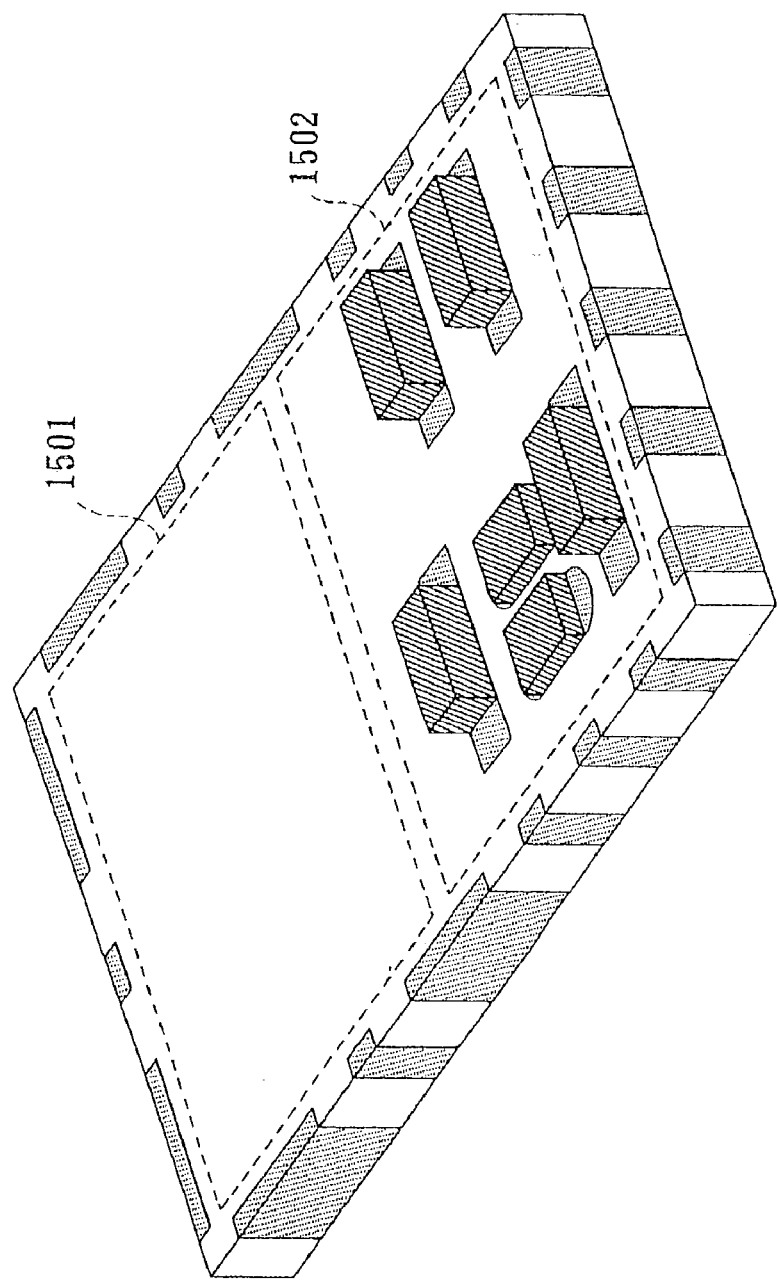
FIG. 40 is a perspective view of the device integrating the layered type duplexer of the 3-frequency branching circuit as in the eighth embodiment of the present invention and the multilayered product constituting the first and second switching circuits as in the tenth embodiment.

Next, an eleventh embodiment of the present invention will be described by referring to FIG. 40. FIG. 40 is a perspective view of the device integrating a layered duplexer 1501 portion of the 3-frequency branching circuit as in the eighth embodiment of the present invention and a multilayered product 1502 portion as in the eighth embodiment constituting the branching filter of branching the low frequency band in the transmitting and receiving frequency band of GSM and the high frequency bands in the transmitting frequency band of W-CDMA and the transmitting and receiving frequency band of DCS, the switching circuit of switching between the transmitting and receiving of the low frequency band in the transmitting and receiving frequency band of GSM, and the switching circuit of switching between the transmitting and receiving of the high frequency bands in the transmitting frequency band of W-CDMA and the transmitting and receiving frequency band of DCS.

It is possible, by performing such integration, to render them smaller-size and lower-priced, and it has the effect of doing without a matching circuit required when mounting each of them on the mobile communication equipment by the soldering and so on.

Furthermore, as shown in FIG. 40, it is easily possible to adjust the frequency and a degree of coupling required by the layered duplexer by having the configuration concurrently providing the layered duplexer portion 1501 of the 3-frequency branching circuit and a switching circuit portion 1502 comprised of the branching filter of branching the low frequency band in the transmitting and receiving frequency band of GSM and the high frequency bands in the transmitting frequency band of W-CDMA and the transmitting and receiving frequency band of DCS, the switching circuit of switching between the transmitting and receiving of the low frequency band in the transmitting and receiving frequency band of GSM, and the switching circuit of switching between the transmitting and receiving of the high frequency bands in the transmitting frequency band of W-CDMA and the transmitting and receiving frequency band of DCS in the tenth embodiment.

Furthermore, it is possible to implement the smaller size and lower height by mounting the pin diodes by wire bonding and flip chip and using the printed resistor.

In addition, as the ground electrode is formed on the bottom face, it has an effect that, when mounted on the mobile communication equipment by the soldering and so on, it can be shielded from the undesired signals of a mounting substrate or peripheral circuit parts of the mobile communication equipment.

Twelfth Embodiment

Figure 41:
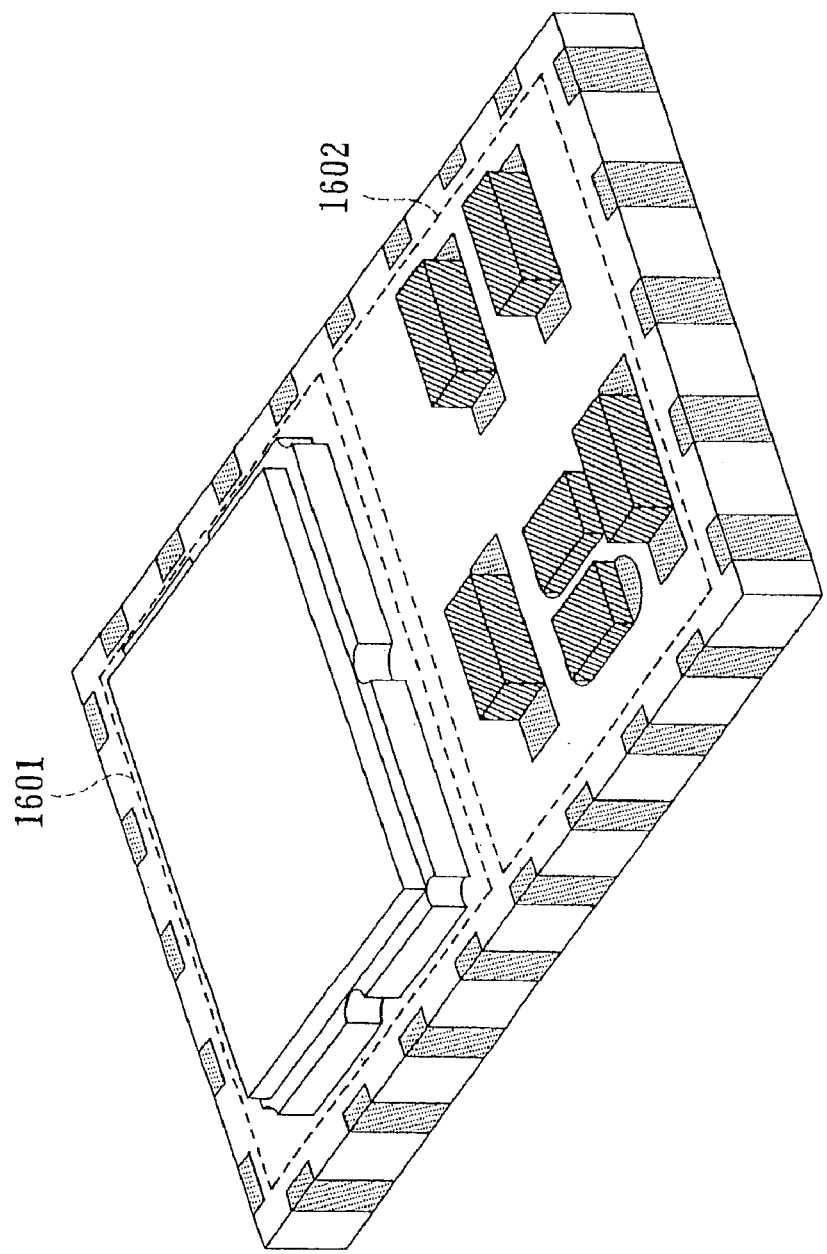
FIG. 41 is a perspective view of the device integrating a combination of a notch filter and a band pass filter as in the eighth embodiment of the present invention and the multilayered product constituting the branching filter and first and second switching circuits as in the tenth embodiment.

Next, a twelfth embodiment of the present invention will be described by referring to FIG. 41. Moreover, FIG. 41 is a perspective view of the device of integrating a combination portion 1601 of the notch filter of passing the transmitting and receiving frequency band of GSM, the transmitting frequency band of W-CDMA and the transmitting and receiving frequency band of DCS of the layered duplexer of the 3-frequency branching circuit as in the eighth embodiment of the present invention and the band pass filter of passing the receiving frequency band of W-CDMA of the duplexer of the SAW filter utilizing the surface acoustic wave and a multilayered product portion 1602 constituting the branching filter of branching the low frequency band in the transmitting and receiving frequency band of GSM and the high frequency bands in the transmitting frequency band of W-CDMA and the transmitting and receiving frequency band of DCS, the switching circuit of switching between the transmitting and receiving of the low frequency band in the transmitting and receiving frequency band of GSM, and the switching circuit of switching between the transmitting and receiving of the high frequency bands in the transmitting frequency band of W-CDMA and the transmitting and receiving frequency band of DCS.

It is possible, by performing such integration, to render them smaller-size, and it has the effect of doing without the matching circuit required when mounting each of them on the mobile communication equipment by the soldering and so on.

Furthermore, it is possible to implement the smaller size and lower height by mounting the pin diodes by wire bonding and flip chip and using the printed resistor.

In addition, as the ground electrode is formed on the bottom face, it has an effect that, when mounted on the mobile communication equipment by the soldering and so on, it can be shielded from the undesired signals of a mounting substrate or peripheral circuit parts of the mobile communication equipment.

Thirteenth Embodiment

Figure 42:
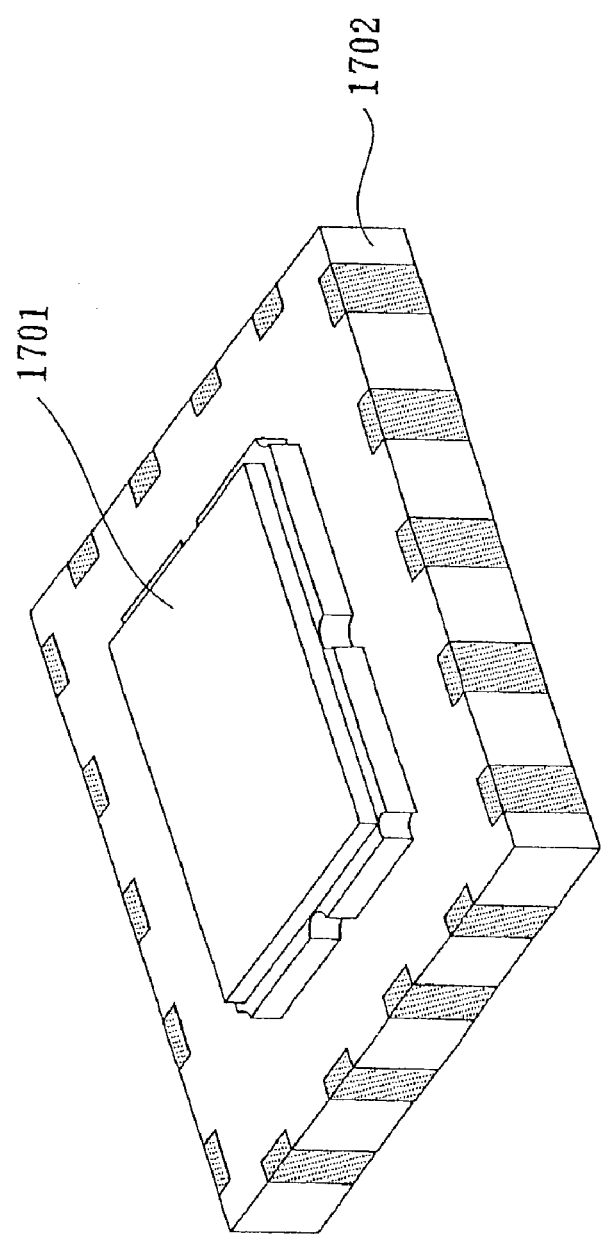
FIG. 42 is a perspective view of the multilayered product integrating a 1 input-4 output or 1 input-5 output GaAs (gallium arsenide) switch and the layered type duplexer as in the eighth embodiment of the present invention.

Next, a thirteenth embodiment of the present invention will be described by referring to FIG. 42. Moreover, FIG. 42 is a perspective view of the multilayered product integrating a switching portion 1701 of a 1 input-4 output or 1 input-5 output GaAs (gallium arsenide) having the function of branching the branching filter of branching the low frequency band in the transmitting and receiving frequency band of GSM and the high frequency bands in the transmitting frequency band of W-CDMA and the transmitting and receiving frequency band of DCS, the switching circuit of switching between the transmitting and receiving of the low frequency band in the transmitting and receiving frequency band of GSM, and the switching circuit of switching between the transmitting and receiving of the high frequency bands in the transmitting frequency band of W-CDMA and the transmitting and receiving frequency band of DCS as in the tenth embodiment into the transmitting signal and receiving signal of GSM, the transmitting signal of W-CDMA, and the transmitting signal and receiving signal of DCS and the layered type duplexer 1702 of the 3-frequency branching circuit as in the eighth embodiment of the present invention.

The integration allows it to become smaller-size and lower-priced, and it has the effect of doing without the matching circuit required when mounting each of them on the mobile communication equipment by the soldering and so on.

Furthermore, it is possible to implement the smaller size and lower height by mounting GaAs (gallium arsenide) by wire bonding and flip chip.

In addition, as the ground electrode is formed on the bottom face, it has the effect that, when mounted on the mobile communication equipment by the soldering and so on, it can be shielded from the undesired signals of the mounting substrate or the peripheral circuit parts of the mobile communication equipment.

Fourteenth Embodiment

Figure 43:
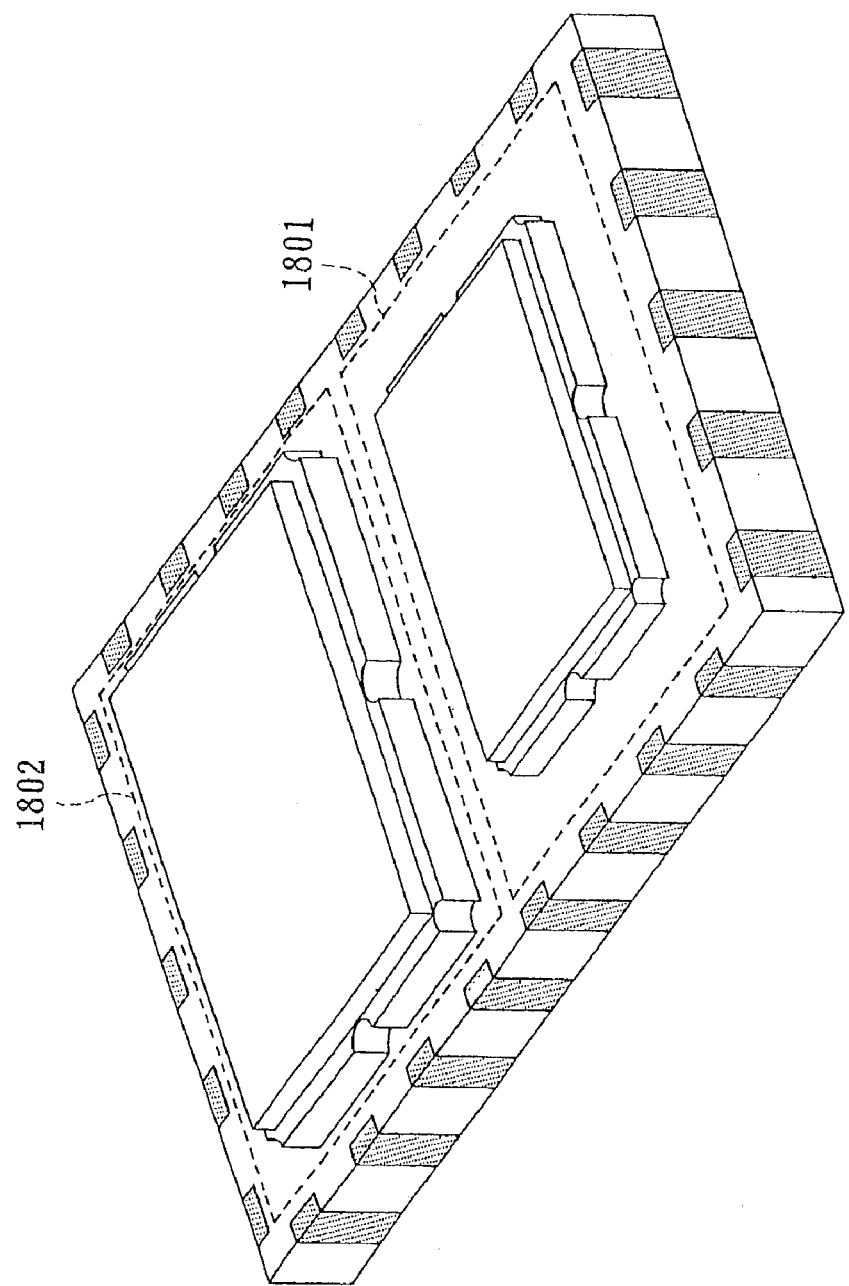
FIG. 43 is a perspective view of the multilayered product integrating the 1 input-4 output or 1 input-5 output GaAs (gallium arsenide) switch and a combination of the notch filter and band pass filter as in the eighth embodiment of the present invention.

Next, a fourteenth embodiment of the present invention will be described by referring to FIG. 43. Moreover, FIG. 43 is a perspective view of the device integrating a switching portion 1801 of a 1 input-4 output or 1 input-5 output GaAs (gallium arsenide) having the function of branching the branching filter of branching the low frequency band in the transmitting and receiving frequency band of GSM and the high frequency bands in the transmitting frequency band of W-CDMA and the transmitting and receiving frequency band of DCS, the switching circuit of switching between the transmitting and receiving of the low frequency band in the transmitting and receiving frequency band of GSM, and the switching circuit of switching between the transmitting and receiving of the high frequency bands in the transmitting frequency band of W-CDMA and the transmitting and receiving frequency band of DCS as in the tenth embodiment into the transmitting signal and receiving signal of GSM, the transmitting signal of W-CDMA, and the transmitting signal and receiving signal of DCS respectively, and the multilayered product portion 1802 integrating the combination of the notch filter passing the transmitting and receiving frequency band of GSM, the transmitting frequency band of W-CDMA and the transmitting and receiving frequency band of DCS and the band pass filter of passing the receiving frequency band of W-CDMA of the duplexer of the SAW filter utilizing the surface acoustic wave of the layered type duplexer of the 3-frequency branching circuit as in the eighth embodiment of the present invention.

The integration allows it to become smaller-size and lower-priced, and it has the effect of doing without the matching circuit required when mounting each of them on the mobile communication equipment by the soldering and so on.

Furthermore, it is possible to implement the smaller size and lower height by mounting GaAs (gallium arsenide) and the SAW filter by wire bonding and flip chip.

In addition, as the ground electrode is formed on the bottom face, it has the effect that, when mounted on the mobile communication equipment by the soldering and so on, it can be shielded from the undesired signals of the mounting substrate or the peripheral circuit parts of the mobile communication equipment.

Fifteenth Embodiment

Hereafter, the configuration and operation of the 3-frequency branching circuit according to a fifteenth embodiment of the present invention will be described by referring to FIG. 44, while taking as an example the circuit of the filter of passing the transmitting frequency bands and receiving frequency bands of the three frequencies of the GSM and DCS methods used in the mobile communication in Europe and the W-CDMA method expected to be introduced in future. Moreover, FIG. 44 shows a circuit diagram of the 3-frequency branching circuit according to this embodiment.

Figure 44:
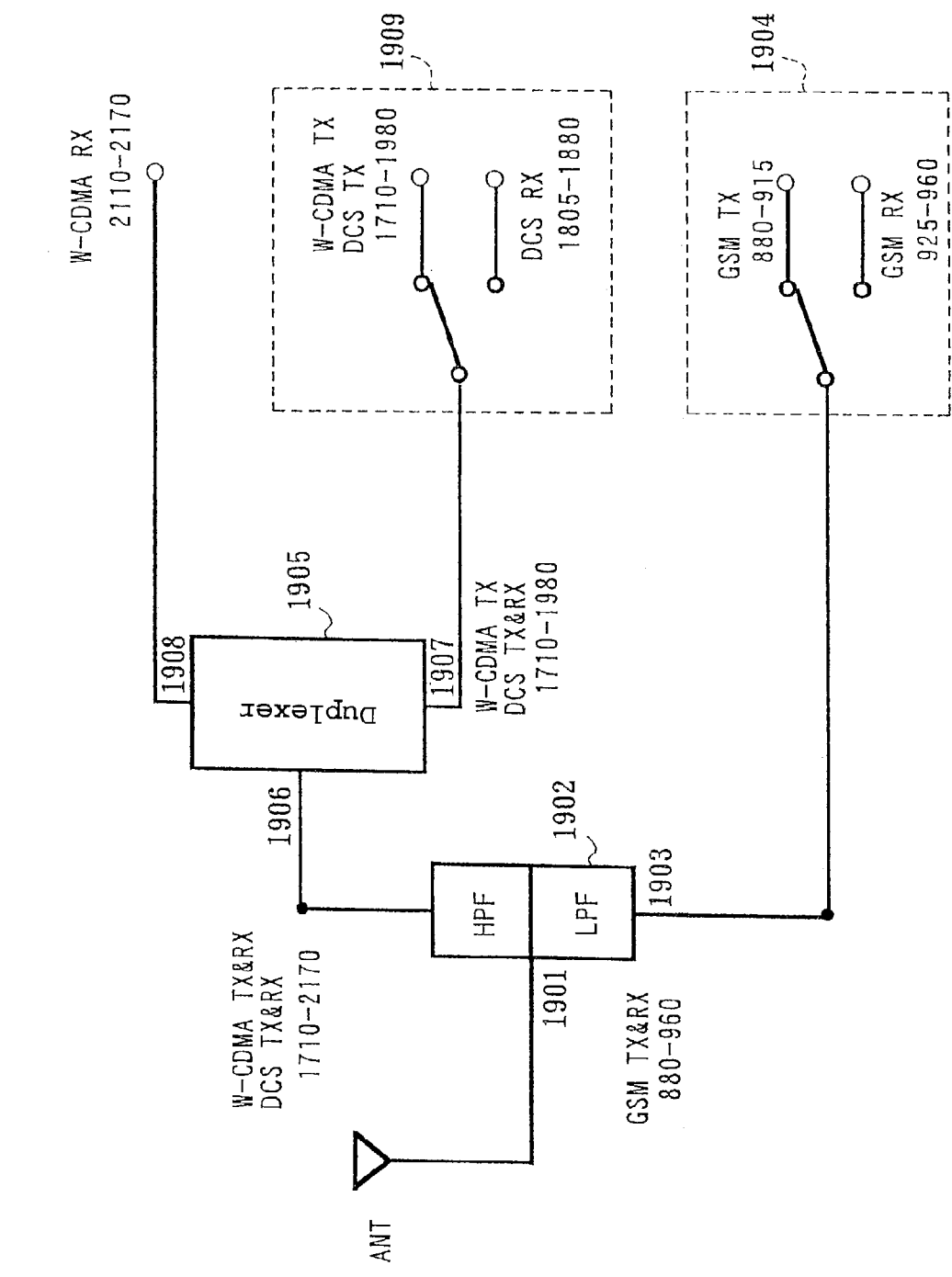
FIG. 44 is a circuit diagram of the 3-frequency branching circuit according to a fifteenth embodiment of the present invention.

In FIG. 44, the transmitting and receiving signal from an antenna terminal 1901 as the common terminal of the transmitting and receiving of GSM, the transmitting and receiving of W-CDMA and the transmitting and receiving of DCS is branched into the transmitting and receiving signal of GSM, the transmitting and receiving signal of W-CDMA and the transmitting and receiving signal of DCS by a branching circuit 1902 comprised of the low-pass filter and high-pass filter having a function of branching the low frequency band and high frequency band.

The transmitting and receiving signal of GSM branched by the branching circuit 1902 is branched into the transmitting signal and the receiving signal of GSM by a first transmitting and receiving switching circuit (hereafter, also referred to as a first transmitting and receiving change-over switch) 1904 from the first internal terminal 1903 which is the transmitting and receiving terminal of GSM.

The duplexer 1905 has broad bands such as 1710 to 1980 MHz as the transmitting frequency band of W-CDMA and the transmitting and receiving frequency band of DCS and 2110 to 2170 MHz as the receiving frequency band of W-CDMA, and has the function of branching narrow bands among the bands.

1710 to 1980 MHz as the transmitting frequency band of W-CDMA and the transmitting and receiving frequency band of DCS are branched from a second internal terminal 1906 which is the common terminal of the transmitting frequency band of W-CDMA, the transmitting and receiving frequency band of DCS and the receiving frequency band of W-CDMA to a fourth internal terminal 1907 which is the common terminal of the transmitting of W-CDMA and the transmitting and receiving of DCS and to a fifth internal terminal 1908 which is the receiving terminal of W-CDMA.

Furthermore, the transmitting signal of W-CDMA and the transmitting and receiving signal of DCS branched by a branching circuit 1902 are branched into the transmitting signal of W-CDMA, the transmitting signal of DCS and the receiving signal of DCS by a second transmitting and receiving switching circuit (hereafter, also referred to as a second transmitting and receiving change-over switch) 1909.

In this embodiment, (1) the coaxial type duplexer described in detail in the seventh embodiment of the present invention or (2) the layered type duplexer described in detail in the eighth embodiment of the present invention and the duplexer using the SAW filter are used for the configuration of branching the transmitting frequency band of W-CDMA, the transmitting and receiving frequency band of DCS and the receiving frequency band of W-CDMA.

As described above, this embodiment allows the simultaneous receiving of W-CDMA, GSM and DCS by using the branching circuit of branching the low frequency band and high frequency band around the antenna portion to branch the GSM transmitting and receiving signal from the W-CDMA and DCS transmitting and receiving signals first, using the duplexer next to branch the W-CDMA receiving signal, using the transmitting and receiving switching circuit to branch the GSM transmitting and receiving signal, and further using the transmitting and receiving switching circuit to branch the W-CDMA transmitting signal and the DCS transmitting and receiving signal.

Furthermore, the transmitting and receiving switching circuits 1904 and 1909 do not pass a current for the receiving of GSM and DCS not to mention the receiving of W-CDMA, leading to reduction in the current consumption, and besides, it also has the effect of rendering the circuit scale smaller, implementing the smaller size and reducing insertion losses by simultaneously performing the transmitting of W-CDMA and the transmitting of DCS.

Moreover, in the case of taking the circuit configuration described above, the transmitting and receiving signal of GSM is branched first by the branching circuit around the antenna portion and so the transmitting and receiving signal of GSM can be transmitted and received in a low-loss state so that high tone quality is assured for instance.

Sixteenth Embodiment

Next, the configuration and operation of the 3-frequency branching circuit according to a sixteenth embodiment of the present invention will be described. Here, the following will be described by referring to FIG. 45. (1) The branching filter of branching the low frequency band in the transmitting and receiving frequency band of GSM and the high frequency band in the transmitting frequency band of W-CDMA and the transmitting and receiving frequency band of DCS as in the fifteenth embodiment of the present invention, (2) the switching circuit of switching between the transmitting and receiving of the low frequency band in the transmitting and receiving frequency band of GSM, (3) the switching circuit of switching between the transmitting and receiving of the high frequency band in the transmitting frequency band of W-CDMA and the transmitting and receiving frequency band of DCS. Moreover, FIG. 45 is an equivalent circuit diagram of the 3-frequency branching circuit according to this embodiment.

Figure 45:
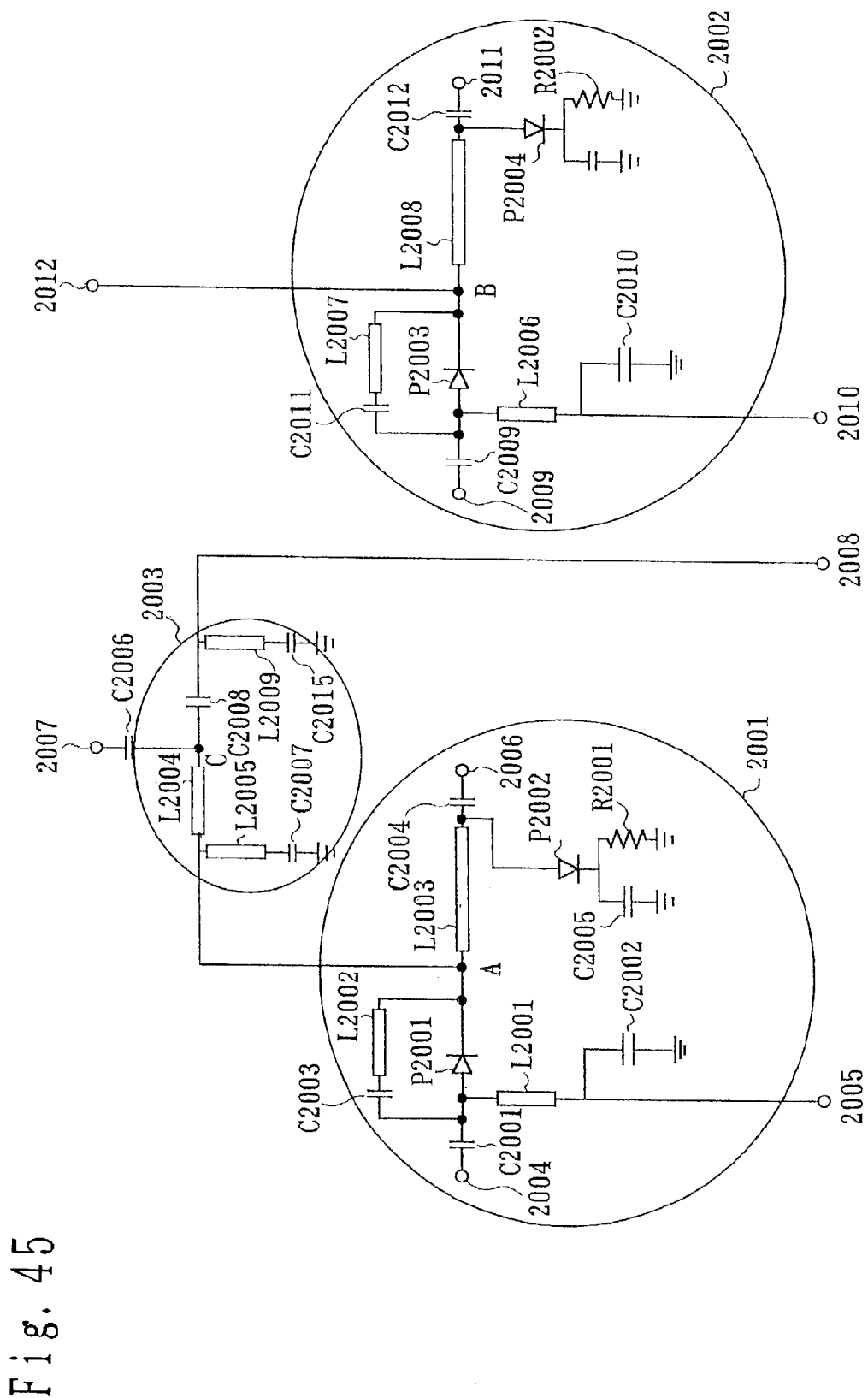
FIG. 45 is an equivalent circuit diagram of the 3-frequency branching circuit according to a sixteenth embodiment of the present invention.

In FIG. 45, reference numeral 2001 denotes the first transmitting and receiving switching circuit, 2002 denotes the second transmitting and receiving switching circuit, and 2003 denotes the branching circuit.

A transmitting circuit side terminal 2004 of GSM on the first transmitting and receiving switching circuit 2001 has the anode of a first diode P2001 connected thereto via a first capacitor C2001, and the cathode of the diode P2001 is connected to the contact A.

Furthermore, one end of a first strip line L2001 is connected between the anode of the first diode P2001 and the first capacitor C2001, and the other end of the first strip line L2001 is connected to a control terminal L2005.

The other end of the first strip line L2001 is further connected to the ground via a second capacitor C2002, and the control terminal 2005 plays a role of switching the transmitting and receiving signal of one of the transmitting and receiving change-over switches of GSM. In addition, the first diode P2001 has a second strip line L2002 and a series circuit of a third capacitor C2003 connected in parallel thereto.

A receiving circuit side terminal 2006 of GSM in the first transmitting and receiving switching circuit 2001 is connected to the anode of a second diode P2002 via a fourth capacitor C2004.

The cathode of the second diode P2002 is connected to the ground via a resistor R2001 and the parallel circuit of a fifth capacitor C2005. The anode of the second diode P2002 is further connected to one end of a third strip line L2003, and the other end of the third strip line L2003 is connected to the contact A.

The first transmitting and receiving switching circuit 2001 is connected to one end of a fourth strip line L2004 at the contact A, and the other end of the fourth strip line L2004 is connected to a common terminal 2007 of the transmitting and receiving signal of GSM, the transmitting and receiving signal of W-CDMA and the transmitting and receiving signal of DCS through the contact C and via a sixth capacitor C2006. In addition, the one end of the fourth strip line L2004 is connected to the ground side via a fifth strip line L2005 and the series circuit of a seventh capacitor C2007.

A common terminal 2008 of the transmitting and receiving signal of W-CDMA and the transmitting and receiving signal of DCS is connected to an eighth capacitor C2008, and is connected to the common terminal 2007 of the transmitting and receiving signal of GSM, the transmitting and receiving signal of W-CDMA and the transmitting and receiving signal of DCS through the contact C and via the sixth capacitor C2006. In addition, the common terminal 2008 of the transmitting and receiving signal of W-CDMA and the transmitting and receiving signal of DCS is connected to the ground side via a ninth strip line L2009 and the series circuit of a fifteenth capacitor C2015.

A transmitting circuit side terminal 2009 of W-CDMA and DCS in the second transmitting and receiving switching circuit 2002 is connected to the anode of a third diode P2003 via the ninth capacitor C2009, and the cathode of the third diode P2003 is connected to the contact C.

Furthermore, one end of a sixth strip line L2006 is connected between the anode of the third diode P2003 and the ninth capacitor C2009, and the other end of the sixth strip line L2006 is connected to a control terminal 2009. In addition, the other end of the sixth strip line L2006 is further connected to the ground via a tenth capacitor C2010, and a control terminal 2010 plays a role of switching the transmitting and receiving signal of one of the transmitting and receiving change-over switches of W-CDMA and DCS.

The third diode P2003 further has a seventh strip line L2007 and a series circuit of an eleventh capacitor C2011 connected in parallel thereto.

A receiving circuit side terminal 2011 of DCS in the second transmitting and receiving switching circuit 2002 is connected to the anode of a fourth diode P2004 via a twelfth capacitor C2012, and the cathode of the fourth diode P2004 is connected to the ground via a resistor R2002 and a parallel circuit of a thirteenth capacitor C2013.

The anode of the fourth diode P2004 is further connected to one end of an eighth strip line L2008, and the other end of the eighth strip line L2008 is connected to the contact B.

The second transmitting and receiving switching circuit 2002 is connected to a fourteenth capacitor C2014 at the contact B, and is connected to a common terminal 2012 of the transmitting and receiving signal of W-CDMA and the transmitting and receiving signal of DCS.

Moreover, the same results can also be obtained by adding the inductance elements instead of the resistors R2001 and R2002 and putting the resistors R2001 and R2002 between the first strip line L2001 and the control terminal 2005 and between the sixth strip line L2006 and the control terminal 2009 respectively.

Next, the operation of the following constituted as above will be described while referring to FIG. 36. (1) The branching filter of branching the low frequency band in the transmitting and receiving frequency band of GSM and the high frequency band in the transmitting frequency band of W-CDMA and the transmitting and receiving frequency band of DCS, (2) the switching circuit of switching between the transmitting and receiving of the low frequency band in the transmitting and receiving frequency band of GSM, (3) the switching circuit of switching between the transmitting and receiving of the high frequency band in the transmitting frequency band of W-CDMA and the transmitting and receiving frequency band of DCS.

The fourth strip line L2004, the fifth strip line L2005 and the seventh capacitor C2007 form the low-pass filter of passing the low frequency as shown by the waveform 1 in FIG. 36, and the fifth strip line L2005 and the seventh capacitor C2007 are serially connected to the ground side so as to form the attenuation pole point A (refer to FIG. 36).

In addition, the thirteenth capacitor C2013, the ninth strip line L2009 and the fourteenth capacitor C2014 form the high-pass filter of passing the high frequency as shown by the waveform 2 in FIG. 36, and the ninth strip line L2009 and the fourteenth capacitor C2014 are serially connected to the ground side so as to form the attenuation pole point B (refer to FIG. 36).

A connection is made via such low-pass filter and high-pass filter to the common terminal of the transmitting and receiving signal of GSM, the transmitting and receiving signal of W-CDMA and the transmitting and receiving signal of DCS so that, when transmitting or receiving the low frequenciesignal such as the transmitting and receiving signal of GSM, the isolation is well provided to the low frequenciesignal by the attenuation pole B on the high-pass filter side from a contact C and the signal will not be leaked to the high-pass filter side.

Moreover, when transmitting or receiving the high frequenciesignal such as the transmitting and receiving frequenciesignals of W-CDMA and those of DCS, the isolation is well provided to the high frequenciesignal by the attenuation pole A on the low-pass filter side from the contact C and the signal will not be leaked to the low-pass filter side.

To be more specific, the branching circuit 2003 provides the function of branching the low frequenciesignal such as the transmitting and receiving signal of GSM and the high frequenciesignal such as the transmitting and receiving frequenciesignal of W-CDMA and that of DCS.

In the case of transmitting the low frequenciesignal such as the transmitting signal of GSM, the first diode P2001 and the second diode P2002 will be in the on state by applying the positive voltage to the control terminal 2005.

At this time, the capacitors C2001, C2004 and C2006 cut the DC component, and so the current does not run to each terminal. Moreover, the current value can be controlled by rendering the resistor R2001 variable, and as to the signal transmitted from the transmitting terminal 2004, the impedance of the second strip line L2002 becomes infinite due to the second diode P2002 connected to the ground side. Thus, the signal transmitted from the transmitting terminal 2004 is not transmitted to the receiving side.

As the inductance component of the second diode P2002 resonates with the capacitor C2003, it is possible to render the impedance infinite when seeing the receiving side from the contact A at the transmitting frequency of the transmitting signal, and the transmitting signal is transmitted to a common terminal 2007 of the transmitting and receiving signal of GSM, the transmitting and receiving signal of W-CDMA and the transmitting and receiving signal of DCS through the low-pass filter.

Next, on receiving, the first diode P2001 and second diode P2002 are in the off state because no voltage is applied to the control terminal 2005 so that the signal is transmitted to the receiving side from the common terminal of the transmitting and receiving signal of GSM, the transmitting and receiving signal of W-CDMA and the transmitting and receiving signal of DCS.

At this time, as there is the capacitance component of the first diode P2001, the receiving signal is not always transmitted from the antenna to the receiving terminal 2006, and so the capacitance component of the first diode P2001 is resonated with the third strip line L2003. It is thereby possible to take the isolation of the transmitting terminal 2004 satisfactorily from the contact A at the receiving frequency of the receiving signal so that the receiving signal can be transmitted to the receiving terminal 2006 of GSM from the common terminal 2007 of the transmitting and receiving signal of GSM, the transmitting signal of W-CDMA and the transmitting and receiving signal of DCS via the low-pass filter.

Next, the cases of transmitting the high frequencies such as the transmitting and receiving signal of W-CDMA or that of DCS will be described.

The third diode P2003 and the fourth diode P2004 will be in the on state by applying the positive voltage to the control terminal 2010. At this time, the capacitors C2009, C2012 and C2014 cut the DC component, and so the current does not run to each terminal.

The current value can be controlled by rendering the resistor R2002 variable, and the signal transmitted from the transmitting terminal 2009 of W-CDMA and DCS is not transmitted to the receiving side because the impedance of the eighth strip line L2008 becomes infinite due to the fourth diode P2004 connected to the ground side.

At this time, as the inductance component of the fourth diode P2004 resonates with the capacitor C2012, it is possible to render the impedance infinite when seeing the receiving side from the contact B at the transmitting frequency of the transmitting signal, and the transmitting signal is transmitted to a common terminal 2012 of the transmitting signal of W-CDMA and the transmitting and receiving signal of DCS.

Next, on receiving of DCS, the third diode P2003 and fourth diode P2004 are in the off state because no voltage is applied to the control terminal 2010 so that the receiving signal of DCS is transmitted to the receiving side from the common terminal of the transmitting signal of W-CDMA and the transmitting and receiving signal of DCS.

At this time, as there is the capacitance component of the third diode P2003, the receiving signal of DCS is not always transmitted to the receiving terminal 2011 from the common terminal of the transmitting signal of W-CDMA and the transmitting and receiving signal of DCS, and so the capacitance component of the third diode P2003 is resonated with the seventh strip line L2007. It is thereby possible to take the isolation of the transmitting terminal 2009 satisfactorily from the contact B to the receiving frequency of the receiving signal of DCS so that the receiving signal of DCS can be efficiently transmitted to the common terminal 2012 of the transmitting signal of W-CDMA and the transmitting and receiving signal of DCS.

As described above, this embodiment provides the low-pass filter of passing the low frequency through the common terminal of the transmitting and receiving signal of GSM, the transmitting signal of W-CDMA and transmitting and receiving signal of DCS and the high-pass filter of passing the high frequency through it, and provides the circuit of dividing the transmitting and receiving signals of GSM on the low-pass filter side, and also provides the circuit of dividing the transmitting and receiving as to the transmitting signals of W-CDMA and DCS and the receiving signal of DCS on the high-pass filter side so as to allow the transmitting and receiving of the three frequencies.

In addition, it is possible to eliminate the undesired signals of the waves by two to three times more than the transmitting frequency band of W-CDMA and DCS by using the band pass filter in the high-pass filter portion of the branching circuit having the low-pass filter of passing the low frequency through the common terminal of the transmitting and receiving signal of GSM, the transmitting signal of W-CDMA and transmitting and receiving signal of DCS and the high-pass filter of passing the high frequency through it.

Seventeenth Embodiment

Figure 47:
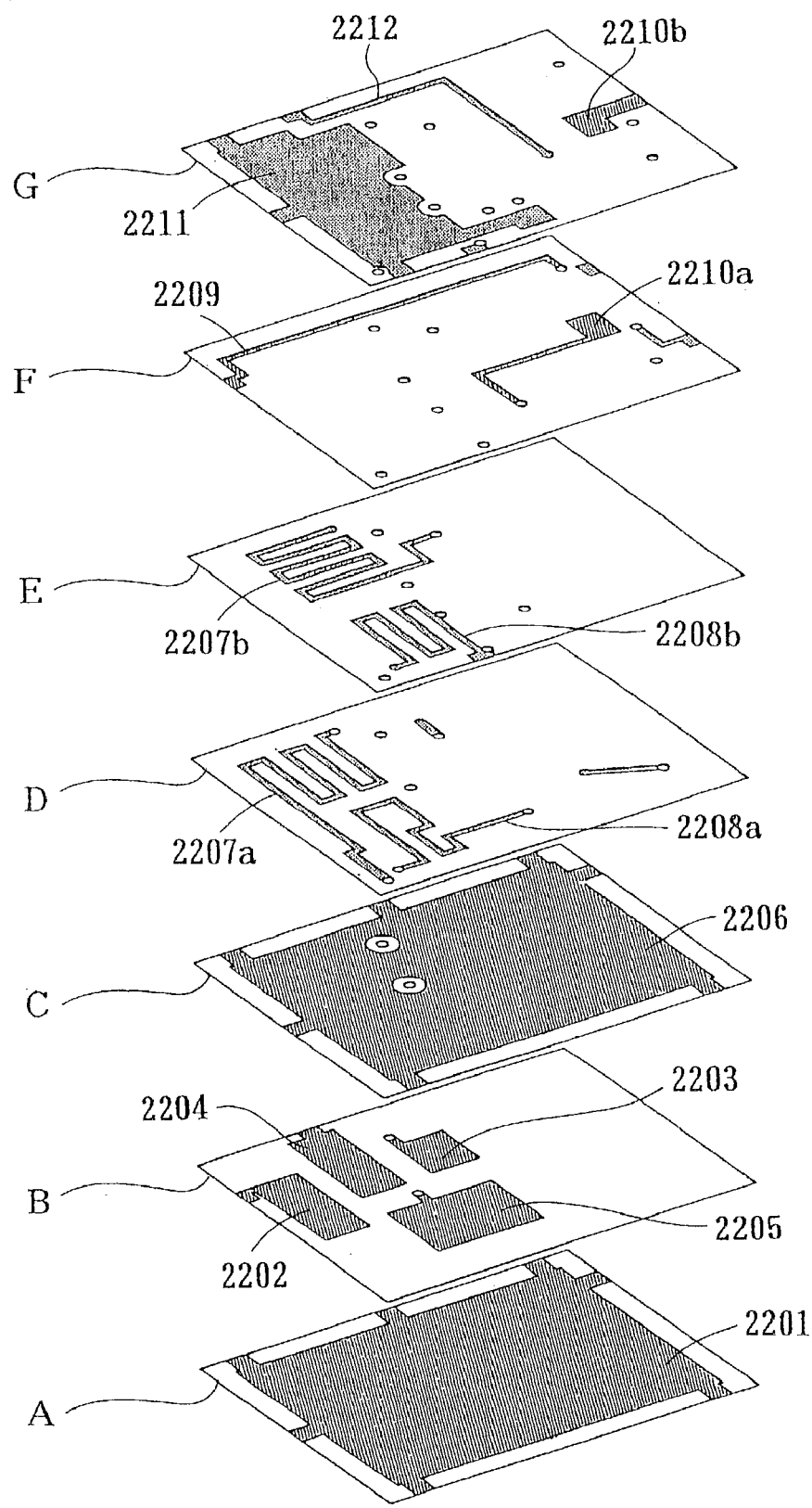
FIG. 47 is an exploded perspective view of the device (lower half) including the first switching circuit and second switching circuit according to the seventeenth embodiment of the present invention.
Figure 48:
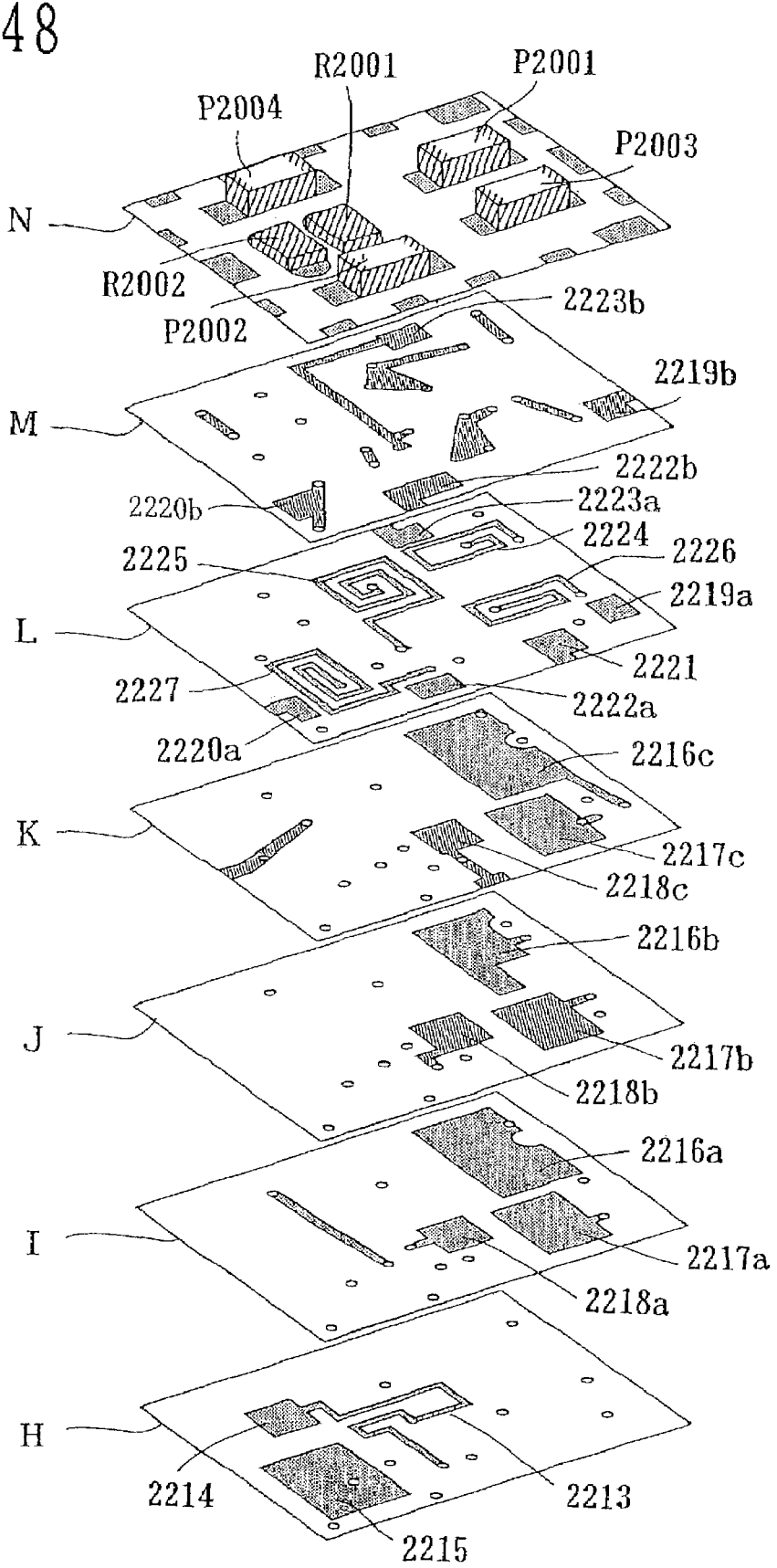
FIG. 48 is an exploded perspective view of the device (upper half) including the first switching circuit and second switching circuit according to the seventeenth embodiment of the present invention.

Next, the configuration and operation of the 3-frequency branching circuit according to a seventeenth embodiment of the present invention will be described. As the configuration and operation of the 3-frequency branching circuit according to this embodiment are almost the same as those in the above-mentioned fifteenth embodiment, the configuration and operation of the following will be described as the major differences therefrom by referring to FIGS. 46 to 48. (1) The branching filter of branching the low frequency band in the transmitting and receiving frequency band of GSM and the high frequency band in the transmitting and receiving frequency band of W-CDMA and the transmitting and receiving frequency band of DCS, (2) the switching circuit of switching between the transmitting and receiving of the low frequency band in the transmitting and receiving frequency band of GSM, (3) the switching circuit of switching between the transmitting and receiving of the high frequency band in the transmitting frequency band of W-CDMA and the transmitting and receiving frequency band of DCS. Moreover, FIG. 22 is a perspective view of the multilayered product of the branching filter of branching the low frequency band of the transmitting and receiving frequency band of GSM and the high frequency band of the transmitting and receiving frequency band of W-CDMA and the transmitting and receiving frequency band of DCS according to this embodiment. In addition, FIGS. 47 and 48 are exploded perspective views of the upper half and lower half of the device including the switching circuit of switching between the transmitting and receiving of the low frequency band of the transmitting and receiving frequency band of GSM and the switching circuit of switching between the transmitting and receiving of the high frequency band of the transmitting frequency band of W-CDMA and transmitting and receiving frequency band of DCS respectively.

Figure 46:
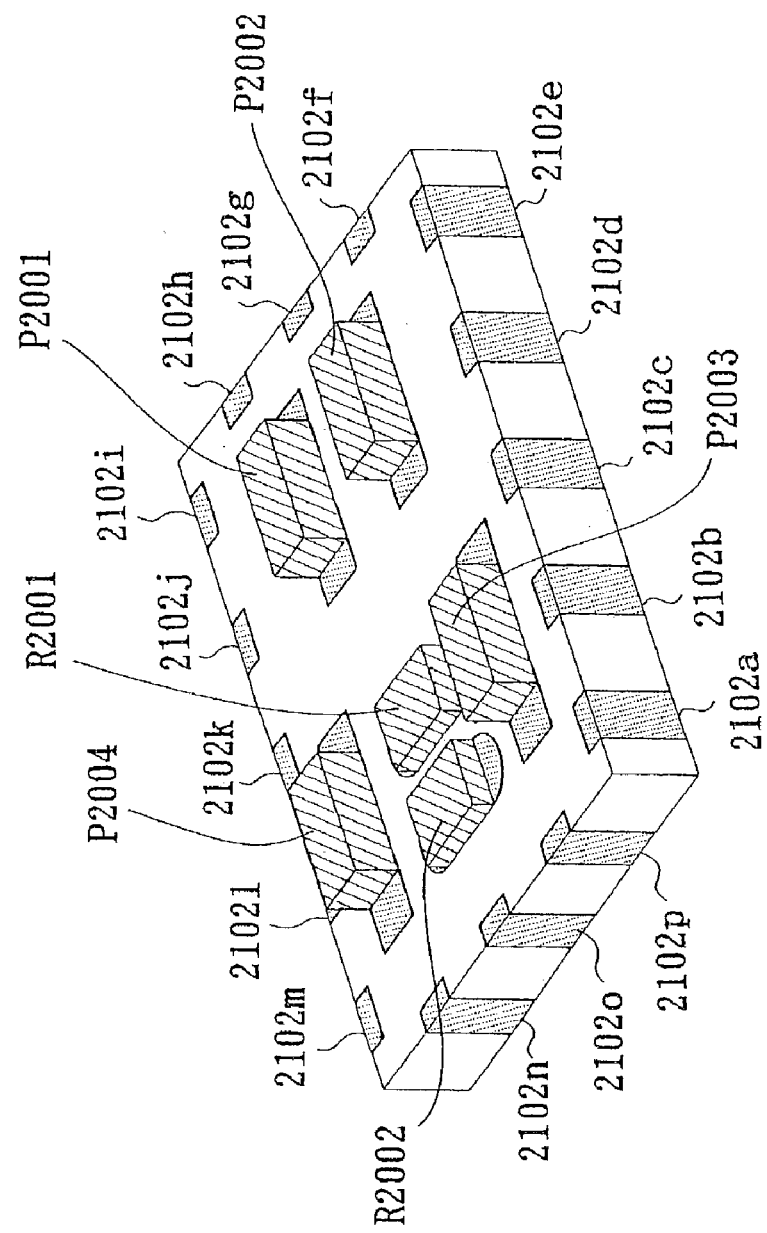
FIG. 46 is a perspective view of the multilayered product of the branching filter according to a seventeenth embodiment of the present invention.

In FIG. 46, a multilayered product 2101 of the branching filter of branching the low frequency band in the transmitting and receiving frequency band of GSM and the high frequency band in the transmitting frequency band of W-CDMA and the transmitting and receiving frequency band of DCS, the switching circuit of switching between the transmitting and receiving of the low frequency band in the transmitting and receiving frequency band of GSM, and the switching circuit of switching between the transmitting and receiving of the high frequency band in the transmitting frequency band of W-CDMA and the transmitting and receiving frequency band of DCS is formed by a large number of dielectric layers.

External electrodes 2102a, 2102b, 2102c, 2102d, 2102e, 2102f, 2102g, 2102h, 2102i, 2102j, 2102k, 2102l, 2102m, 2102n, 2102o and 2102p are provided on and in the proximity of the sides of the multilayered product 2101.

In addition, the diodes P2001, P2002, P2003 and P2004 and the resistor R2001, and R2002 are mounted on the top face of the multilayered product 2101 by soldering and so on. Moreover, the diodes may be bare chip-packaged or flip chip-packaged, and the resistor may be the printed resistor.

In FIG. 47, the layer A has a first ground electrode 2201 formed therein. In addition, the layer B has second, fifth, tenth and thirteenth capacitor coupling electrodes 2202, 2203, 2204 and 2205 formed therein, and furthermore, the layer C has a second ground electrode 2206 formed therein.

The layers D and E have strip line electrodes 2207a, 2207b, 2208a and 2208b of the third and eighth strip lines formed therein by dividing them in two layers. In addition, the layer F has a strip line electrode 2209 of the first strip line and one capacitor coupling electrode 2210a of a fourteenth capacitor formed therein.

The layer G has a third ground electrode 2211, a strip line electrode 2212 of the sixth strip line and the other capacitor coupling electrode 2210b of the fourteenth capacitor formed therein.

In FIG. 48, the layer H has a strip line electrode 2213 of the fifth strip line, a capacitor coupling electrode 2214 of the seventh capacitor and a capacitor coupling electrode 2215 of the fifteenth capacitor formed therein.

The layer I has capacitor coupling electrodes 2216a, 2217a and 2218a on one side each of the third, eleventh and eighth capacitors formed therein, and the layer J has capacitor coupling electrodes 2216b, 2217b and 2218b on the one side each of the third, eleventh and eighth capacitors formed therein. The layer K has capacitor coupling electrodes 2216c, 2217c and 2218c on the other side each of the third, eleventh and eighth capacitors formed therein. The layer L has capacitor coupling electrodes 2219a, 2220a, 2221a, 2222a, and 2223a on one side each of the first, fourth, ninth, twelfth and sixth capacitors formed therein, and further has strip line electrodes 2224, 2225, 2226, and 2227 of the second, fourth, seventh and ninth strip lines formed therein. The layer M has capacitor coupling electrodes 2219b, 2220b, 2222b and 2223b on one side each of the first, fourth, twelfth and sixth capacitors formed therein. The layer N has the first, second, third and fourth diodes P2001, P2002, P2003 and P2004 and the first and second resistor R2001, and R2002 mounted thereon.

Moreover, it goes without saying that the layers A to N described above are layered in this order.

The external electrode 2102n (refer to FIG. 46) has the capacitor coupling electrode 2202 connected thereto, and the capacitor coupling electrode 2202 is sandwiched between the ground electrode 2201 and 2206 and connected to the ground.

Furthermore, the external electrode 2102n (refer to FIG. 46) is connected to one end of the strip line electrode 2209, and the other end of the strip line electrode 2209 is connected to the capacitor coupling electrodes 2219a, 2216a and 2216c and to the anode side of the diode P2001 through the via hole. In addition, the external electrode 2102n plays a role of the control terminal, and is connected to the external control circuit.

The external electrode 2102f (refer to FIG. 46) has the capacitor coupling electrode 2219b forming a capacitor with the capacitor coupling electrode 2219a connected thereto. The capacitor coupling electrode 2216b sandwiched between the capacitor coupling electrodes 2216a and 2216c is connected to the cathode side of the diode P2001 (refer to FIG. 46) via the strip line electrode 2224 through the via hole.

The external electrode 2102p (refer to FIG. 46) has the capacitor coupling electrode 2220a connected thereto, and the capacitor coupling electrode 2220b forming the capacitor with the capacitor coupling electrode 2220a is connected to the anode of the diode P2002 through the via hole. Moreover, the cathode side of the diode P2002 (refer to FIG. 46) is connected to one end of the resistor R2001, and the other end of the resistor R2001 is connected to the ground from the external electrode 21020 through the via hole. In addition, the cathode side of the diode P2002 is connected to the capacitor coupling electrode 2205 through the via hole, and is connected to the ground via the ground electrodes 2201 and 2206.

The capacitor coupling electrode 2220b is connected to the strip line electrode 2207a through the via hole, and is connected to the cathode side of the diode P2001 via 2207b.

The cathode side of the diode P2001 (refer to FIG. 46) is connected to one end of the strip line 2225 through the via hole, and the other end of the strip line 2225 is connected to the capacitor coupling electrode 2223b through the via hole.

The capacitor coupling electrode 2223a forming the capacitor with the capacitor coupling electrode 2223b is connected to the external electrode 2102j. In addition, one end of the strip line 2225 has one end of the strip line 2213 connected thereto, and the other end of the strip line 2213 is connected to the capacitor coupling electrode 2214 to be connected to the ground via the ground electrode 2211. In addition, the other end of the strip line 2225 is connected to the capacitor coupling electrode 2223b.

Moreover, the capacitor coupling electrode 2223a forming the capacitor with the capacitor coupling electrode 2223b is connected to the external electrode 2102j (refer to FIG. 46). In addition, the other end of the strip line 2225 is connected to the capacitor coupling electrode 2218b, and the capacitor coupling electrode 2218a forming the capacitor with the capacitor coupling electrode 2218b is connected to the external electrode 2102c (refer to FIG. 46).

The external electrode 2102l (refer to FIG. 46) has the capacitor coupling electrode 2204 connected thereto, and the capacitor coupling electrode 2204 is sandwiched between the ground electrodes 2201 and 2206 to be connected to the ground. Furthermore, the external electrode 2102l is connected to one end of the strip line electrode 2212, and the other end of the strip line electrode 2212 is connected to the capacitor coupling electrodes 2217a, 2217c and to the anode side of the diode P2003 through the via hole. In addition, the external electrode 2102l plays a role of the control terminal, and is connected to the external control circuit.

The external electrode 2102d (refer to FIG. 46) has the capacitor coupling electrode 2221 forming the capacitor with the capacitor coupling electrode 2217c connected thereto. The capacitor coupling electrode 2217b sandwiched between the capacitor coupling electrodes 2217a and 2217c is connected to the cathode side of the diode P2003 (refer to FIG. 46) via the strip line electrode 2226 through the via hole.

The external electrode 2102b (refer to FIG. 46) has the capacitor coupling electrode 2222b connected thereto, and the capacitor coupling electrode 2222a forming the capacitor with the capacitor coupling electrode 2222b is connected to the anode of the diode P2004 through the via hole. Moreover, the cathode side of the diode P2004 is connected to one end of the resistor R2002, and the other end of the resistor R2002 is connected to the ground from the external electrode 2102o through the via hole. In addition, the cathode side of the diode P2004 is connected to the capacitor coupling electrode 2203 through the via hole, and is connected to the ground via the ground electrodes 2201 and 2206.

Furthermore, the capacitor coupling electrode 2222a is connected to the cathode side of the diode P2003 via the strip line electrodes 2208a and 2208b through the via hole. Moreover, the cathode side of the diode P2003 is connected to the capacitor coupling electrode 2210b through the via hole, and the capacitor coupling electrode 2210a forming the capacitor with the capacitor coupling electrode 2210b is connected to the external electrode 2102g through the via hole.

Furthermore, the external electrodes 2102a, 2102e, 2102h, 2102i, 2102k, 2102m and 2102o (refer to FIG. 46) are connected to the terminals of the ground electrodes 2201 and 2206 (each has seven) and 2211 (it has three) in compliance with a predetermined rule.

The external electrode 2102f (refer to FIG. 46) is connected to the transmitting circuit in the subsequent stage of GSM, and the external electrode 2102p (refer to FIG. 46) is connected to the receiving circuit in the subsequent stage of GSM.

An external terminal 2102c (refer to FIG. 46) is connected to the common terminal of the transmitting and receiving signal of W-CDMA and the transmitting and receiving signal of DCS of the duplexer of branching the transmitting signal of W-CDMA, the transmitting and receiving signal of DCS and the receiving signal of W-CDMA, and an external terminal 2102d (refer to FIG. 46) is connected to the transmitting circuit in the subsequent stage of W-CDMA and DCS and an external terminal 2102b (refer to FIG. 46) is connected to the receiving circuit in the subsequent stage of DCS.

An external terminal 2102g (refer to FIG. 46) is connected to the common terminal of the transmitting signal of W-CDMA and the transmitting and receiving signal of DCS of the duplexer of branching the transmitting signal of W-CDMA, the transmitting and receiving signal of DCS and the receiving signal of W-CDMA, and the external terminal 2102d (refer to FIG. 46) is connected to the transmitting circuit in the subsequent stage of W-CDMA and DCS. Furthermore, an external terminal 2102j is connected to the antenna terminal.

It is possible, by using the multilayered substrate using the dielectrics shown in FIGS. 46 to 48, to implement the smaller sizes of the branching filter of branching the low frequency band in the transmitting and receiving frequency band of GSM and the high frequency bands in the transmitting frequency band of W-CDMA and the transmitting and receiving frequency band of DCS, the switching circuit of switching between the transmitting and receiving of the low frequency band in the transmitting and receiving frequency band of GSM, and the switching circuit of switching between the transmitting and receiving of the high frequency bands in the transmitting frequency band of W-CDMA and the transmitting and receiving frequency band of DCS of the present invention.

Moreover, it is possible to use the strip line electrodes 2209 and 2211 (refer to FIG. 47) as stubs by rendering them n times longer than wavelengths of the respective transmitting frequencies thereof so as to improve selectivity of the signals.

Furthermore, as the ground electrode is formed on the bottom face, it has an effect that, when mounted on the mobile communication equipment by the soldering and so on, it can be shielded from the undesired signals of a mounting substrate or peripheral circuit parts of the mobile communication equipment.

In addition, while the strip line has one-layer or two-layer structure in this embodiment, the same effect can also be obtained by rendering it as the structure of three or more layers.

Eighteenth Embodiment

Hereafter, the 3-frequency branching circuit according to an eighteenth embodiment of the present invention will be described by referring to FIG. 49, while taking as a concrete example the circuit of the filter of passing the transmitting frequency bands and receiving frequency bands of the three frequencies of the GSM and DCS methods used in the mobile communication in Europe and the W-CDMA method expected to be introduced in future. Moreover, FIG. 49 shows a circuit diagram of the 3-frequency branching circuit according to the eighteenth embodiment.

Figure 49:
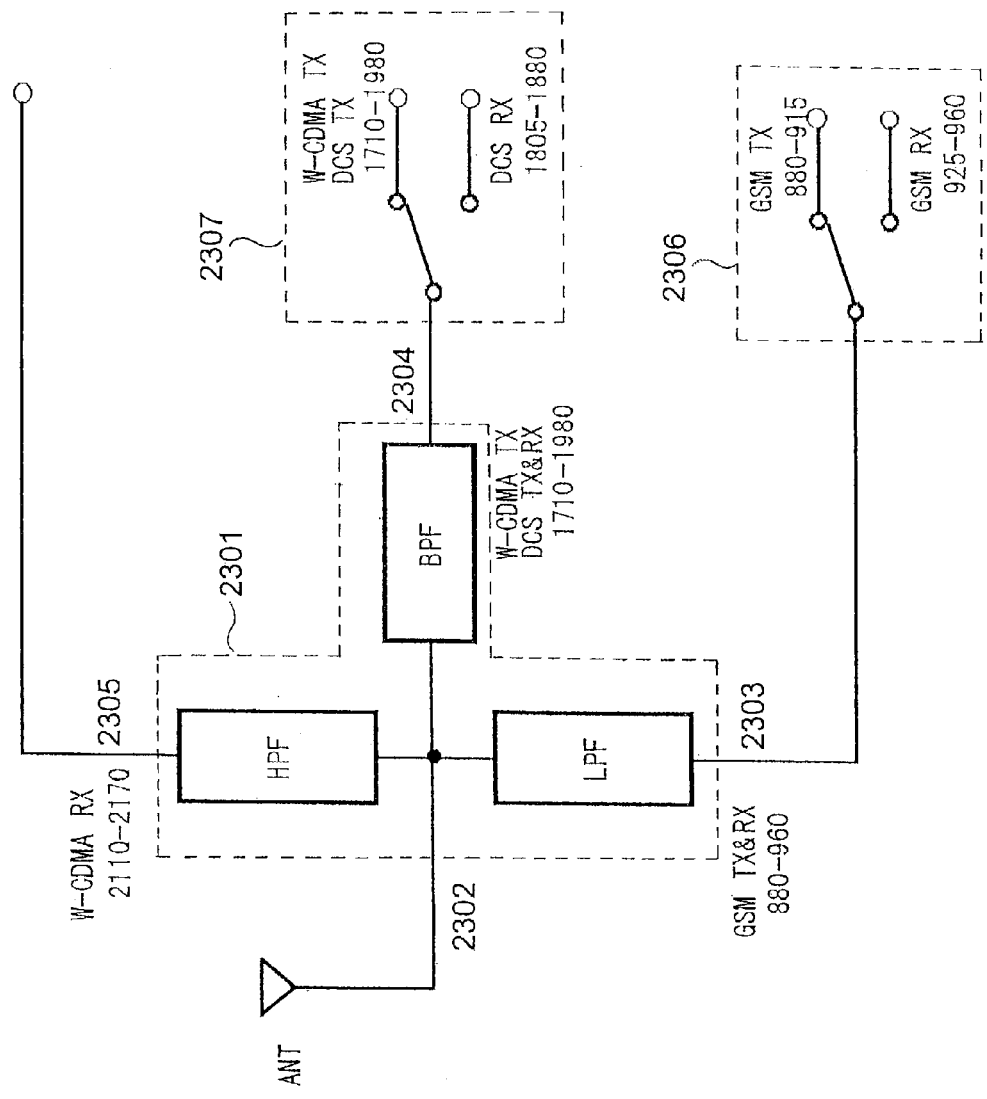
FIG. 49 is a circuit diagram of the 3-frequency branching circuit according to an eighteenth embodiment of the present invention.

In FIG. 49, reference numeral 2301 denotes the filter of which band widths are broad bands such as 880 to 960 MHz as the transmitting and receiving frequency band of GSM, 1710 to 1980 MHz as the transmitting frequency band of W-CDMA and the transmitting and receiving frequency band of DCS, and 2110 to 2170 MHz as the receiving frequency band of W-CDMA, and having the function of branching the narrow bands among the bands.

880 to 960 MHz which is the transmitting and receiving frequency band of GSM is branched by the low-pass filter having the function of branching the low frequency band from an antenna terminal 2302 to a first internal terminal 2303. In addition, 1710 to 1980 MHz which is the transmitting frequency band of W-CDMA and the transmitting and receiving frequency band of DCS is branched by the band pass filter having the function of branching the intermediate frequency band from the antenna terminal 2302 to a second internal terminal 2304. And 2110 to 2170 MHz which is the receiving frequency band of W-CDMA is branched by the high-pass filter having the function of branching the high frequency band from the antenna terminal 2302 to a third internal terminal 2305.

The transmitting and receiving signal of GSM branched by the low-pass filter is branched into the transmitting signal and receiving signal of GSM by a first transmitting and receiving switching circuit (hereafter, also referred to as the first transmitting and receiving change-over switch) 2306. In addition, the transmitting signal of W-CDMA and the transmitting and receiving signal of DCS branched by the band pass filter are branched into the transmitting signal of W-CDMA, the transmitting signal of DCS and the receiving signal of DCS by a second transmitting and receiving switching circuit (hereafter, also referred to as the second transmitting and receiving change-over switch) 2307.

As described above, this embodiment allows the simultaneous receiving of W-CDMA, GSM and DCS by branching around the antenna portion (1) the transmitting and receiving of GSM, (2) the transmitting of the W-CDMA and the transmitting and receiving of DCS and (3) the receiving of W-CDMA. Furthermore, it can do without an external matching circuit because the three frequencies are constituted by one circuit.

In addition, the transmitting and receiving switching circuits 2306 and 2307 do not pass the current on receiving of GSM and DCS not to mention receiving of W-CDMA, leading to reduction in current consumption. Furthermore, it also has the effect of rendering the circuit scale smaller, implementing the smaller size and reducing insertion losses by simultaneously performing the transmitting of W-CDMA and the transmitting of DCS.

Nineteenth Embodiment

Next, a nineteenth embodiment of the present invention will be described by referring to FIGS. 50 to 52.

The configuration and operation of a coaxial type duplexer of the 3-frequency branching circuit according to a nineteenth embodiment of the present invention will be described by using FIGS. 50 to 52. Moreover, FIG. 50 is an equivalent circuit diagram of the coaxial type, FIG. 51 is a top view thereof, and FIG. 52 is a characteristic view thereof.

Figure 50:
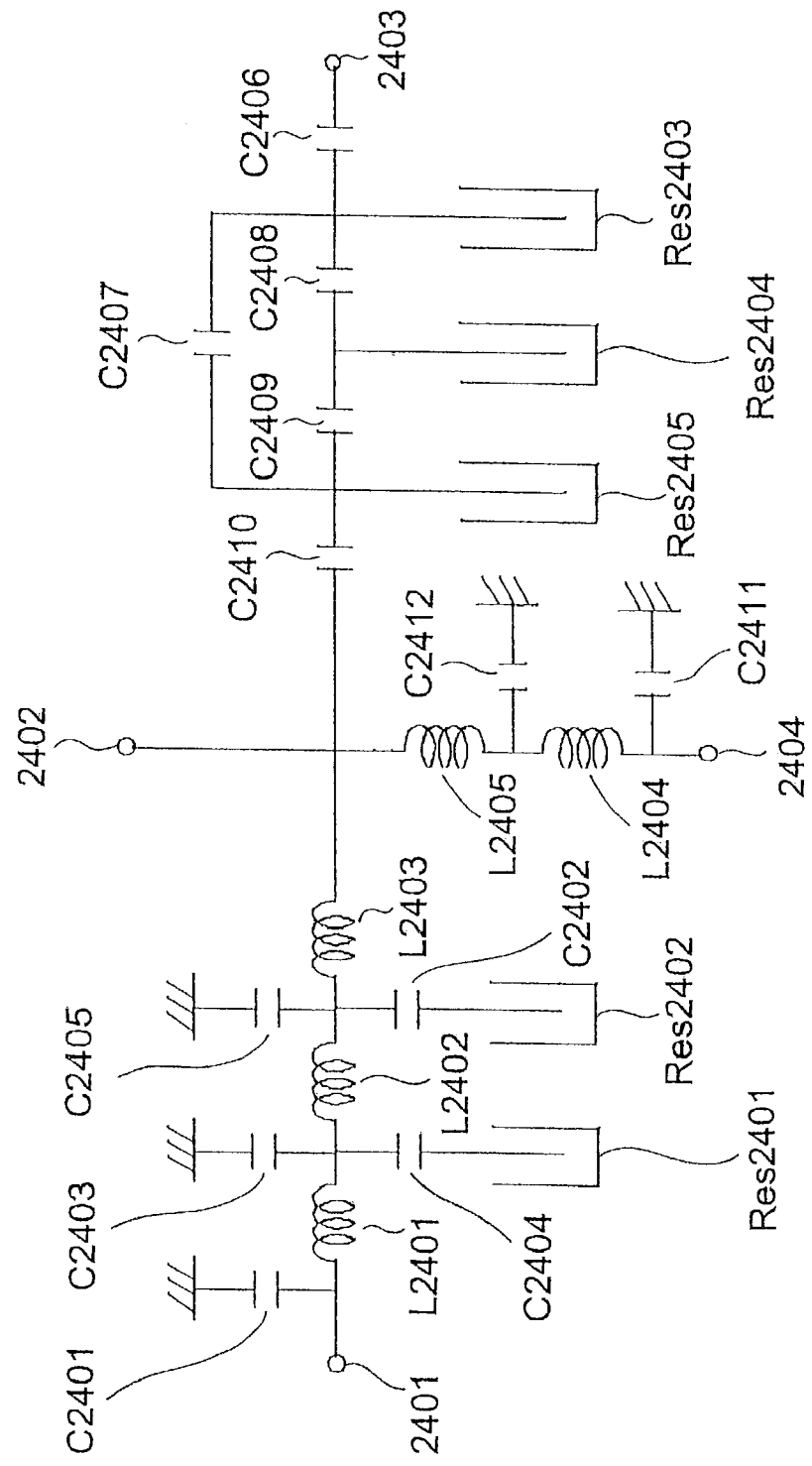
FIG. 50 is an equivalent circuit diagram of the coaxial type duplexer according to a nineteenth embodiment of the present invention.

In FIG. 50, a W-CDMA receiving terminal 2401 has a first capacitor C2401 connected to the ground and a first inductor L2401 connected thereto.

The other end of the first inductor L2401 is connected to a coaxial type resonator Res2401 via a second capacitor C2402. In addition, a third capacitor C2403 is connected to the ground and furthermore, a second inductor L2402 is connected thereto.

The other end of the second inductor L2402 is connected to a coaxial type resonator Res2402 via a fourth capacitor C2404. In addition, a fifth capacitor C2405 is connected to the ground, and a third inductor L2403 is connected thereto. Moreover, the other end of the third inductor L2403 is connected to an antenna terminal 2402 to be connected to the antenna.

A W-CDMA transmitting and DCS transmitting and receiving terminal 2403 has a sixth capacitor C2406 connected thereto, and the other end of the sixth capacitor C2406 is connected to a coaxial type resonator Res2403 in parallel, and is connected to a seventh capacitor C2407 and further to an eighth capacitor C2408.

The other end of the eighth capacitor C2408 is connected to a coaxial type resonator Res2404 in parallel, and is connected to a ninth capacitor C2409. The other end of the ninth capacitor C2409 is connected to a coaxial type resonator Res2405 in parallel, and is connected to the other end of the seventh capacitor C2407 and further to a tenth capacitor C2410 and to the antenna terminal 2402.

A GSM transmitting and receiving terminal 2404 is connected to an eleventh capacitor C2411 connected to the ground, and is also connected to a fourth inductor L2404.

The other end of the fourth inductor L2404 has a twelfth capacitor C2412 connected to the ground, and also has a fifth inductor L2405 connected thereto.

The other end of the fifth inductor L2405 is connected to the antenna terminal 2402 to be connected to the antenna.

The configuration of the coaxial type comprised of the equivalent circuit as above will be described by using FIG. 51.

Figure 51:
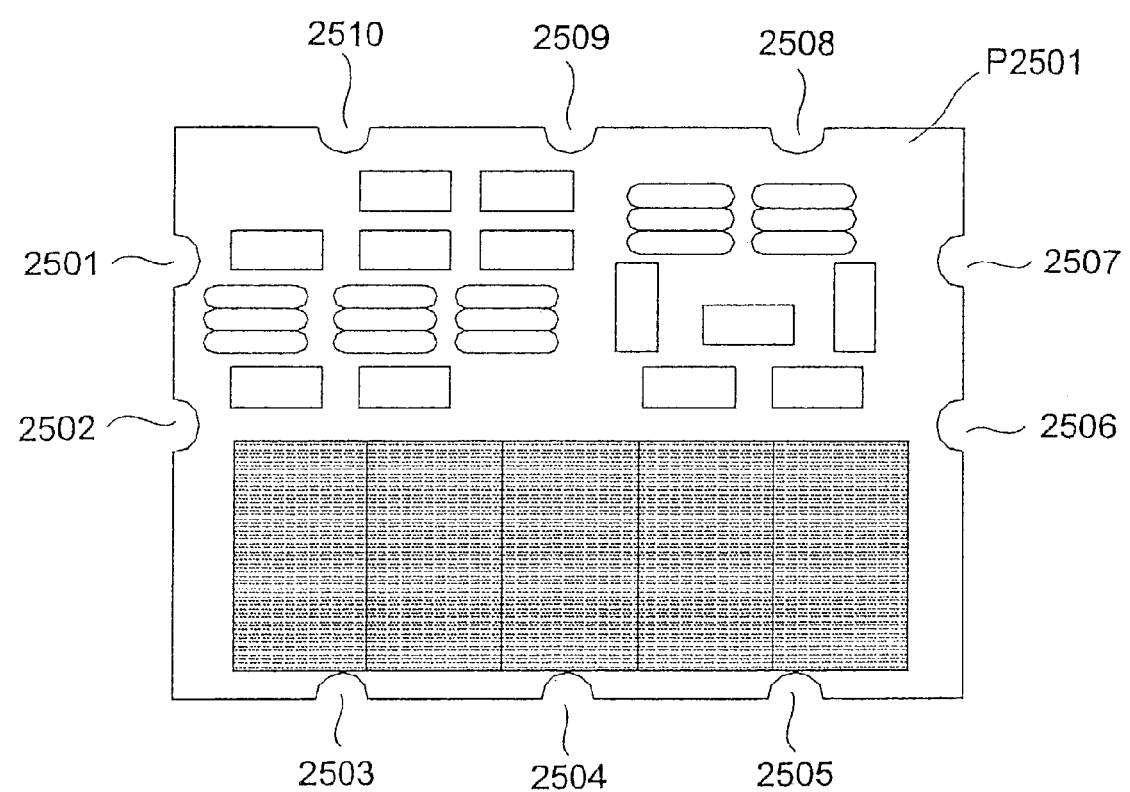
FIG. 51 is a top view of the coaxial type duplexer according to the nineteenth embodiment of the present invention.

In FIG. 51, a wiring substrate P2501 is made of glass epoxy and so on. Moreover, coaxial type resonators Res2401 to 2405 (refer to FIG. 50) are made of dielectrics and so on, and are mounted on the wiring substrate P2501 by the soldering and so on together with the inductor elements such as the air core coil and chip capacitor.

External terminals 2501, 2502, 2503, 2504, 2505, 2506, 2507, 2508, 2509 and 2510 are provided on the wiring substrate P2501. In addition, the external terminals 2501 is connected to the receiving terminal of W-CDMA, the external terminals 2509 to the antenna terminal, the external terminals 2507 to the transmitting and receiving terminal of GSM, and the external terminals 2508 to the transmitting terminal of W-CDMA and the transmitting and receiving terminal of DCS respectively, and the external terminals 2502, 2503, 2504, 2505, 2506 and 2510 have the ground terminals placed thereon.

Figure 52:
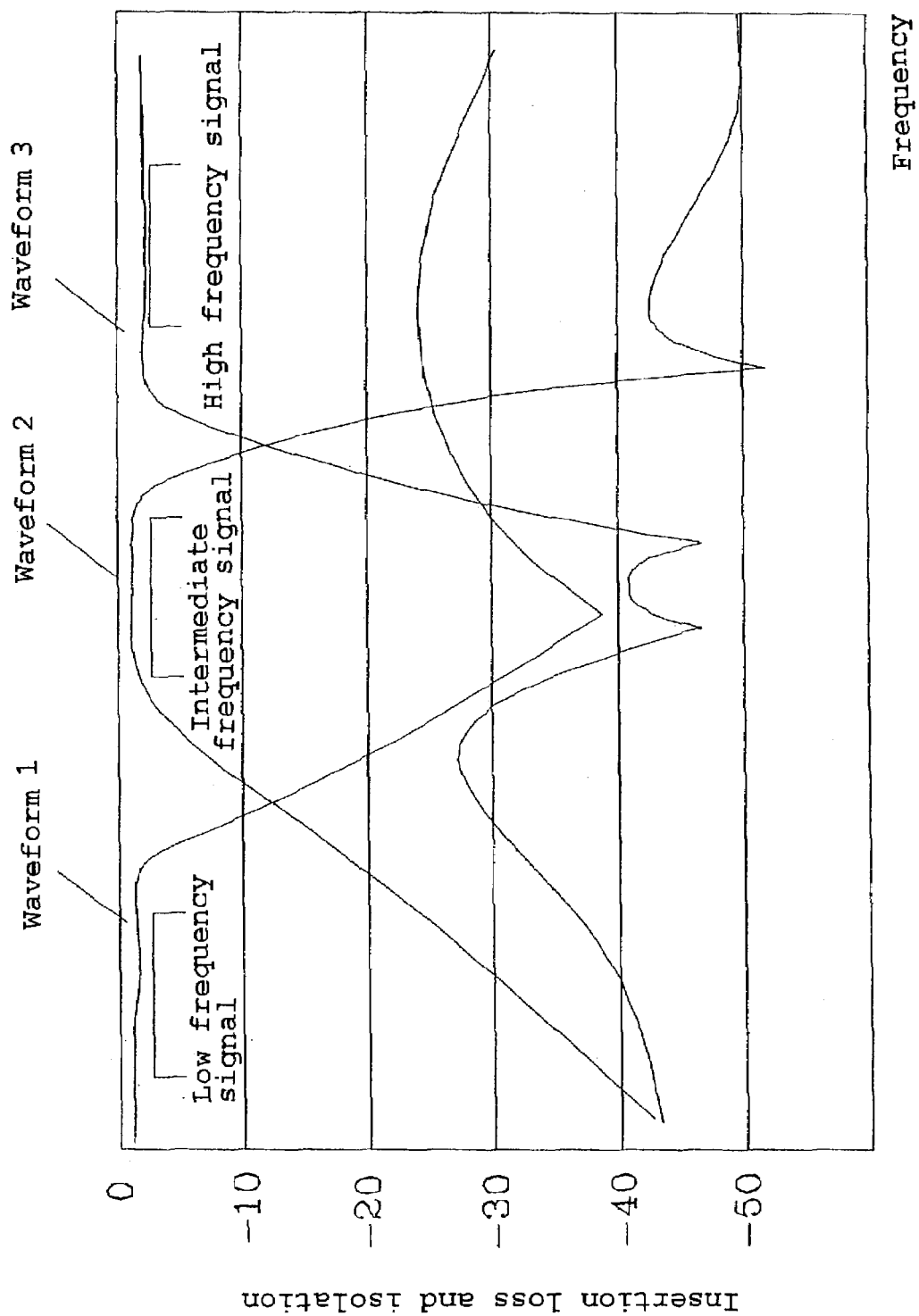
FIG. 52 is a characteristic view of the duplexer according to the nineteenth embodiment of the present invention.

In FIG. 52, the waveform 1 is a waveform diagram of the transmitting and receiving signal of GSM. In the waveform 1, the transmitting and receiving frequency band of GSM is passed by using the low-pass filter. In addition, the selectivity is improved by attenuating the transmitting and receiving frequency band of W-CDMA and the transmitting and receiving frequency band of DCS.

The waveform 2 is a waveform diagram of the transmitting signal of W-CDMA and the transmitting and receiving signal of DCS. In the waveform 2, the transmitting frequency band of W-CDMA and the transmitting and receiving frequency band of DCS are passed by using the band pass filter. Moreover, the selectivity is improved by attenuating the transmitting and receiving frequency band of GSM and the receiving frequency band of W-CDMA.

The waveform 3 is a waveform diagram of the receiving signal of W-CDMA. In the waveform 3, the receiving frequency band of W-CDMA is passed by using the notch filter. Moreover, the selectivity is improved by attenuating the transmitting and receiving frequency band of GSM, the transmitting frequency band of W-CDMA and the transmitting and receiving frequency band of DCS.

As described above, it is possible, according to this embodiment, to reduce the insertion losses of the transmitting and receiving signal of GSM, the transmitting signal of W-CDMA, the transmitting and receiving signal of DCS and the receiving signal of W-CDMA by using the duplexer and using the coaxial type.

Twentieth Embodiment

Next, a twentieth embodiment of the present invention will be described by referring to the drawings. Moreover, FIGS. 53 to 55 are a perspective view, an exploded perspective view and an equivalent circuit diagram of the multilayered product constituting the 3-frequency branching circuit according to the twentieth embodiment of the present invention.

Figure 53:
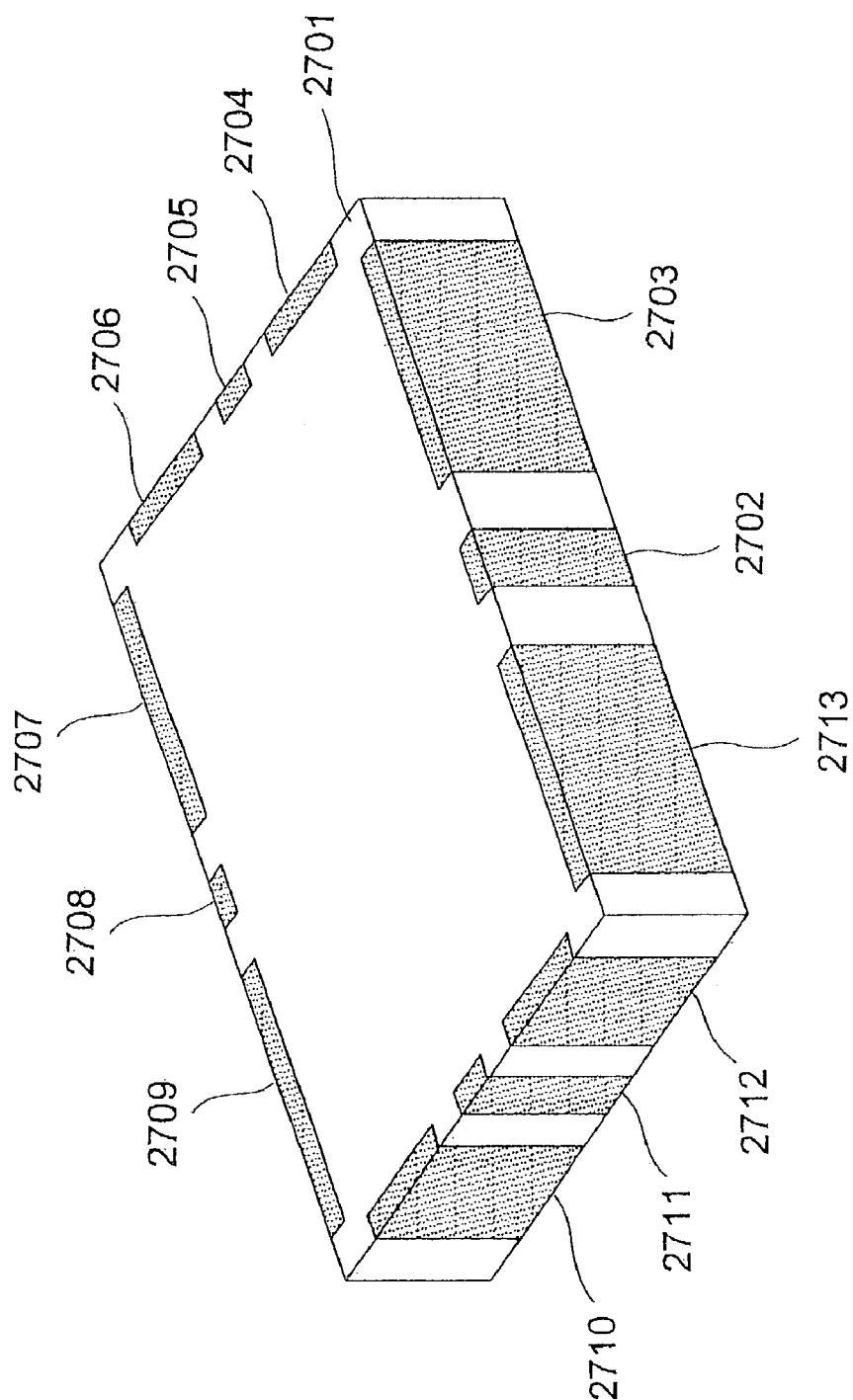
FIG. 53 is a perspective view of the layered type duplexer according to a twentieth embodiment of the present invention.

In FIG. 53, a multilayered product 2701 of the 3-frequency branching circuit is formed by a large number of the dielectric layers, and external electrodes 2702, 2703, 2704, 2705, 2706, 2707, 2708, 2709, 2710, 2711, 2712 and 2713 are provided on and in the proximity of the sides of the multilayered product 2701.

The configuration and circuit will be described in detail by referring to FIGS. 54 and 55.

Figure 54:
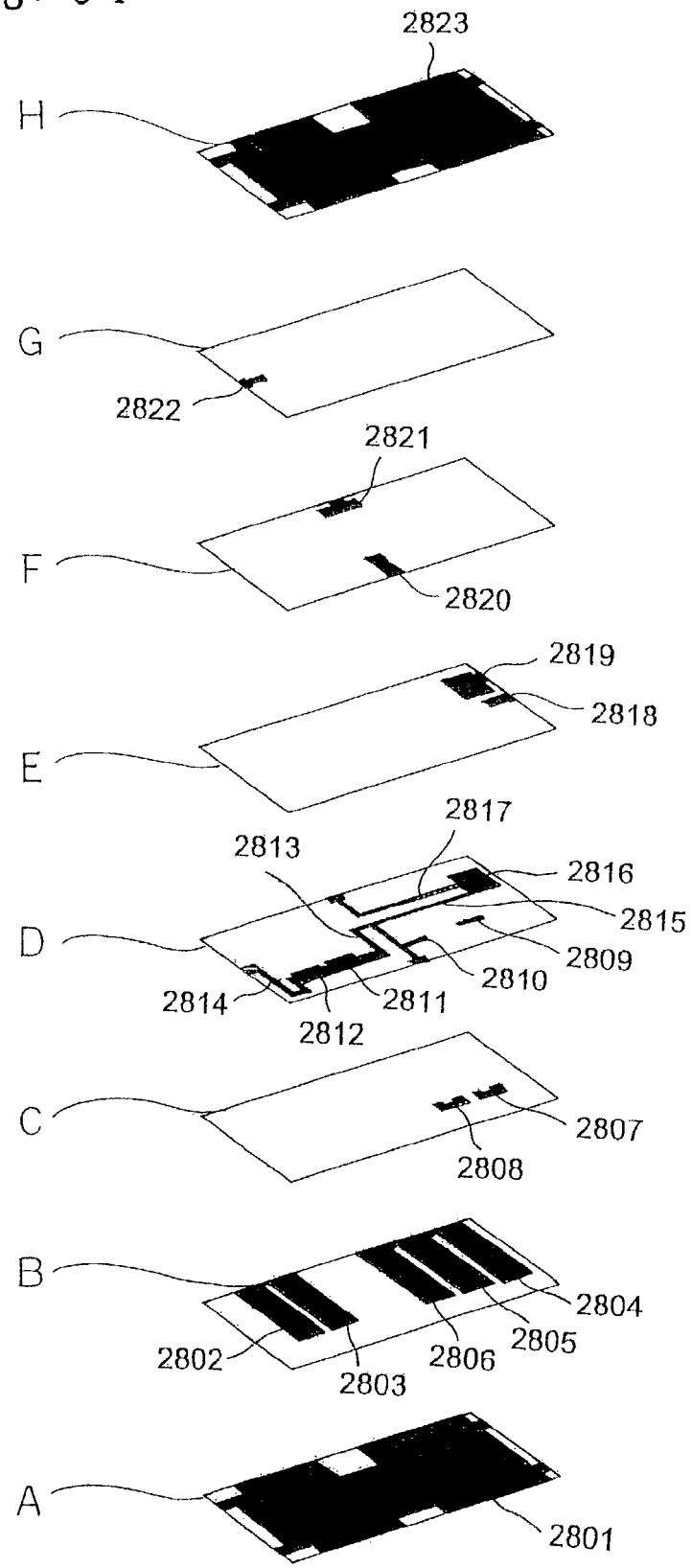
FIG. 54 is an exploded perspective view of the layered type duplexer according to the twentieth embodiment of the present invention.
Figure 55:
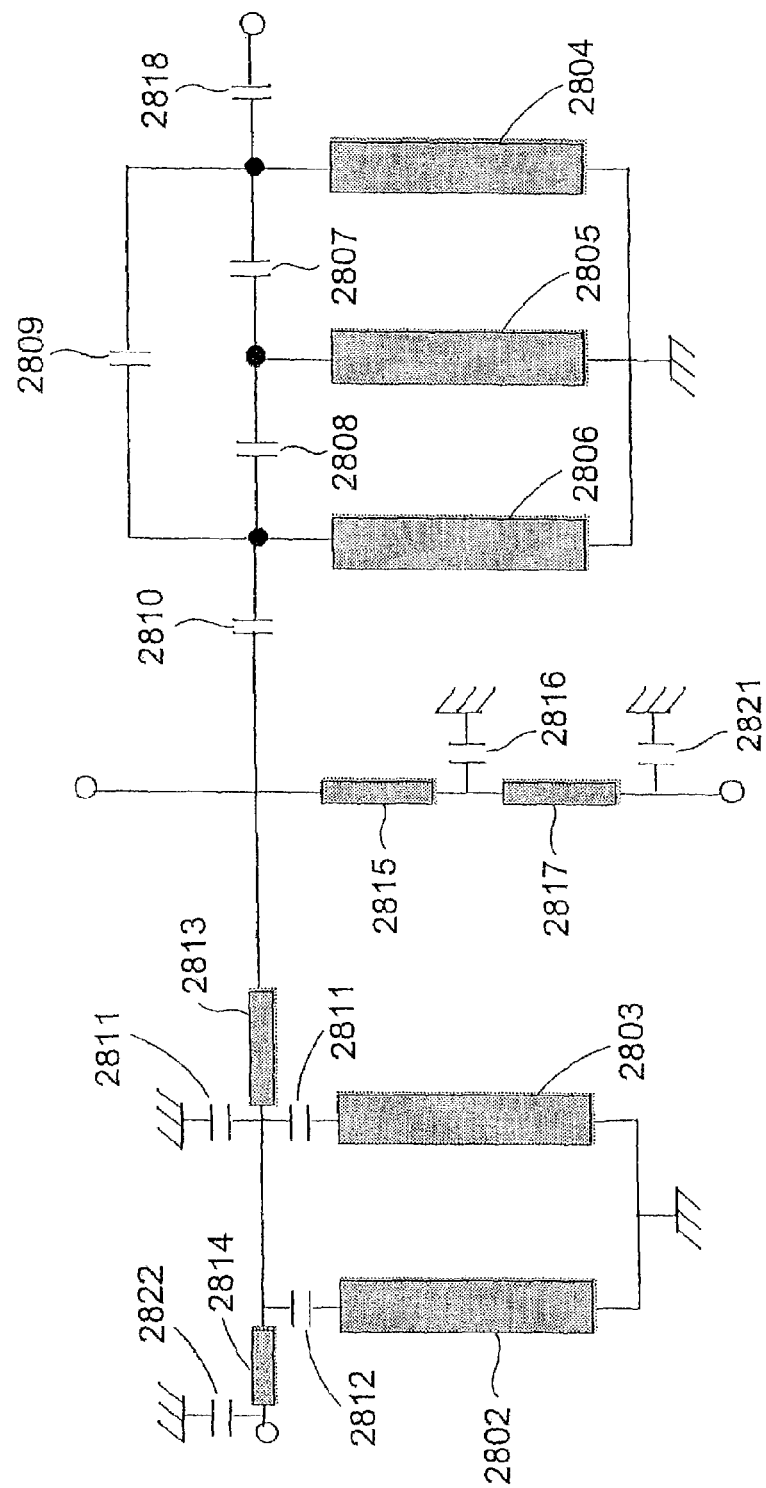
FIG. 55 is an equivalent circuit diagram of the layered type duplexer according to the twentieth embodiment of the present invention.
Figure 56:
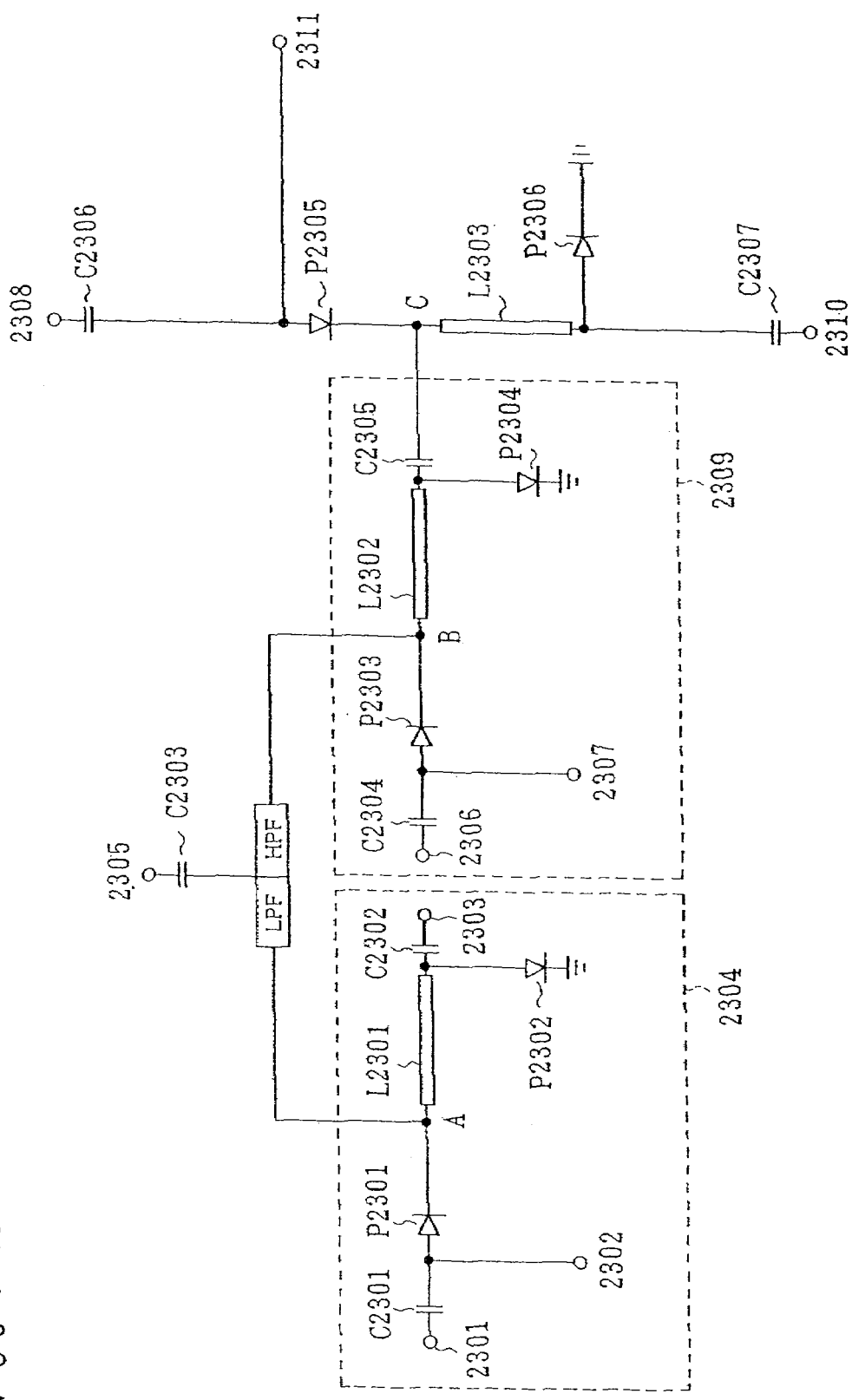
FIG. 56 is a circuit diagram of the 3-frequency branching circuit in the past.

The layer A in FIG. 54 has a first ground electrode 2801 formed therein. In addition, the layer B has first, second, third, fourth and fifth resonator electrodes 2802, 2803, 2804, 2805 and 2806 formed therein, and furthermore, the layer C has first and second capacitor coupling electrodes 2807 and 2808 formed therein.

The layer D has third, fourth, fifth, sixth and seventh capacitor coupling electrodes 2809, 2810, 2811, 2812 and 2816 and first, second, third and fourth strip line electrodes 2813, 2814, 2815 and 2817 formed therein.

The layers E, F and G have eighth, ninth, tenth, eleventh and twelfth capacitor coupling electrodes 2818, 2819, 2820, 2821 and 2822 formed therein. Furthermore, the layer H has a second ground electrode 2823 formed therein.

The external electrode 2711 (refer to FIG. 53) is the receiving terminal of W-CDMA, and the external electrode 2811 (refer to FIG. 54) has the strip line electrode 2814 connected thereto. Furthermore, the external electrode 2811 is connected to the ground by the ground electrode 2823 (refer to FIG. 54) via the capacitor coupling electrode 2822.

One end of the strip line electrode 2814 is connected to one end of the capacitor coupling electrode 2812, and the capacitor coupling electrode 2812 is connected to the resonator electrode 2802 via the layers C and D.

The other end of the capacitor coupling electrode 2812 is connected to one end of the capacitor coupling electrode 2811, and the capacitor coupling electrode 2811 is connected to the resonator electrode 2803 via the layers C and D.

The other end of the capacitor coupling electrode 2811 is connected to one end of the strip line electrode 2813, and one end of the strip line electrode 2813 is connected to one end of the capacitor coupling electrode 2820 (refer to FIG. 54) via the layers E and F. The other end of the capacitor coupling electrode 2820 is connected to the ground by the external electrode 2713 (refer to FIG. 53), and furthermore, the other end of the strip line electrode 2813 is connected to the external electrode 2702 (refer to FIG. 53) which is the antenna terminal so as to form the notch filter structure.

The external electrode 2705 (refer to FIG. 53) is the DCS transmitting and receiving and W-CDMA transmitting terminal, and is connected to one end of the capacitor coupling electrode 2818. The capacitor coupling electrode 2818 is connected to the resonator electrode 2804 via the layers C, D and E.

The resonator electrode 2804 is connected to the capacitor coupling electrode 2807 via the layer C, and the capacitor coupling electrode 2807 is connected to the resonator electrode 2805 via the layer C. In addition, the resonator electrode 2805 is connected to the capacitor coupling electrode 2808 via the layer C, and the capacitor coupling electrode 2808 is connected to the resonator electrode 2806 via the layer C. Furthermore, the capacitor coupling electrode 2807 is connected to the capacitor coupling electrode 2808 via the layer D.

The resonator electrode 2806 is connected to the capacitor coupling electrode 2810 via the layers C and D, and the capacitor coupling electrode 2810 is connected to the external electrode 2702 (refer to FIG. 53) which is the antenna terminal so as to form the band-pass filter structure.

The external electrode 2708 (refer to FIG. 53) is the GSM transmitting and receiving terminal, and the external electrode 2708 is connected to one end of the capacitor coupling electrode 2821, and the capacitor coupling electrode 2821 has the ground electrode 2823 (refer to FIG. 54) connected thereto via the layers G and H. Furthermore, the external electrode 2708 has the strip line electrode 2817 connected thereto, and the other end of the strip line electrode 2817 is connected to the capacitor coupling electrode 2816, and is connected to the capacitor coupling electrode 2819 (refer to FIG. 54) via the layer E. In addition, the capacitor coupling electrode 2819 is connected to the ground via the external electrode 2706 (refer to FIG. 53).

The capacitor coupling electrode 2816 is connected to the strip line electrode 2815, and the other end of the strip line electrode 2815 is connected to the external electrode 2702 (refer to FIG. 53) which is the antenna terminal so as to form the low-pass filter structure. Moreover, the external electrodes 2703, 2704, 2706, 2707, 2709, 2710, 2712 and 2713 (refer to FIG. 53) form the ground electrode.

As described above, according to this embodiment, it is possible to implement the smaller size by using the layered type duplexer.

Moreover, this embodiment was described in detail by taking the layered type duplexer as an example, but it is also possible to implement the smaller size by using the SAW (surface acoustic wave) filter as the duplexer. In addition, it is also possible, according to the requirement characteristics, to implement it by combining the coaxial type, layered type and SAW filter.

Moreover, as for the branching circuit of the present invention in the above-mentioned sixth to fourteenth embodiments, the first internal terminal 103 is the terminal of inputting the transmitting frequency band of W-CDMA and inputting and outputting the transmitting frequency bands and receiving frequency bands of DCS and GSM, and is the 3-frequency branching circuit having the first switching circuit 106 of switching between the input of the transmitting frequency band of GSM and the output of the receiving frequency band of GSM branched by a branching circuit 105 and the second switching circuit 107 of switching between the input of the transmitting frequency band of W-CDMA and the transmitting frequency band of DCS and the output of the receiving frequency band of DCS branched by a branching circuit 105. However, the branching circuit of the present invention is not limited thereto, but it may also be the branching circuit characterized by having a first branching circuit having the filter function of passing the transmitting frequency band and the receiving frequency band in each of the first to Nth frequency bands and equipped with the first to the k-th internal terminals and the antenna terminal of connecting to the antenna, for instance, wherein the first internal terminal is the terminal of inputting the transmitting frequency band of the first frequency band, and also having a second branching circuit, connected to the k-th internal terminal, of branching the transmitting frequency bands of the first frequency band and all or a part of the second to N-th frequency bands.

In addition, as for the branching circuit of the present invention in the above-mentioned eighteenth to twentieth embodiments, the second internal terminal 2304 is the terminal of inputting the transmitting frequency band of W-CDMA and inputting and outputting the transmitting frequency band and receiving frequency band of DCS and the first internal terminal 2303 is the terminal of inputting and outputting the transmitting frequency band and the receiving frequency band of GSM, and it is the 3-frequency branching circuit having the second switching circuit 2307, connected to the second internal terminal 2304, of switching between the input of the transmitting frequency band of W-CDMA and the transmitting frequency band of DCS and the output of the receiving frequency band of DCS and the first switching circuit 2306, connected to the first internal terminal 2303, of switching between the input of the transmitting frequency band of GSM and the output of the receiving frequency band of GSM.

In short, the branching circuit of the present invention should be the branching circuit characterized by having first branching circuit having the filter function of passing the transmitting frequency band and the receiving frequency band in each of the first to Nth frequency bands and equipped with the first to the k-th internal terminals and the antenna terminal of connecting to the antenna, wherein the first internal terminal is the terminal of outputting the receiving frequency band of the first frequency band, and the k-th internal terminal is the input/output terminal of inputting the transmitting frequency band of the first frequency band and inputting and outputting the transmitting frequency bands and the receiving frequency bands of all or a part of the second to N-th frequency bands.

In addition, the branching circuit of the present invention may also be the branching circuit having replaced the roles of the input and output in such a branching circuit. To be more specific, the branching circuit of the present invention may also be the branching circuit characterized by having first branching circuit having the filter function of passing the transmitting frequency band and the receiving frequency band in each of the first to Nth frequency bands and equipped with the first to the k-th internal terminals and the antenna terminal of connecting to the antenna, wherein the first internal terminal is the terminal of inputting the transmitting frequency band of the first frequency band, and the k-th internal terminal is the input/output terminal of outputting the receiving frequency band of the first frequency band and inputting and outputting the transmitting frequency bands and the receiving frequency bands of all or a part of the second to N-th frequency bands.

As for the branching circuit of the present invention in the case of taking the circuit configuration described above, the receiving signal (or transmitting signal) to the first internal terminal is branched first by the first branching circuit around the antenna, and so the receiving signal can be received in a low-loss state so that high tone quality of the receiving signal (or transmitting signal) can be assured for instance.

In addition, as it can simultaneously transmit and receive the signal by utilizing the first internal terminal which is the terminal dedicated to the receiving signal (or transmitting signal), it also supports the system in which the W-CDMA (Wide-band Code Division Multiple Access) method is mixed. As a matter of course, a plurality of such terminals dedicated to the receiving signal (or transmitting signal) may be provided so that high tone quality of the receiving signal (or transmitting signal) on each terminal can be assured, for instance.

Moreover, as for the branching circuit of the present invention, it goes without saying that it is possible, by further having an arbitrary number of the branching circuit in the subsequent stage of the aforementioned first and/or second branching circuit, to branch the receiving frequency bands and the transmitting frequency bands in an arbitrary number of the frequency bands.

In addition, as for the branching circuit according to the above-mentioned fifteenth to seventeenth embodiments of the present invention, the fourth internal terminal 1907 is the terminal of inputting the transmitting frequency band of W-CDMA and inputting and outputting the transmitting frequency band and the receiving frequency band of DCS, and is the 3-frequency branching circuit having a first switching circuit 1904, connected to the first internal terminal 1903, of switching between the input of the transmitting frequency band of GSM and the output of the receiving frequency band of GSM and a second switching circuit 1909, connected to the fourth internal terminal 1907, of switching between the input of the transmitting frequency band of W-CDMA and the transmitting frequency band of DCS and the output of the receiving frequency band of DCS.

However, the branching circuit of the present invention is not limited thereto, but it may also be, for instance, the branching circuit characterized by having the first branching circuit having the filter function of passing the transmitting frequency band and receiving frequency band in each of the first to Nth frequency bands and equipped with the first and second internal terminals and the antenna terminal of connecting to the antenna, and the second branching circuit having the filter function of passing the transmitting frequency band and receiving frequency band in each of the first to N−1-th frequency bands and equipped with the connection terminals of connecting to the third to the k-th internal terminals and to the second internal terminal, and the third branching circuit, connected to the third internal terminal, of branching the transmitting frequency band in the first frequency band and the frequency bands of all or a part of the second to N-th frequency bands.

In short, the branching circuit of the present invention should be the branching circuit characterized by having the first branching circuit having the filter function of passing the transmitting frequency band and the receiving frequency band in each of the first to Nth frequency bands and equipped with the first and second internal terminals and the antenna terminal of connecting to the antenna and the second branching circuit having the filter function of passing the transmitting frequency band and receiving frequency band in each of the first to N−1-th frequency bands and equipped with the third to the k-th internal terminals and the connection terminal of connecting to the second internal terminal, wherein the first internal terminal is the terminal of inputting and outputting the transmitting frequency band and the receiving frequency band of the N-th frequency band, the second internal terminal is the terminal of inputting and outputting the transmitting frequency band and the receiving frequency band of the first to N−1-th frequency band, and the k-th internal terminal is the terminal of outputting the receiving frequency band of the first frequency band, and the third internal terminal is the input/output terminal of inputting the transmitting frequency band of the first frequency band and inputting and outputting the transmitting frequency bands and the receiving frequency bands of all or a part of the second to N−1-th frequency bands.

In addition, the branching circuit of the present invention may also be the branching circuit having replaced the roles of the input and output in such a branching circuit. To be more specific, the branching circuit of the present invention may also be the branching circuit characterized by having the first branching circuit having the filter function of passing the transmitting frequency band and the receiving frequency band in each of the first to Nth frequency bands and equipped with the first and second internal terminals and the antenna terminal of connecting to the antenna, the second branching circuit having the filter function of passing the transmitting frequency band and the receiving frequency band in each of the first to N−1-th frequency bands and equipped with the third to k-th internal terminals and the connection terminal of connecting to the second internal terminal, wherein the first internal terminal is the terminal of inputting and outputting the transmitting frequency band and the receiving frequency band of the N-th frequency band, the second internal terminal is the terminal of inputting and outputting the transmitting frequency band and the receiving frequency band of the first to N−1-th frequency band, and the k-th internal terminal is the terminal of inputting the transmitting frequency band of the first frequency band, and the third internal terminal is the terminal of outputting the receiving frequency band of the first frequency band and inputting and outputting the transmitting frequency bands and the receiving frequency bands of all or a part of the second to N−1-th frequency bands.

As for the branching circuit of the present invention in the case of taking the circuit configuration described above, the transmitting and receiving signal to the first internal terminal is branched first by the first branching circuit around the antenna portion, and so the transmitting and receiving signal can be received in a low-loss state so that the high tone quality thereof can be assured for instance. As a matter of course, a plurality of terminals dedicated to the transmitting and receiving signals of a plurality of connection methods may be provided so that the high tone quality of the transmitting and receiving signals of the plurality of connection methods can be assured for instance.

In addition, as it can simultaneously transmit and receive the signal by utilizing the k-th internal terminal which is dedicated to outputting the receiving frequency band of the first frequency band (or inputting the transmitting frequency band of the first frequency band), it also supports the system in which the W-CDMA (Wide-band Code Division Multiple Access) method is mixed. As a matter of course, a plurality of such terminals dedicated to the receiving signal (or the transmitting signal) may be provided so that high tone quality of the receiving signal (or the transmitting signal) on each terminal can be assured for instance.

Moreover, as for the branching circuit of the present invention, it goes without saying that it is possible, by further having an arbitrary number of the branching circuit in the subsequent stage of the aforementioned first and/or second branching circuit and/or third branching circuit, to branch the receiving frequency bands and the transmitting frequency bands in an arbitrary number of the frequency bands.

In addition, the mobile communication equipment (radio communication equipment) of the present invention is characterized by having the antenna of transmitting and receiving the signal, the branching circuit of the present invention (3-frequency branching circuit) of inputting and outputting the transmitted and received signal, and the signal processing device of processing the signal branched by the branching circuit (3-frequency branching circuit).

Thus, the present invention allows the simultaneous receiving of W-CDMA, GSM and DCS by, for instance, using the duplexer around the antenna portion so as to branch the W-CDMA receiving signal first and branch the GSM transmitting and receiving signal from the W-CDMA transmitting signal and the DCS transmitting and receiving signal by using the branching circuit of branching the low frequency band and high frequency band. Furthermore, it is possible to provide the low-pass filter of passing the low frequency through the common terminal of the transmitting and receiving signal of GSM, the transmitting signal of W-CDMA and transmitting and receiving signal of DCS and the high-pass filter of passing the high frequency through it, and provide the circuit of dividing the transmitting and receiving signals of GSM on the low-pass filter side, and also provide the circuit of dividing the transmitting and receiving as to the transmitting signals of W-CDMA and DCS and the transmitting signal of DCS on the high-pass filter side so as to allow the transmitting and receiving of the three frequencies. In addition, it is possible, according to the requirement characteristics, to implement the 3-frequency branching circuit of the smaller size and reduced losses by using in the duplexer portion the coaxial type duplexer using the coaxial type resonator if reduction in losses is required, the duplexer of the layered type or using the SAW filter if the smaller size is required, and further combining them.

In addition, it is also possible to implement the transmitting and receiving of the three frequencies by providing in the antenna portion the low-pass filter of passing the low frequency through the common terminal of the transmitting and receiving signal of GSM, the transmitting signal of W-CDMA and transmitting and receiving signal of DCS and the high-pass filter of passing the high frequency through it, and providing the circuit of dividing the transmitting and receiving signals of GSM on the low-pass filter side and also providing the circuit of dividing the transmitting and receiving as to the transmitting signals of W-CDMA and DCS and the receiving signal of DCS on the high-pass filter side, and it is also feasible to provide the 3-frequency branching circuit of the smaller size and reduced losses by using the aforementioned coaxial type duplexer and the layered and SAW filter.

Moreover, the entire disclosure of the above literature is quoted as-is so as to be integrated herein.

INDUSTRIAL APPLICABILITY

As is apparent from the above description, the present invention has an advantage that it can provide the 3-frequency branching circuit, branching circuit and radio communication equipment also usable for the system wherein the TDMA method and the W-CDMA method assuring high tone quality and high speed data communication for instance are mixed.

The invention claimed is:

1. A 3-frequency branching circuit having a filter function of passing a transmitting frequency band and a receiving frequency band in each of first, second and third frequency bands, comprising:
    first, second and third internal terminals;
    an antenna terminal of connecting to an antenna;
    branching means having a first filter of passing the third frequency band between said first internal terminal and said antenna terminal and a second filter of passing said first and second frequency bands between said second internal terminal and said antenna terminal;
    a first switching circuit, connected to said first internal terminal, of switching between a first transmitting terminal used to transmit said third frequency band and a first receiving terminal used to receive said third frequency band;
    a second switching circuit, connected to said second internal terminal, of switching among a second transmitting terminal used to transmit a transmitting frequency band of said second frequency band, a second receiving terminal used to receive a receiving frequency band of said second frequency band, and the third internal terminal used to transmit and receive said first frequency band; and
    a duplexer, connected to said third internal terminal, of branching the transmitting frequency band and the receiving frequency band of said first frequency band.

2. A 3-frequency branching circuit having a filter function of passing a transmitting frequency band and a receiving frequency band in each of first, second and third frequency bands, comprising:
    first, second, third and fourth internal terminals;
    an antenna terminal of connecting to an antenna;
    branching means having a first filter of passing said third frequency band between said first internal terminal and said antenna terminal and a second filter of passing said first and second frequency bands between said second internal terminal and said antenna terminal;
    a first switching circuit, connected to said first internal terminal, of switching between the transmitting frequency band and the receiving frequency band of said third frequency band;
    a second switching circuit, connected to said second internal terminal, of switching and transmitting the second frequency band to the third internal terminal and the first frequency band to the fourth internal terminal;
    a third switching circuit, connected to said third internal terminal, of switching between the transmitting frequency band and the receiving frequency band of said second transmitting frequency band; and
    a duplexer, connected to said fourth internal terminal, of branching the transmitting frequency band and the receiving frequency band of said first frequency band.

3. A 3-frequency branching circuit comprising:
a duplexer having a filter function of passing a transmitting frequency band and a receiving frequency band in each of first, second and third frequency bands and equipped with first and second internal terminals, an antenna terminal of connecting to an antenna, a first filter of passing transmitting frequency bands of said three frequency bands and receiving frequency bands of said second and third frequency bands between said first internal terminal and said antenna terminal, and a second filter of passing the receiving frequency band of said first frequency band between said second internal terminal and said antenna terminal;
branching means, connected to said first internal terminal, of branching (1) the transmitting frequency band of said first frequency band, transmitting frequency band of said second frequency band, and receiving frequency band of said second frequency band, (2) the transmitting frequency band of said third frequency band and the receiving frequency band of said third frequency band;
a first switching circuit of switching between transmitting of said third frequency band and receiving of said third frequency band; and
a second switching circuit of switching between transmitting of said first and second frequency bands and receiving of said second frequency band.

4. A 3-frequency branching circuit comprising:
branching means, having a filter function of passing a transmitting frequency band and a receiving frequency band in each of first, second and third frequency bands, of branching (1) the transmitting frequency band and receiving frequency band of said third frequency band, (2) the transmitting frequency band of said first and second frequency bands and the receiving frequency band of said first and second frequency bands, having first and second internal terminals, an antenna terminal of connecting to an antenna, a first filter of passing the transmitting frequency band and receiving frequency band of the third frequency band between said first internal terminal and said antenna terminal and a second filter of passing the transmitting frequency band of said first and second frequency bands and the receiving frequency band of said first and second frequency bands between said second internal terminal and said antenna terminal;
a first switching circuit, connected to said first internal terminal, of switching between transmitting of said third frequency band and receiving of said third frequency band;
a duplexer, connected to said second internal terminal, having third and fourth internal terminals, a third filter of passing the transmitting frequency band of said first and second frequency bands and the receiving frequency band of said second frequency band between said third internal terminal and said second internal terminal, and a fourth filter of passing the receiving frequency band of said first frequency band between said fourth internal terminal and said second internal terminal; and
a second switching circuit, connected to said third internal terminal, of switching between the transmitting frequency band of said first and second frequency bands and the receiving frequency band of said second frequency band.

5. The 3-frequency branching circuit according to any one of claims 1, 2, 3 and 4,
wherein said branching means is constituted by a layered configuration using the dielectric green sheet.

6. A 3-frequency branching circuit comprising:
a duplexer having a filter function of passing a transmitting frequency band and a receiving frequency band in each of first, second and third frequency bands and equipped with first, second and third internal terminals, an antenna terminal of connecting to an antenna, a first filter of passing a transmitting frequency band and a receiving frequency band of said third frequency band between said first internal terminal and said antenna terminal, a second filter of passing the transmitting frequency band of said first and second frequency bands and the receiving frequency band of said second frequency band between said second internal terminal and said antenna terminal, and a third filter of passing the receiving frequency band of said first frequency band between said third internal terminal and said antenna terminal;
a first switching circuit, connected to said first internal terminal, of switching between the transmitting frequency band and the receiving frequency band of said third frequency band; and
a second switching circuit, connected to said second internal terminal, of switching between the transmitting frequency band of said first and second frequency bands and the receiving frequency band of said second frequency band.

7. The 3-frequency branching circuit according to any one of claims 1, 2, 3, 4 and 6,
wherein at least one of said first, second and third switching circuits, said duplexer and said first, second and third filters is constituted by a layered configuration using a dielectric green sheet.

8. The 3-frequency branching circuit according to any one of claims 1, 2, 3, 4 and 6,
wherein at least one of said branching means, said first, second and third switching circuits, said duplexer and said first, second and third filters is constituted by mounting a switching element on a multilayered product using a dielectric green sheet.

9. The 3-frequency branching circuit according to any one of claims 1, 2, 3, 4 and 6,
wherein at least one of said first, second and third switching circuits has a configuration using a diode.

10. The 3-frequency branching circuit according to any one of claims 1, 2, 3, 4 and 6,
wherein a GaAs (gallium arsenide) switch is used for at least one of said branching means and said first, second and third switching circuits.

11. The 3-frequency branching circuit according to any one of claims 1, 2, 3, 4 and 6,
wherein said first frequency band is a frequency band supporting the W-CDMA method.

12. Radio communication equipment comprising:
an antenna of transmitting and receiving a signal;
a 3-frequency branching circuit according to any one of claims 1, 2, 3, 4 and 6; and
signal processing means of processing the signal branched by said 3-frequency branching circuit.

13. A branching circuit having a filter function of passing a transmitting frequency band and a receiving frequency band in each of a first to Nth frequency bands, comprising:
first and second internal terminals;
an antenna terminal of connecting to an antenna;
branching means having a first filter of passing n+1-th ($2 \leq n \leq N-1$) to Nth frequency bands between said first internal terminal and said antenna terminal and a second filter of passing the first to said nth frequency bands between said second internal terminal and the antenna terminal;
a first switching circuit, connected to said first internal terminal, of switching between the transmitting frequency bands and the receiving frequency bands of said n+1-th to Nth frequency bands;
a second switching circuit, connected to said second internal terminal, of switching between the transmitting frequency bands of said first frequency band and said second to nth frequency bands and the receiving frequency bands of said second to the nth frequency bands; and
a duplexer of branching the transmitting frequency band and the receiving frequency band of said first frequency band.

14. A branching circuit having a filter function of passing a transmitting frequency band and a receiving frequency band in each of first to Nth frequency bands, comprising:
first, second, third and fourth internal terminals;
an antenna terminal of connecting to an antenna;
branching means having a first filter of passing said n+1-th ($2 \leq n \leq N-1$) to Nth frequency bands between said first internal terminal and said antenna terminal and a second filter of passing said first to said nth frequency bands between said second internal terminal and the antenna terminal;
a first switching circuit, connected to said first internal terminal, of switching among the frequency bands of said n+1-th to Nth frequency bands;
a second switching circuit, connected to said second internal terminal, of switching and transmitting the second to n-th frequency bands to said third internal terminal and the first frequency band to said fourth internal terminal;
a third switching circuit, connected to said third internal terminal, of switching among said second to n-th frequency bands; and
a duplexer, connected to said fourth internal terminal, of branching the transmitting frequency band and the receiving frequency band of said first frequency band.

15. A branching circuit having a first branching means having a filter function of passing a transmitting frequency band and a receiving frequency band in each of first to Nth frequency bands, and equipped with first to k-th internal terminals and an antenna terminal of connecting to an antenna,
wherein said first internal terminal is a terminal of outputting the receiving frequency band of said first frequency band;
said k-th internal terminal is the terminal of inputting the transmitting frequency band of said first frequency band and inputting and outputting the transmitting frequency bands and the receiving frequency bands of all or a part of the second to said N-th frequency bands.

16. A branching circuit comprising:
first branching means having a filter function of passing a transmitting frequency band and a receiving frequency band in each of first to Nth frequency bands, and equipped with first to k-th internal terminals and an antenna terminal of connecting to an antenna, and
wherein said first internal terminal is a terminal of inputting the transmitting frequency band of said first frequency band;
said k-th internal terminal is the terminal of outputting the receiving frequency band of said first frequency band and inputting and outputting the transmitting frequency bands and the receiving frequency bands of all or a part of the second to N-th frequency bands.

17. A branching circuit comprising:
first branching means having a filter function of passing a transmitting frequency band and a receiving frequency band in each of first to Nth frequency bands, and equipped with first and second internal terminals and an antenna terminal of connecting to an antenna; and
second branching means having a filter function of passing the transmitting frequency band and the receiving frequency band in each of first to N-1-th frequency bands, and equipped with third to k-th internal terminals and a connection terminal of connecting to said second internal terminal,
wherein said first internal terminal is a terminal of inputting and outputting the transmitting frequency bands and the receiving frequency bands of said N-th frequency bands;
said second internal terminal is a terminal of inputting and outputting the transmitting frequency band and the receiving frequency band of said first to said N-1-th frequency bands;
said k-th internal terminal is the terminal of outputting the receiving frequency band of said first frequency band; and
said third internal terminal is the terminal of inputting the transmitting frequency band of said first frequency band and inputting and outputting the transmitting frequency bands and the receiving frequency bands of all or a part of said second to N-1-th frequency bands.

18. A branching circuit comprising:
first branching means having a filter function of passing a transmitting frequency band and a receiving frequency band in each of first to Nth frequency bands, and equipped with first and second internal terminals and an antenna terminal of connecting to an antenna; and
second branching means having a filter function of passing the transmitting frequency band and the receiving frequency band in each of first to N-1-th frequency bands, and equipped with third to k-th internal terminals and a connection terminal of connecting to said second internal terminal,
wherein said first internal terminal is a terminal of inputting and outputting the transmitting frequency band and the receiving frequency band of said N-th frequency band;
said second internal terminal is the terminal of inputting and outputting the transmitting frequency band and the receiving frequency band of said first to said N-1-th frequency bands;
said k-th internal terminal is the terminal of inputting the transmitting frequency band of said first frequency band; and
said third internal terminal is the terminal of outputting the receiving frequency band of said first frequency band and inputting and outputting all or a part of the transmitting frequency bands and the receiving frequency bands of said second to N-1-th frequency bands.

19. Radio communication equipment comprising:
an antenna of transmitting and receiving a signal;
a branching circuit according to any one of claims 13, 14, 15, 16, 17 and 18; and
signal processing means of processing the signal branched by said branching circuit.

20. The 3-frequency branching circuit according to claim 1,
  wherein said third internal terminal is connected to said branching means and is also grounded via a diode.

21. The 3-frequency branching circuit according to claim 1,
  wherein said third internal terminal is connected to said branching means via the diode in a forward direction when transmitting and receiving said first frequency band.

22. The 3-frequency branching circuit according to claim 1,
  further comprising a low-pass filter inserted between said branching means and said second switching circuit.

23. The 3-frequency branching circuit according to claim 1,
  wherein said first receiving terminal and said third internal terminal are connected to said antenna and are also grounded via the diode in a forward direction and a grounding resistor respectively; and
  one resistor is shared as the grounding resistor used for said respective groundings.

24. The 3-frequency branching circuit according to claim 1,
  wherein said first and second receiving terminals are connected to said antenna and are also grounded via the diode in a forward direction and a grounding resistor respectively; and
  one resistor is shred as the grounding resistor used for said respective groundings.

25. The 3-frequency branching circuit according to claim 2,
  wherein that said duplexer has a configuration in which a coaxial type resonator is used and is comprised of a notch filter and a band pass filter.

26. The 3-frequency branching circuit according to claim 25,
  wherein said duplexer has the configuration in which a coaxial type resonator is used, and a signal of a transmitting frequency band is transmitted to said fourth internal terminal via said notch filter, and a signal of a receiving frequency band is transmitted from said fourth internal terminal via said band pass filter.

27. The 3-frequency branching circuit according to claim 2,
  wherein said fourth internal terminal is an internal terminal of a multilayered product.

28. The 3-frequency branching circuit according to claim 2,
  wherein a SAW filter is used for said duplexer.

29. The 3-frequency branching circuit according to claim 2,
  wherein said duplexer is comprised of a coaxial type resonator and a layered filter.

30. The 3-frequency branching circuit according to claim 2,
  wherein a coaxial type resonator and a SAW filter are used for said duplexer.

31. The 3-frequency branching circuit according to claim 2,
  wherein a layered filter and a SAW filter are used for said duplexer.

32. The 3-frequency branching circuit according to claim 3,
  wherein said duplexer has a configuration using a coaxial type resonator, said first filter is comprised of a notch filter and said second filter is comprised of a band pass filter.

33. The 3-frequency branching circuit according to claim 3,
  wherein said duplexer has a configuration using a coaxial type resonator, and a notch filter and a low-pass filter are constituted between said first internal terminal and said antenna terminal.

34. The 3-frequency branching circuit according to claim 3,
  wherein said duplexer has a configuration using a coaxial type resonator between said first internal terminal and said antenna terminal, and said second filter is comprised of a layered filter.

35. The 3-frequency branching circuit according to claim 3,
  wherein said duplexer has a configuration using a coaxial type resonator between said first internal terminal and said antenna terminal, and a SAW filter is used for said second filter.

36. The 3-frequency branching circuit according to claim 3,
  wherein said duplexer has a configuration using a layered filter between said first internal terminal and said antenna terminal, and a SAW filter is used between said second terminal and said antenna terminal.

37. The 3-frequency branching circuit according to claim 4,
  wherein said duplexer has a configuration using a coaxial type resonator, and said third filter is comprised of a notch filter and said fifth filter is comprised of a band pass filter.

38. The 3-frequency branching circuit according to claim 4,
  wherein said duplexer has a configuration using a coaxial type resonator, and said third filter is comprised of a notch filter and a low-pass filter.

39. The 3-frequency branching circuit according to claim 4,
  wherein said duplexer has a configuration using a layered filter, where the layered filter constituted between said third internal terminal and said second internal terminal is comprised of a notch filter and the layered filter constituted between said fourth internal terminal and said second internal terminal is comprised of a band pass filter.

40. The 3-frequency branching circuit according to claim 4,
  wherein said duplexer has a configuration using a layered filter, where the layered filter constituted between said third internal terminal and said second internal terminal is comprised of a notch filter and a low-pass filter.

41. The 3-frequency branching circuit according to claim 4,
  wherein said duplexer is comprised of a filter using a coaxial type resonator between said third internal terminal and said second internal terminal, and said fourth filter is comprised of a layered filter.

42. The 3-frequency branching circuit according to claim 4,
  wherein said duplexer is comprised of a filter using a coaxial type resonator between said third internal terminal and said second internal terminal, and the filter constituted between said fourth internal terminal and said second internal terminal is comprised of a SAW filter.

43. The 3-frequency branching circuit according to claim 4,
wherein said duplexer has said third filter comprised of a layered filter and said fourth filter is comprised of a SAW filter.

44. The 3-frequency branching circuit according to claim 6,
wherein said first filter is formed by a low-pass filter, said second filter is formed by a band pass filter, and said third filter is formed by a high-pass filter.

45. The 3-frequency branching circuit according to claim 6,
wherein said first filter is formed by a low-pass filter, said second filter is formed by a band pass filter, and said third filter is formed by a notch filter.

46. The branching circuit according to claim 15, further comprising a second branching means, connected to said k-th internal terminal, of branching the transmitting frequency band of said first frequency band and all or a part of the frequency bands of said second to said N-th frequency bands.

47. The branching circuit according to claim 46,
wherein said N is 3 and said k is 2;
said second internal terminal is the terminal of inputting the transmitting frequency band of said first frequency band and inputting and outputting the transmitting frequency bands and the receiving frequency bands of said second and third frequency bands which are all of said frequency bands;
a first switching circuit of switching between input of the transmitting frequency band of said third frequency band and output of the receiving frequency band of said third frequency band branched by said second branching means; and
a second switching circuit of switching between the input of the transmitting frequency band of said first frequency band and the transmitting frequency band of said second frequency band and the output of the receiving frequency band of said second frequency band branched by said second branching means.

48. The branching circuit according to claim 15,
wherein said N is 3 and said k is 2;
said third internal terminal is a terminal of inputting the transmitting frequency band of said first frequency band and inputting and outputting the transmitting frequency band and the receiving frequency band of said second frequency band which is said part of frequency bands;
said second internal terminal is the terminal of inputting and outputting the transmitting frequency band and the receiving frequency band of said third frequency band which is the remaining frequency band;
a second switching circuit, connected to said third internal terminal, of switching between the input of the transmitting frequency band of said first frequency band and the transmitting frequency band of said second frequency band and the output of the receiving frequency band of said second frequency band; and
a first switching circuit, connected to said second internal terminal, of switching between the input of the transmitting frequency band of said third frequency band and the output of the receiving frequency band of said third frequency band.

49. The branching circuit according to claim 17, further comprising third branching means, connected to said third internal terminal, of branching the transmitting frequency band of said first frequency band and all or a part of said second to N-th frequency bands.

50. The branching circuit according to claim 17,
wherein said N is 3 and said k is 4;
said third internal terminal is the terminal of inputting the transmitting frequency band of said first frequency band and inputting and outputting the transmitting frequency band and the receiving frequency band of said second frequency band which is all of said frequency bands;
a first switching circuit, connected to said first internal terminal, of switching between the input of the transmitting frequency band of said third frequency band and the output of the receiving frequency band of said third frequency band; and
a second switching circuit, connected to said third internal terminal, of switching between the input of the transmitting frequency band of said first frequency band and the transmitting frequency band of said second frequency band and the output of the receiving frequency band of said second frequency band.

* * * * *

UNITED STATES PATENT AND TRADEMARK OFFICE
CERTIFICATE OF CORRECTION

PATENT NO.       : 7,324,493 B2
APPLICATION NO.  : 10/311915
DATED            : January 29, 2008
INVENTOR(S)      : Yamada et al.

It is certified that error appears in the above-identified patent and that said Letters Patent is hereby corrected as shown below:

At Column 64, line 67, "$(2 \leqq n \leqq N-1)$" should read -- $(2 \leq n \leq N-1)$ --

At Column 65, line 24, "$(2 \leqq n \leqq N-1)$" should read -- $(2 \leq n \leq N-1)$ --

Signed and Sealed this

Twenty-fourth Day of June, 2008

JON W. DUDAS
*Director of the United States Patent and Trademark Office*